US012725829B2

(12) United States Patent
Johnson et al.

(10) Patent No.: US 12,725,829 B2
(45) Date of Patent: Sep. 1, 2026

(54) CROSS-LINKED SOLID-POLYMER ELECTROLYTES, METHODS OF MAKING SAME, AND USES THEREOF

(71) Applicant: CORNELL UNIVERSITY, Ithaca, NY (US)

(72) Inventors: Hillis E.N. Johnson, Ripon, CA (US); Brooks A. Abel, McComb, MS (US); Geoffrey W. Coates, Lansing, NY (US); Sanjuna Stalin, Ithaca, NY (US); Lynden A. Archer, Ithaca, NY (US)

(73) Assignee: Cornell University, Ithaca, NY (US)

( * ) Notice: Subject to any disclaimer, the term of this patent is extended or adjusted under 35 U.S.C. 154(b) by 929 days.

(21) Appl. No.: 17/799,986

(22) PCT Filed: Mar. 1, 2021

(86) PCT No.: PCT/US2021/020230
§ 371 (c)(1),
(2) Date: Aug. 16, 2022

(87) PCT Pub. No.: WO2021/174186
PCT Pub. Date: Sep. 2, 2021

(65) Prior Publication Data

US 2023/0096123 A1 Mar. 30, 2023

Related U.S. Application Data

(60) Provisional application No. 62/983,159, filed on Feb. 28, 2020.

(51) Int. Cl.

| | |
|---|---|
| ***H01M 10/0565*** | (2010.01) |
| ***C08G 65/334*** | (2006.01) |
| ***C08G 65/337*** | (2006.01) |
| ***H01M 8/10*** | (2016.01) |
| ***H01M 10/0566*** | (2010.01) |

(52) U.S. Cl.
CPC .... *H01M 10/0565* (2013.01); *C08G 65/3344* (2013.01); *C08G 65/337* (2013.01); *H01M 10/0566* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | | | |
|---|---|---|---|---|
| 6,469,107 | B1 | 10/2002 | Sato et al. | |
| 9,590,268 | B2 | 3/2017 | Yang et al. | |
| 9,893,337 | B2 | 2/2018 | Pratt et al. | |
| 10,522,872 | B2 | 12/2019 | Ko et al. | |
| 2018/0337417 | A1 | 11/2018 | Kyu et al. | |
| 2019/0198913 | A1 | 6/2019 | Koh et al. | |
| 2020/0099090 | A1 | 3/2020 | Li et al. | |
| 2021/0005930 | A1 | 1/2021 | Kim et al. | |
| 2021/0194053 | A1* | 6/2021 | Ji | H01G 11/56 |
| 2024/0117250 | A1* | 4/2024 | Irie | H10K 59/8793 |

OTHER PUBLICATIONS

Chen, K., Sun, Y., Zhang, X., Liu, J., Xie, H.—A Self-Healing and Nonflammable Cros-Linked Network Polymer Electrolyte with the Combination of Hydrogen Bonds and Dynamic Disulfide Bonds for Lithium Metal Batteries, Energy Environ. Mater., 2023, 6 (Year: 2023).*

Polyethylene Glycol Diacrylate (PEGDA), available online at https://material-properties.org/polyethylene-glycol-diacrylate-pegda/, date unknown.*

Poly(ethylene glycol) diacrylate, available online at https://www.sigmaaldrich.com/US/en/product/aldrich/455008?msockid=18667617890b67ae2872608d885c66af, date unknown.*

Poly(ethylene glycol)diallyl ether terminated, available online at https://www.boronmolecular.com/catalogue/polyethylene-glycol-diallyl-ether-terminated-none-BM1766/, date unknown.*

Baroncini, et al., "Optimizing Conductivity and Cationic Transport in Crosslinked Solid Polymer Electrolytes," https://www.sciencedirect.com/science/article/pii/S0167273819307751, 2019, all enclosed pages cited.

Chen, et al., "A semi-interpenetrating network polymer electrolyte membrane prepared from non-self-polymerized precursors for ambient temperature all-solid-state lithium-ion batteries," Journal of Solid State Chemistry 296 (2021) all enclosed pages cited.

Chiappone, et al., "Degradable photopolymerized thiol-based solid polymer electrolytes towards greener Li-ion batteries," Polymer 75 (2015), all enclosed pages cited.

He, et al., "Difunctional block copolymer with ion solvating and crosslinking sites as solid polymer electrolyte for lithium batteries," Journal of Power Sources 481 (2021), all enclosed pages cited.

Meng, et al., "Macromolecular Design of Lithium Conductive Polymer as Electrolyte for Solid-State Lithium Batteries," Small 2021, 17, all enclosed pages cited.

(Continued)

*Primary Examiner* — Anca Eoff

(74) *Attorney, Agent, or Firm* — Young Basile Hanlon & MacFarlane. P.C.

(57) ABSTRACT

Solid-polymer electrolytes, methods of making solid-polymer electrolytes, and uses of solid-polymer electrolytes. A solid-polymer electrolyte comprises a cross-linked polymer network. A cross-linked polymer network may comprise a plurality of groups, which may be cross-linked groups, such as, for example, cross-linked difunctional polyether groups, cross-linked difunctional ionic groups, non-crosslinked groups, which may be referred to as "dangling" groups, or a combination thereof, and a plurality of cross-linked multifunctional crosslinker groups. A solid polymer electrolyte can be formed by polymerization. A solid polymer electrolyte can be formed in situ in a device. A solid polymer electrolyte can be used in devices such as, for example, batteries, supercapacitors, fuel cells, and the like.

12 Claims, 47 Drawing Sheets

(56) References Cited

OTHER PUBLICATIONS

Wei, et al., "A large-size, bipolar-stacked and high-safety solid-state lithium battery with integrated electrolyte and cathode," Journal of Power Sources 394 (2018), all enclosed pages cited.
Xu, et al., "Ion conduction in the comb-branched polyether electrolytes with controlled network structures," Soft Matter, 2020, 16, all enclosed pages cited.
Zhang, et al. "Lithium (4-styrenesulfonyl) (trifluoromethanesulfonyl) imide based single-ion polymer electrolyte with superior battery performance," Energy Storage Materials 24 (2020), all enclosed pages cited.

* cited by examiner

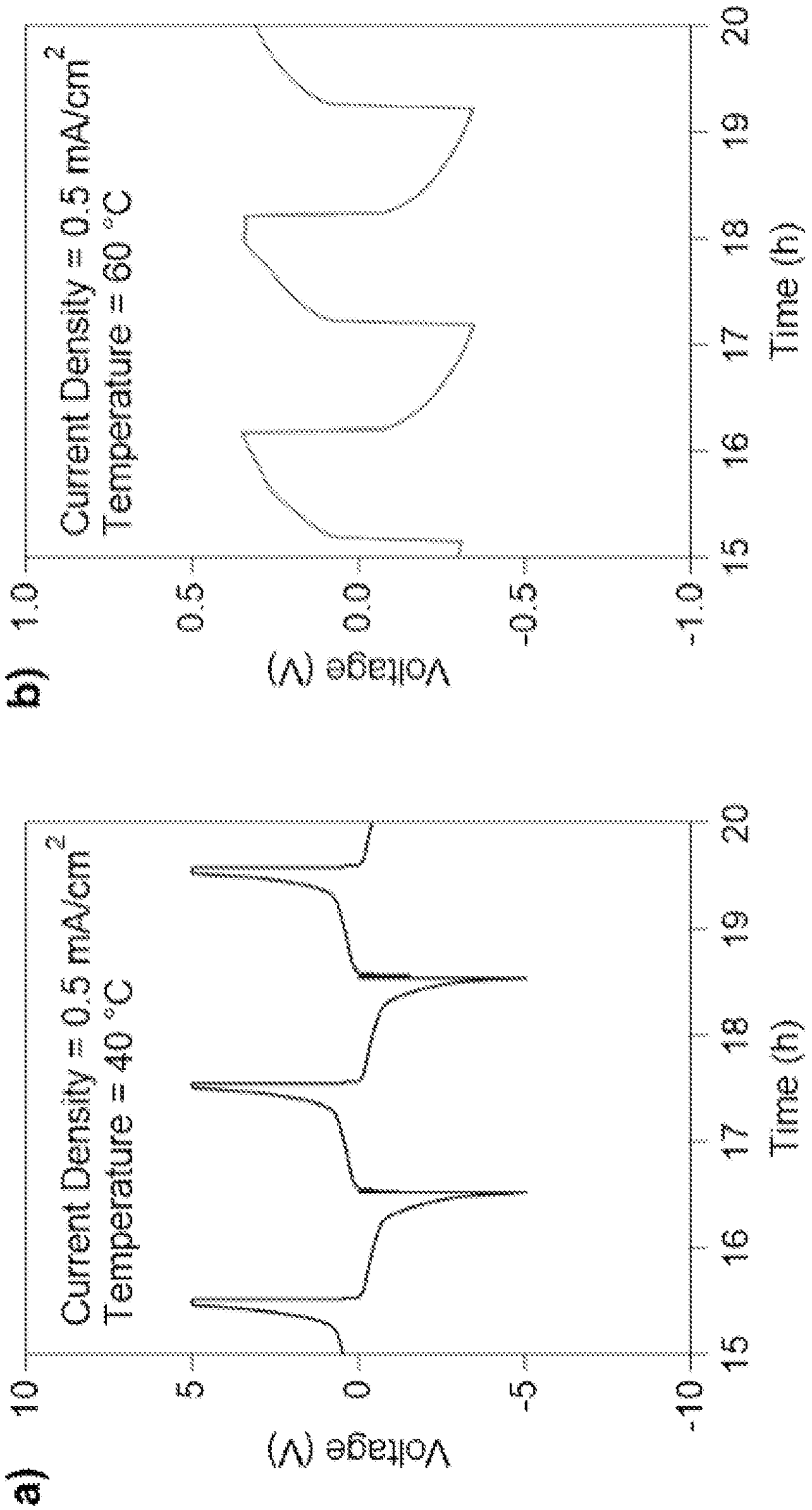
FIG. 1a-b

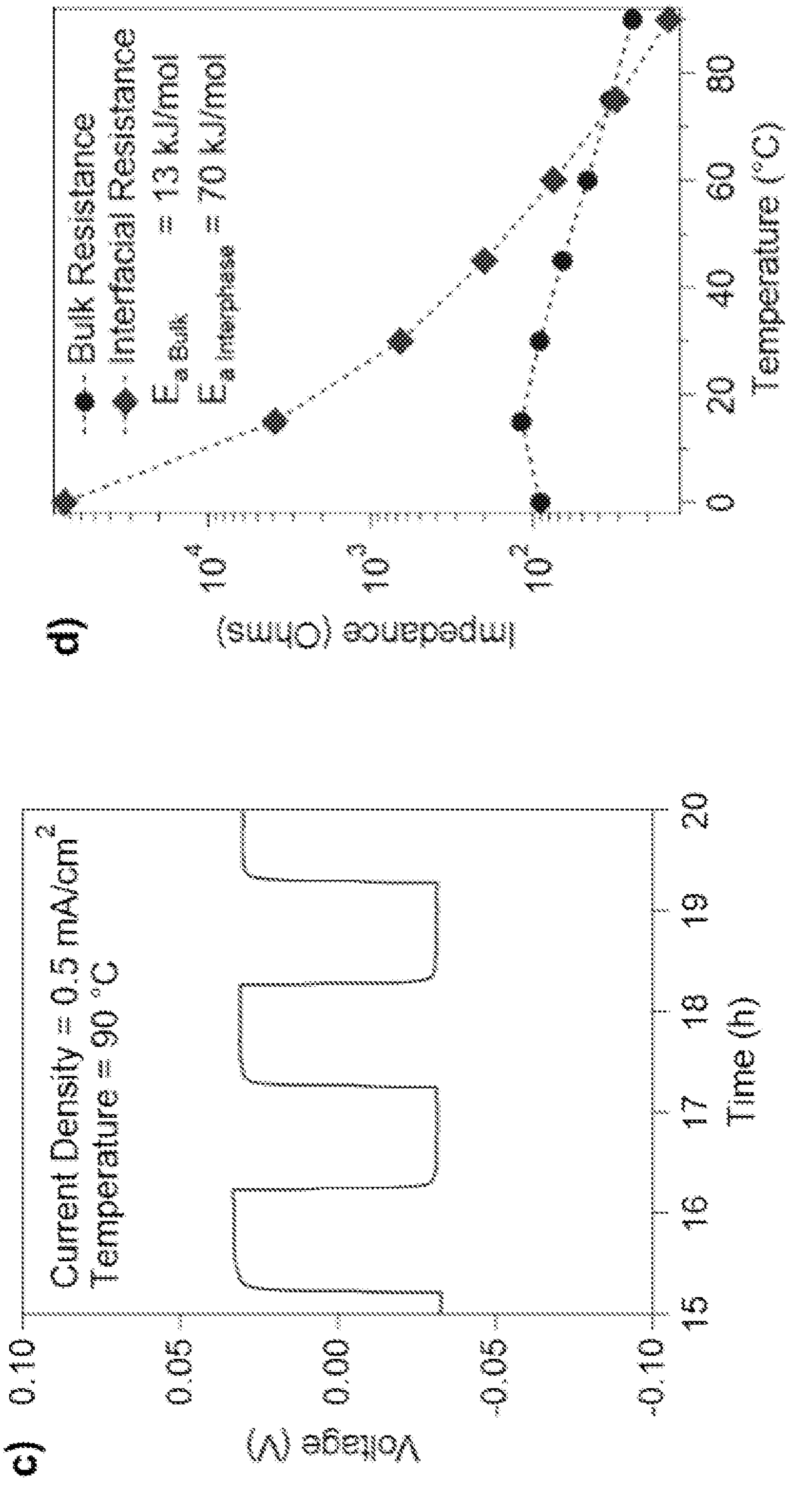
FIG. 1c-d

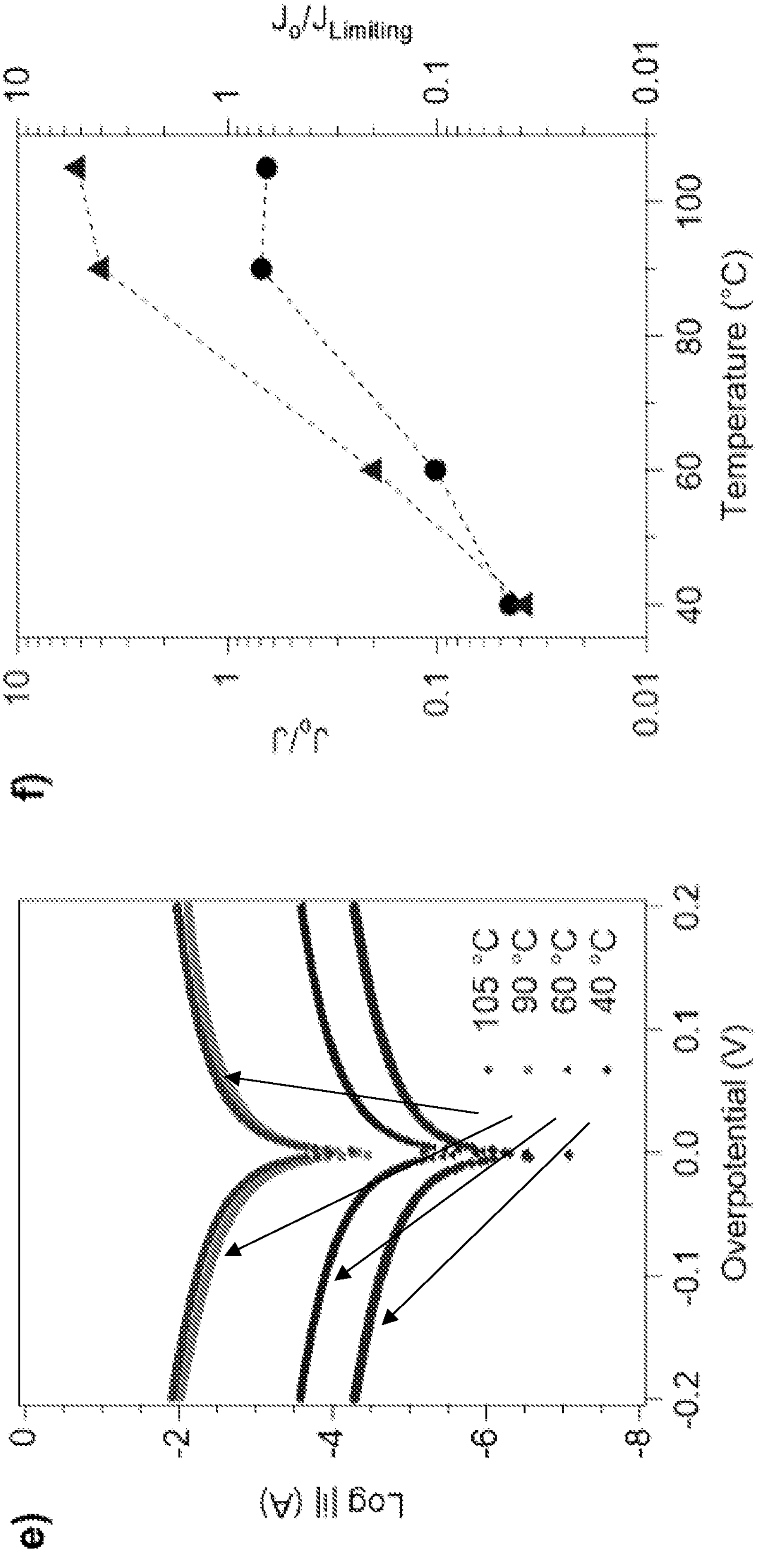
FIG. 1e-f

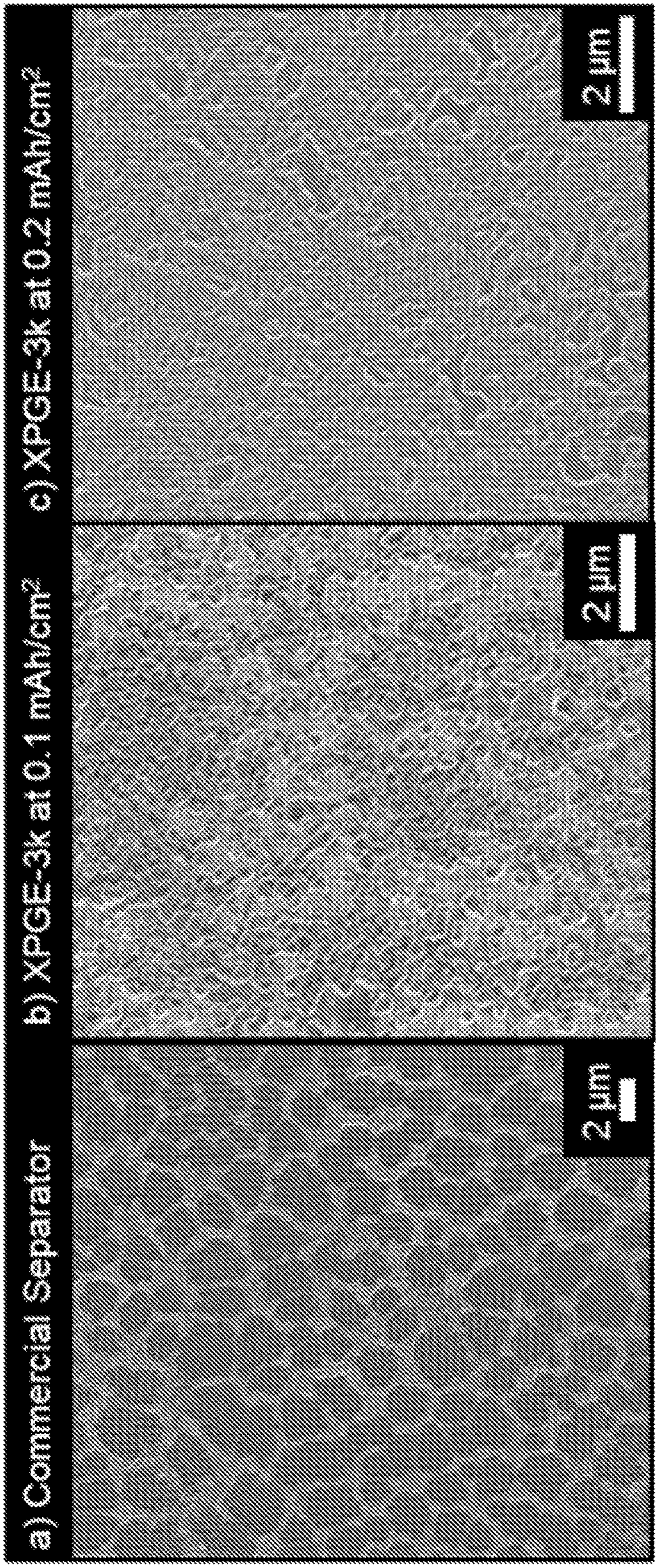
FIG. 3a-c

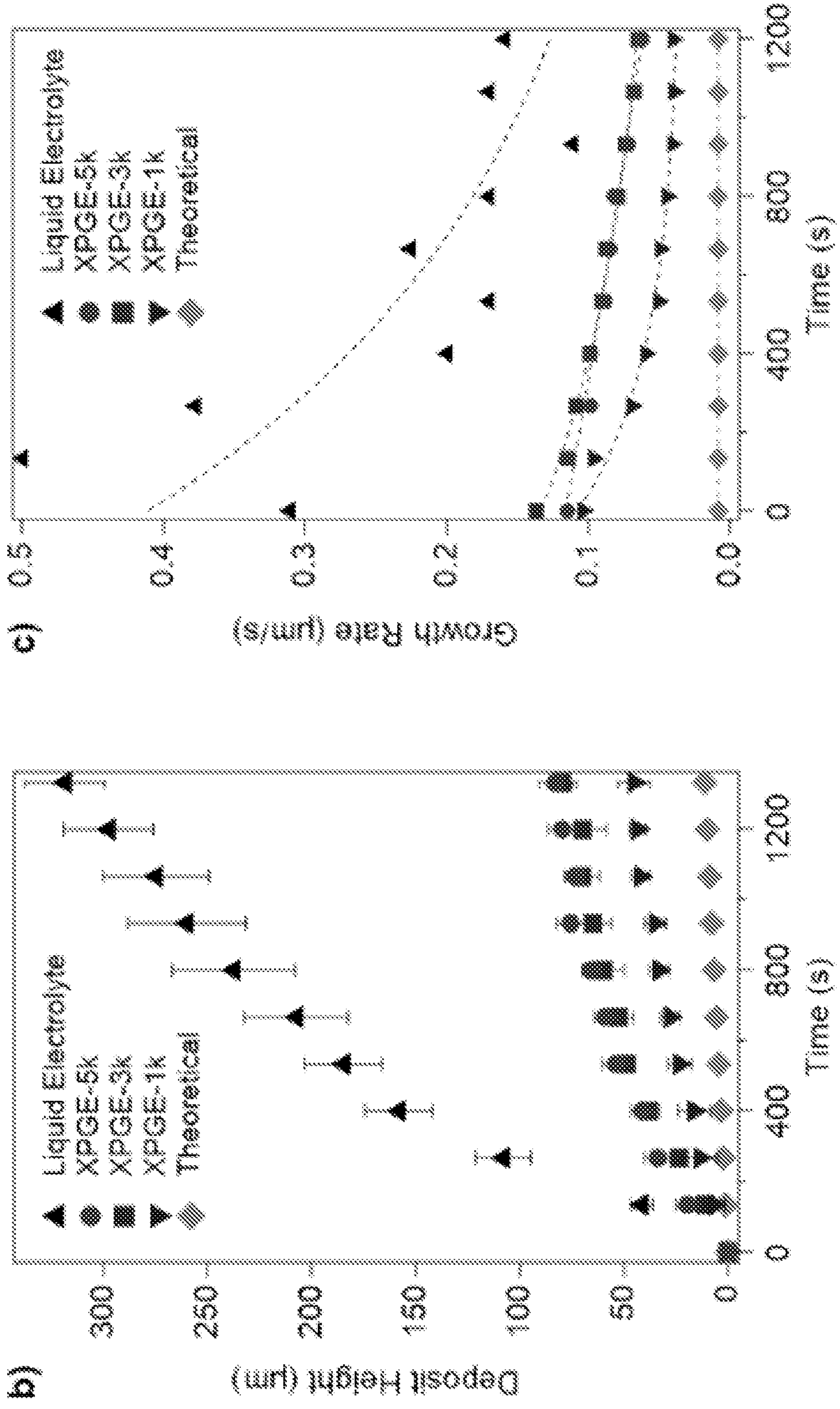
FIG. 4b-c

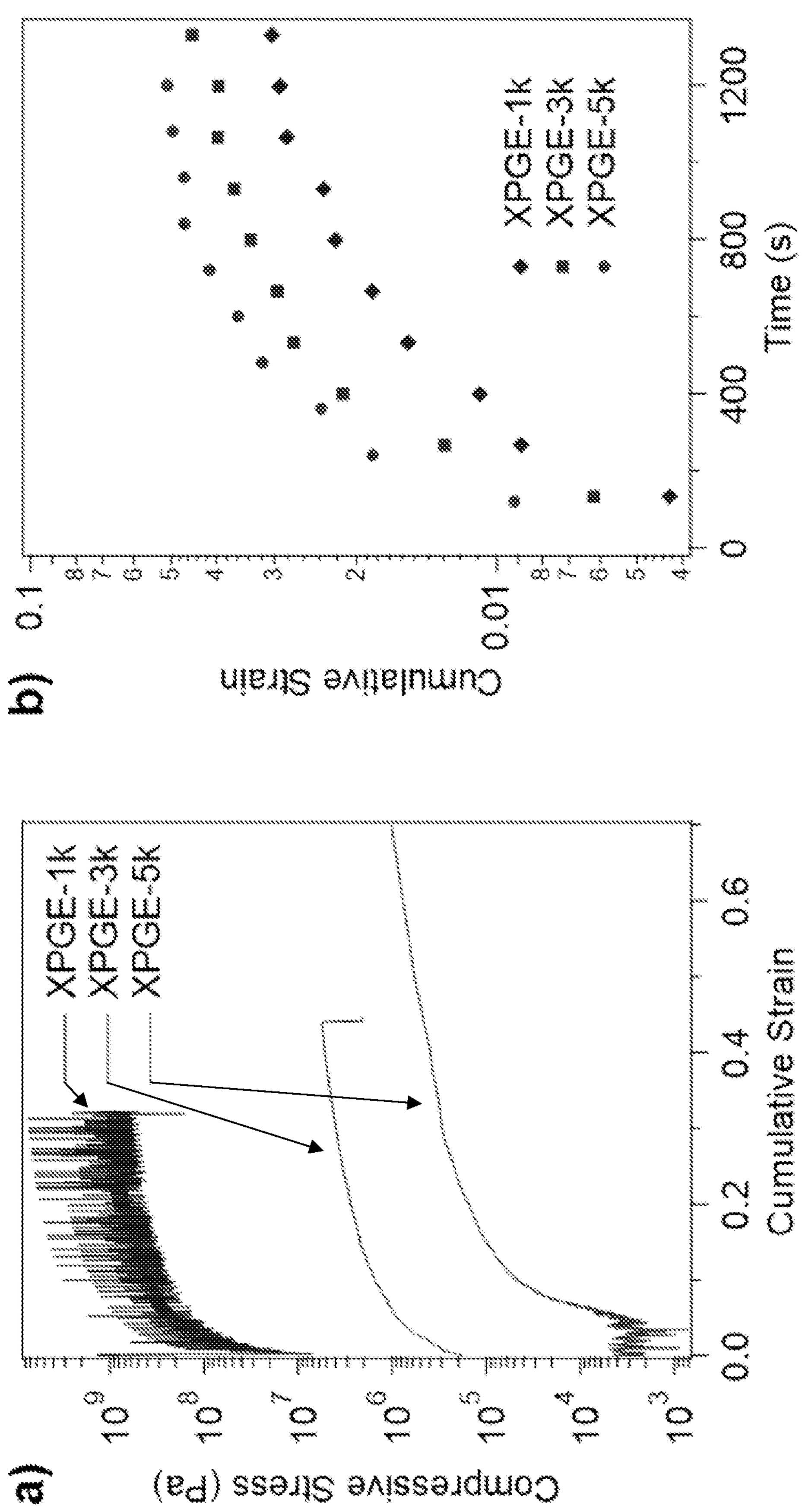
FIG. 5a-b

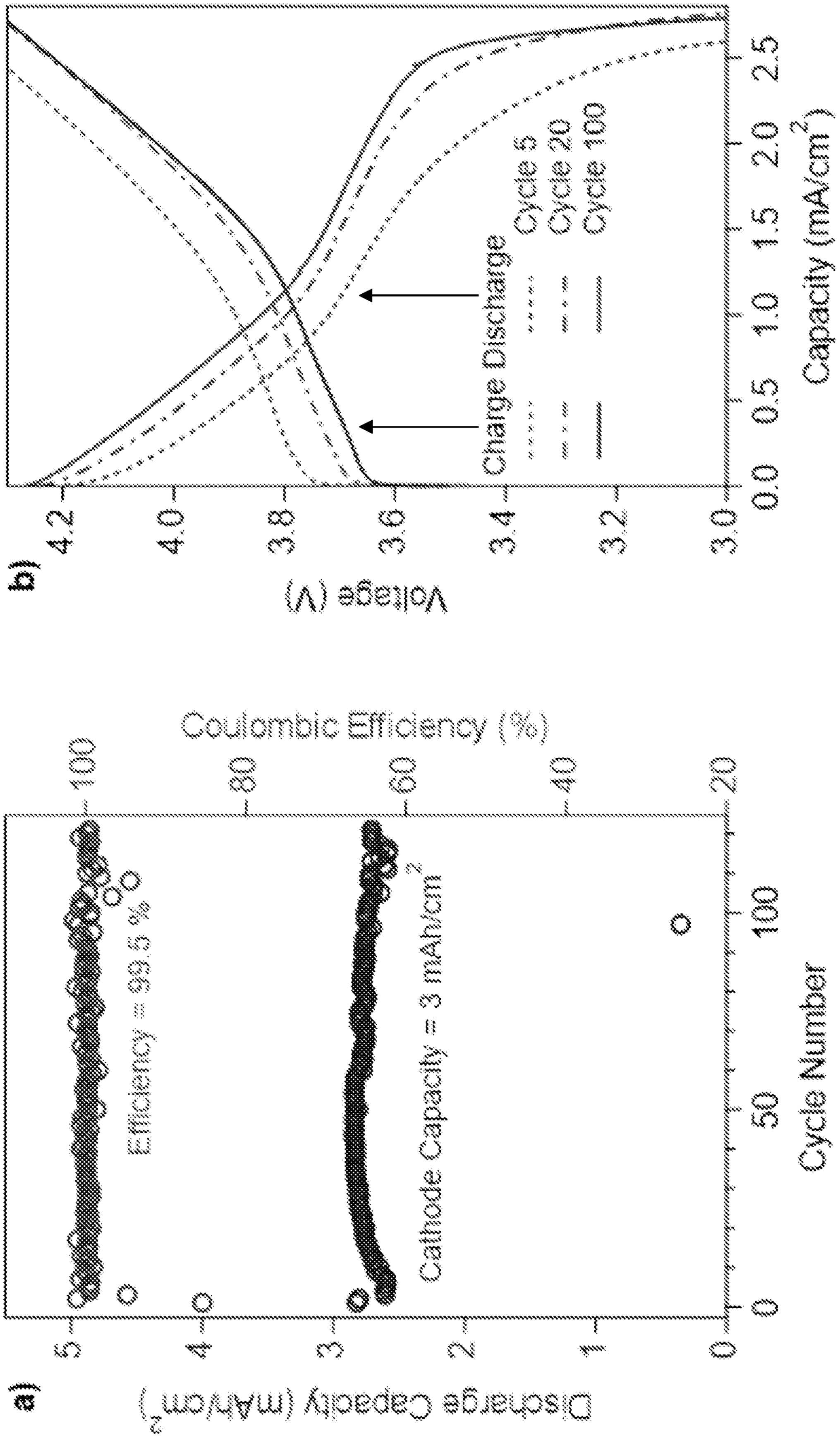
FIG. 6a-b

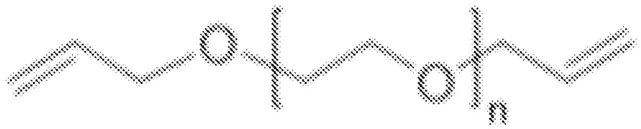
$M_n$ = 1, 3, 5 kg/mol
PEG diallyl ether (PEGDA)
R =
+
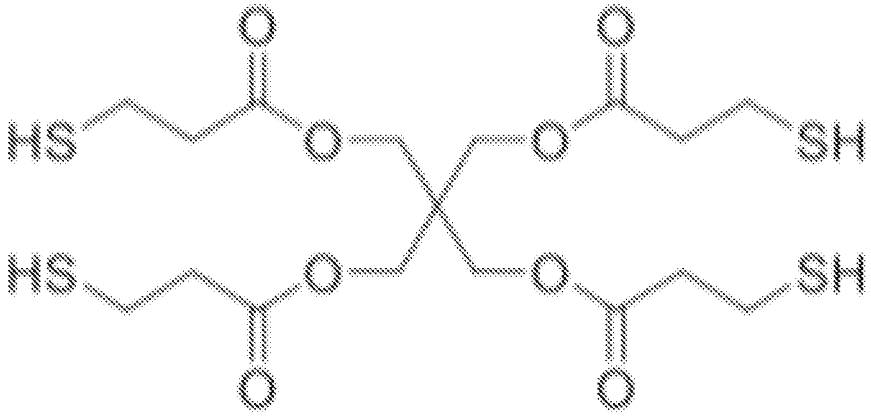
Tetra-functional cross-linker (4T)
FIG. 7 cont.

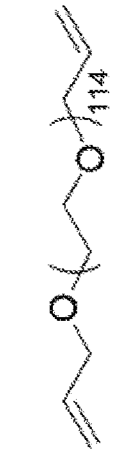
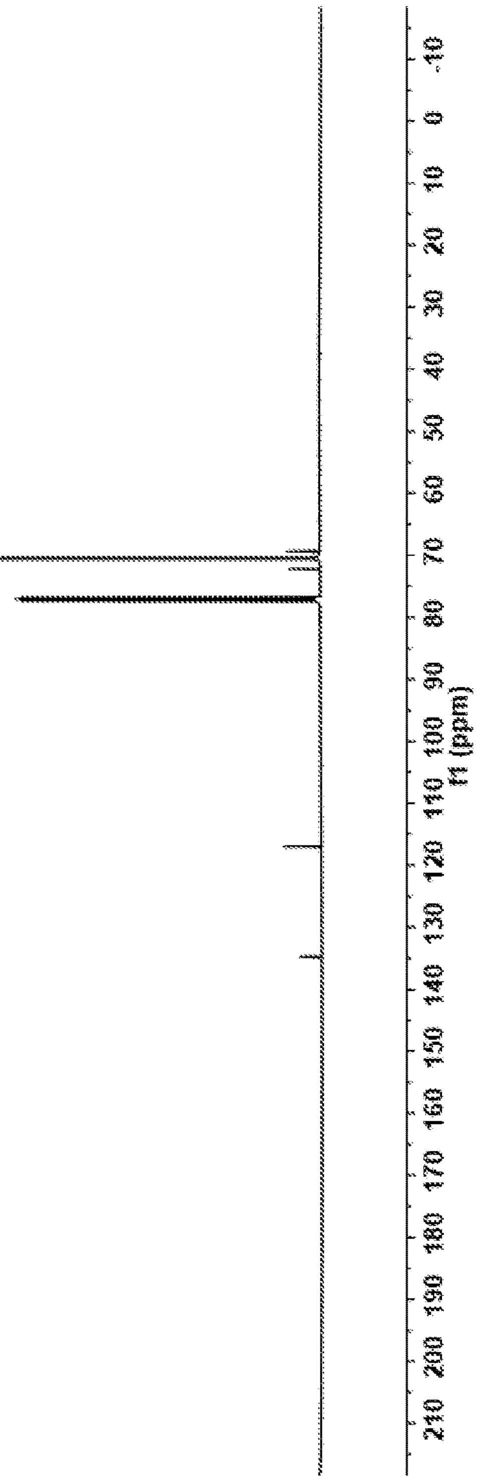
FIG. 8c cont.

c)

CROSS-LINKED SOLID-POLYMER ELECTROLYTES, METHODS OF MAKING SAME, AND USES THEREOF

CROSS-REFERENCE TO RELATED APPLICATIONS

This application is a U.S. national phase entry of PCT/US2021/020230 filed Mar. 1, 2021, which claims priority to U.S. Provisional Patent Application No. 62/983,159, filed Feb. 28, 2020, the disclosures of each of which are incorporated herein by reference in their entirety.

SUMMARY OF THE DISCLOSURE

The present disclosure describes solid-polymer electrolytes. The present disclosure also describes methods of making solid-polymer electrolytes and uses of solid-polymer electrolytes.

In an aspect, the present disclosure provides solid-polymer electrolytes. A solid-polymer electrolyte comprises a cross-linked polymer network. A cross-linked polymer network may comprise a plurality of groups (e.g., cross-linked groups, such as, for example, cross-linked difunctional polyether groups, cross-linked difunctional ionic groups, and the like, non-crosslinked groups, such as, for example "dangling" groups, or a combination thereof); and a plurality of cross-linked multifunctional crosslinker groups. Individual cross-linked difunctional polyether groups and/or individual cross-linked difunctional ionic groups and individual cross-linked multifunctional crosslinker groups are connected by at least one crosslinking group (e.g., comprising a thioether group, such as, for example, a carbon-sulfur bond). A solid-polymer electrolyte may comprise one or more metal salt(s), one or more tethered ionic group(s), or a combination thereof, and/or a liquid electrolyte. A solid-polymer electrolyte may or may not comprise a liquid electrolyte. In various examples, a cross-linked difunctional polyether group is structurally derived from (e.g., formed from) a difunctional polyether monomer and/or a cross-linked difunctional ionic group is structurally derived from (e.g., formed from) a difunctional ionic monomer and/or a "dangling" group is structurally derived from (e.g., formed from) a "dangling" group monomer and/or a cross-linked multifunctional crosslinker group is structurally derived from (e.g., formed from) a multifunctional crosslinker monomer. At least a portion of or all of the "dangling" groups may comprise a charged group. In various examples, charged group(s) individually comprise one or more anion(s) and one or more cation(s). A solid-polymer network may comprise a plurality of crystalline domains. A solid-polymer network may comprise a plurality of crystalline domains and a plurality of amorphous domains.

In an aspect, the present disclosure provides methods of making solid-polymer electrolytes. In various examples, a solid-polymer electrolyte is made by a method of the present disclosure. A method may be an ex situ method or an in situ method. A method of making a solid-polymer electrolyte (e.g., a solid-polymer electrolyte of the present disclosure) comprises: forming a reaction mixture including one or more difunctional polyether monomer(s) (e.g., PEG diallyl ether monomers and the like) (e.g., comprising a polyether group and two reactive groups (e.g., alkenyl(s), alkynyl(s), acryloyl(s), thiol group(s), and the like, and combinations thereof)), and/or one or more difunctional ionic monomer(s) (e.g., comprising one or more ionic group(s) (e.g., one or more anionic group(s)) and two reactive groups (e.g., alkenyl(s), alkynyl(s), acryloyl(s), thiol group(s), and the like, and combinations thereof)) and/or one or more "dangling" group monomer(s) (e.g., comprising one reactive group (e.g., alkenyl, alkynyl, acryloyl, thiol group, and the like))); one or more multifunctional crosslinking monomer(s) comprising two or more (e.g., 2, 3, 4, 5, 6, etc.) reactive groups (e.g., alkenyl(s), alkynyl(s), acryloyl(s), thiol group(s), and the like, and combinations thereof); and optionally, one or more solvent(s) (which individually may be a component of a liquid electrolyte). Without intending to be bound by any particular theory, it is considered that the optionally present one or more difunctional polyether monomer(s), the optionally present one or more ionic group monomer(s), the optionally present one or more "dangling" group monomer(s) and/or one or more multifunctional crosslinking monomer(s) react to form the solid-polymer electrolyte. A monomer or monomers may be referred to as precursor or precursors, respectively.

In an aspect, the present disclosure provides uses of solid-polymer electrolytes. The solid-polymer electrolytes may be solid-polymer electrolytes of the present disclosure. A device may comprise one or more solid-polymer electrolyte(s) of the present disclosure. Non-limiting examples of devices include batteries, supercapacitors, fuel cells, and the like. The solid-polymer electrolyte(s) may be formed in situ in the device.

BACKGROUND OF THE DISCLOSURE

Rechargeable lithium batteries have revolutionized the fields of consumer electronics and electric vehicles since their first successful commercialization by Sony in 1991. Configurations with lithium metal as the anode have attracted significant interest due to their high volumetric and gravimetric energy densities. The commercialization of lithium metal batteries (LMBs), however, has been hindered by the notorious problem of unstable, non-planar electrodeposition at the anode surface, which leads to formation of rough, mossy, or dendritic morphologies during battery recharge that can lead to premature battery failure. Extensive research efforts have focused on the suppression of lithium dendrites by means of salt additives, coatings on the lithium metal anode, single-ion conductors, and high-modulus solid-state electrolytes. At current densities below the diffusion limit, the growth of Li dendrites is thought to occur in three stages. The first stage involves the formation of a passivation layer by reduction of electrolyte components (such as solvents, salts, or additives) in contact with the electrode. Termed the solid electrolyte interphase (SEI), this layer was recently investigated by means of focused ion beam (FIB) cryogenic SEM and electron spectroscopy techniques and shown to be highly heterogeneous and far thicker than the analogous SEI formed on graphite anodes in lithium-ion batteries (LIBs). In the second stage, Li transport through the SEI produces heterogeneous deposits that lead to the nucleation of dendrites at zones of high conduction. Finally, the passivation layer continuously breaks and reforms by reaction with the electrolyte, promoting continuous growth of the dendrite into a ramified structure with the growth direction determined by the least reactive crystallographic facet of metallic Li.

Citation or identification of any document in this application is not an admission that such a document is available as prior art to the present disclosure.

BRIEF DESCRIPTION OF THE FIGURES

For a fuller understanding of the nature and objects of the disclosure, reference may be made to the following detailed description taken in conjunction with the accompanying figures.

FIG. 1 shows galvanostatic strip-plate measurements of a cross-linked polymer electrolyte (XPE-3k) at a) 40° C., b) 60° C., and c) 90° C. d) Impedance measurements showing bulk and interfacial impedance as a function of temperature. Fitting of raw data reveals higher activation energy for interfacial ion transport. e) Current-overpotential plot measured by cyclic voltammetry of XPE-3k at different temperatures. f) Exchange current density normalized to the current density of operation (blue) and to the limiting current (black) for XPE-3k as a function of temperature.

FIG. 3 shows SEM analysis of lithium nucleation and growth in a commercial separator vs a XPGE-3k network. a) Average nuclei size: 0.96 μm. Nuclei density: 0.27 nuclei/$\mu m^2$. b) Average nuclei size: 0.14 μm. Nuclei density: 5.9 nuclei/$\mu m^2$. c) Average nuclei size: 0.20 μm. Nuclei density: 8.5 nuclei/$\mu m^2$.

FIG. 5 shows rheological responses of cross-linked polymer to dendritic growth. a) Compressive stress as a function of strain for the XPGE networks. B) Cumulative strain experienced by the XPGE networks during dendrite propagation in the visualization experiment.

FIG. 6 shows a) full cell cycling results at a rate of C/5. b) Voltage profiles for the 5th, 20th and 100th cycles. Cells were constructed using a lithium metal anode, XPGE-3k electrolyte, and an NCM 622 cathode previously wetted by a carbonate electrolyte based on EC/DMC with LiTFSI, LiBOB and $LiPF_6$ salts.

DETAILED DESCRIPTION OF THE DISCLOSURE

Figure 2A:
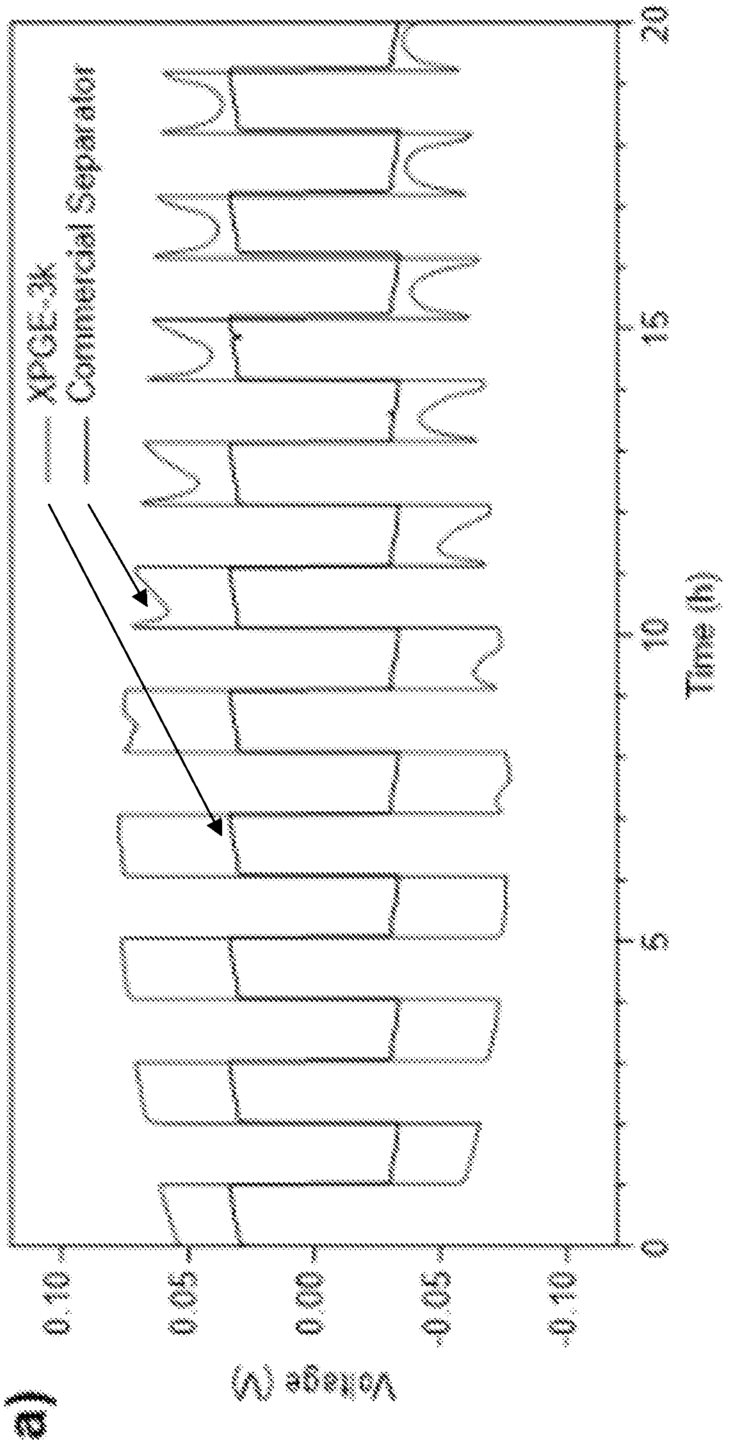
FIG. 2 shows lithium deposition behavior in a cross-linked polymer gel electrolyte (XPGE-3k) network at room temperature (22° C.). a) Magnified profiles in the first 20 hours compared to commercial separator (Celgard 3501). b) Long-term stability of XPGE-3k network. c) XPS analysis of the solid electrolyte interphase (SEI) formed with XPGE-3k against the lithium metal anode. Analysis reveals SEI is mainly formed from the decomposition of LiTFSI and EC/DMC.

Although claimed subject matter will be described in terms of certain examples and embodiments, other examples and embodiments, including examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value).

As used herein, unless otherwise stated, the term "group" refers to a chemical entity that is monovalent (i.e., has one terminus that can be covalently bonded to other chemical species), divalent, or polyvalent (i.e., has two or more termini that can be covalently bonded to other chemical species). The term "group" also includes radicals (e.g., monovalent and multivalent, such as, for example, divalent radicals, trivalent radicals, and the like). Illustrative non-limiting examples of groups include:

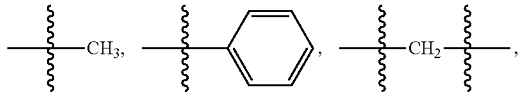

and

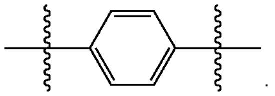

The present disclosure describes solid-polymer electrolytes. The present disclosure also describes methods of making solid-polymer electrolytes and uses of solid-polymer electrolytes.

In an aspect, the present disclosure provides solid-polymer electrolytes. Non-limiting examples of solid-polymer electrolytes are described herein.

A solid-polymer electrolyte comprises a cross-linked polymer network. A cross-linked polymer network may comprise a plurality of groups (e.g., cross-linked groups, such as, for example, difunctional polyether groups (which may be referred to as cross-linked difunctional polyether groups), difunctional ionic groups (which may be referred to as crosslinked ionic groups), and the like, non-crosslinked groups, such as, for example, "dangling" groups, or a combination thereof); and a plurality of multifunctional crosslinker groups (which may be referred to as crosslinked multifunctional groups). Individual difunctional polyether groups and/or individual difunctional ionic groups, and individual multifunctional crosslinker groups are connected (e.g., covalently bonded to another group) by at least one crosslinking group (e.g., comprising a thioether group, such as, for example, a carbon-sulfur bond). A solid-polymer electrolyte may comprise one or more metal salt(s), one or more tethered ionic group(s), or a combination thereof, and/or a liquid electrolyte. A solid-polymer electrolyte may or may not comprise a liquid electrolyte.

A group may be structurally derived from (e.g., formed by) a polymerization reaction involving the respective monomer. In various examples, a cross-linked difunctional polyether group is structurally derived from (e.g., formed from) a difunctional polyether monomer and/or a cross-linked difunctional ionic group is structurally derived from (e.g., formed from) a difunctional ionic monomer and/or a "dangling" group is structurally derived from (e.g., formed from) a "dangling" group monomer and/or a cross-linked multifunctional crosslinker group is structurally derived from (e.g., formed from) a multifunctional crosslinker monomer.

At least a portion of or all of the "dangling" groups may comprise a charged group. In various examples, charged group(s) individually comprise one or more anion(s) and one or more cation(s).

A solid-polymer electrolyte may comprise one or more ion(s) tethered via one or more covalent bond(s) to the polymer network. In various examples, a solid-polymer electrolyte comprises one or more ion(s) tethered via one or more covalent bond(s) to the polymer network via one or more "dangling" group(s).

A solid-polymer electrolyte may further comprise one or more non-crosslinked group(s) (which may be referred to as "dangling" groups) (e.g., groups having at least one terminal group not covalently bound to the cross-linked polymer network) covalently bonded to the cross-linked polymer network via a group comprising a thioether group (e.g., a carbon-sulfur bond). In various examples, a non-crosslinked group is structurally derived from (e.g., formed from) a non-crosslinked group monomer.

A solid-polymer electrolyte may comprise a network of interconnected (covalently crosslinked) polymer chains, which may be entangled polymer chains. A solid-polymer electrolyte may comprise amorphous and/or crystalline domains. In various examples, a solid-polymer electrolyte comprises a network of interconnected (covalently cross-linked) polymer chains, which may be entangled polymer chains, and amorphous and/or crystalline domains.

A solid-polymer network may comprise a plurality of crystalline domains. Without intending to be bound by any particular theory, it is considered that crystalline domains are generally observed for higher molecular weight PEO monomers (e.g., Table 1 of the Example). It may be desirable that the polymer network is predominantly or completely amorphous. A polymer network may comprise a minor amount (e.g., number) of crystalline region(s).

A solid-polymer network may comprise a plurality of crystalline domains and a plurality of amorphous domains. The amount of crystallinity in the material generally depends upon the molecular weight of the polyether monomer used (e.g., at 3,000 g/mol and up, crystalline regions may be observed (e.g., Table 1 of the Example)).

The presence or absence of crystalline domains and/or amorphous domains can be determined by methods known in the art. In various examples, the presence or absence of crystalline domains and/or amorphous domains is determined by differential scanning calorimetry (DSC).

It may be desirable that the solid-polymer electrolyte be predominantly amorphous. In an example, a solid-polymer network does not have any crystalline domains (e.g., no observable domains determined by, for example, microscopy).

A solid-polymer electrolyte may have one or more desirable propert(ies). In various examples, a solid-polymer electrolyte has one or more desirable mechanical propert(ies) (such as, for example, modulus, which may be a storage modulus and/or be 0-5 MPa (e.g., 0-2 MPa), including all integer MPa values and ranges therebetween), low $T_g$(e.g., −60° C. to 0° C., including all 0.1° C. values and ranges therebetween), ionic conductivity (e.g., as a solid-state electrolyte containing a metal salt (such as, for example, LiTFSI) or a gel electrolyte containing a metal salt and liquid electrolyte (such as, for example, LiTFSI and EC/DMC (1:1, v:v)), or a combination thereof.

A solid-polymer electrolyte, which may be a gel electrolyte, may comprise one or more conducting salt(s). Non-limiting examples of conducting salts include metal salts, tetraalkyl ammonium salts, and the like, and combinations thereof. The conducting salt(s) individually comprise one or more conducting cation(s). Non-limiting examples of conducting cations include metal cations, tetraalkyl ammonium ions, and the like, and combinations thereof. In various examples, conducting cations, which may be metal cations, include lithium cations, sodium cations, potassium ions, aluminum ions, magnesium ions, tetraalkyl ammonium ions, and the like, and combinations. Other non-limiting examples of conducting cations include $NR_4^+$, where R is independently a $C_1$ to $C_6$ alkyl group, and the like. Non-limiting examples of conducting salts, which may be metal salts, include triflate salts $M^+/NR_4^{+-}OTf$, carboxylate salts (e.g., $M^+/NR_4^{+-}O_2CF_3$ and the like), hexafluorophosphate salts (e.g., $M^+/NR_4^{+-}PF_6$), tetrafluoroborate salts (e.g., $M^+/NR_4^{+-}BF_4$), perchlorate salts (e.g., $M^{+-}OCl_4$), (trifluoromethanesulfonyl)imide salts ($M^+/NR_4^{+-}N(SO_2CF_3)_2$), $M^+/NR_4^{+-}NR(OS_2F)$ (where R═H, alkyl, aryl, and the like), metal nitrate salts, metal cation/alkylammonium halide salts (e.g., $M^+/NR_4^+Cl$, and the like), and the like, where $M^+$/metal may be $Li^+$, $Na^+$, $K^+$, $Mg^+$, $Al^{+3}$ (in this case the number of single charged anions in the above examples would triple), or the like. In various examples, the conducting salt loading (e.g., metal salt loading or the like), described in terms of the ratio of Lewis basic coordinating groups (O and S) to cation(s) (e.g., $Li^+$, where the ratio would be ([O or S]:[$Li^+$])) ranges from 100:1 to 1:3 (e.g., 15:1 to 25:1, such as, for example, 18:1), including all 0.1 range values and ranges therebetween.

A solid-polymer electrolyte may comprise a liquid electrolyte. In various examples, the liquid electrolyte comprises one or more liquid(s) chosen from carbonates (such as, for example, ethylene carbonate (EC), propylene carbonate (PC), fluorinated ethylene carbonates (e.g., fluoroethylene carbonate (FEC),

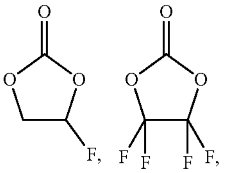

and the like), vinylene carbonate (VC), dimethyl carbonate (DMC), ethyl methyl carbonate (EMC), diethyl carbonate (DEC), 1,2-dimethoxyethane (DME), and the like),

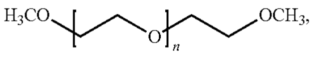

where n is 1, 2, or 3 (e.g., diglyme (DEGDME), tetraglyme (TEGDME), and the like), and the like, and combinations thereof and/or one or more conducting salt(s) (e.g., metal salt(s), tetraalkylammonium salt(s), and the like, and combinations thereof), the conducting salt(s) individually comprising one or more conducting cation(s) (e.g., metal cation(s), tetraalkyl ammonium ion(s), and the like, and combinations thereof), such as, for example, lithium cation, sodium cation, potassium cation, aluminum cation, magnesium cation, ammonium ion, or the like, or a combination thereof). Non-limiting examples of conducting cations include $NR_4^+$, where R is independently a $C_1$ to $C_6$ alkyl group, or the like. Non-limiting examples of conducting salts include $M^+/NR_4^{+-}OTf$, carboxylate salts (e.g., $M^+/NR_4^{+-}O_2CF_3$, $M^+/NR_4^{+-}PF_6$, $M^+/NR_4^{+-}BF_4$, $M^+/NR_4^{+-}OCl_4$, metal cation/alkylammonium nitrate salts, metal cation/alkylammonium nitrate halide salts (e.g., $M^+/NR_4^{+-}Cl$, and the like), and the like, where M/metal is $Li^+$, $Na^+$, $K^+$, $Mg^+$, $Al^{+3}$ (in this case the number of single charged anions in the above examples would triple).

The metal salt(s) may be present at various amounts. In various examples, metal salt(s) is/are present in the composition at a concentration of 0.1 M to 5 M (e.g., in the liquid electrolyte), including all 0.1 M values and ranges therebetween.

In the case where a solid-polymer electrolyte comprises one or more conducting salt(s), which may be metal salt(s), and/or one or more liquid(s), the metal salt(s) and/or liquid(s) may be one or more ionic liquid(s). In various examples, the liquids are chosen from lithium ionic liquids, sodium ionic liquids, potassium ionic liquids, aluminum ionic liquids, magnesium ionic liquids, ammonium ionic liquids, and the like, and combinations thereof. Suitable ionic liquids are known in the art and/or commercially available.

In an aspect, the present disclosure provides methods of making solid-polymer electrolytes. In various examples, a solid-polymer electrolyte is made by a method of the present disclosure. A method may be an ex situ method or an in situ method. Non-limiting examples of methods of making solid-polymer electrolytes are described herein.

A method of making a solid-polymer electrolyte (e.g., a solid-polymer electrolyte of the present disclosure) comprises: forming a reaction mixture including: one or more difunctional polyether monomer(s) (e.g., PEG diallyl ether monomers and the like) (e.g., comprising a polyether group and two reactive groups (e.g., alkenyl(s), alkynyl(s), acryloyl(s), thiol group(s), and the like, and combinations thereof)), and/or one or more difunctional ionic monomer(s) (e.g., comprising one or more ionic group(s) (e.g., one or more anionic group(s)) and two reactive groups (e.g., alkenyl(s), alkynyl(s), acryloyl(s), thiol group(s), and the like, and combinations thereof)) and/or one or more “dangling” group monomer(s) (which may be referred to as non-crosslinking monomer(s) or non-crosslinked monomer(s)) (e.g., comprising one reactive group (e.g., alkenyl, alkynyl, acryloyl, thiol group, and the like); one or more multifunctional crosslinking monomer(s) comprising two or more (e.g., 2, 3, 4, 5, 6, etc.) reactive groups (e.g., alkenyl(s), alkynyl(s), acryloyl(s), thiol group(s), and the like, and combinations thereof); and optionally, one or more solvent(s) (which individually may be a component of a liquid electrolyte). In various examples, the individual monomers have one or more groups that can react with a group on another monomer to form a cross-linking group. In various examples, the reaction mixture comprises at least one difunctional monomer. In various examples, the reaction mixture comprises at least one difunctional ionic monomer. In various examples, the reaction mixture comprises at least one difunctional monomer and at least one difunctional ionic monomer. In various examples, the reaction mixture comprises at least one difunctional monomer and at least one difunctional ionic monomer and at least one non-crosslinking monomer. In various examples, the reaction mixture does not comprise a non-crosslinking monomer. Without intending to be bound by any particular theory, it is considered that the optionally present one or more difunctional polyether monomer(s), the optionally present one or more ionic group monomer(s), the optionally present one or more "dangling" group monomer(s) and/or one or more multifunctional crosslinking monomer(s) react to form the solid-polymer electrolyte. A monomer or monomers may be referred to as precursor or precursors, respectively.

In various examples, the difunctional polyether group monomer(s), the difunctional ionic group monomer(s), and the "dangling" group monomer(s) each individually comprises 0-100% (e.g., % by weight or mol %), including all 0.1% values and ranges therebetween, of the crosslinking monomer(s) and/or non-crosslinking monomer(s), or non-multifunctional crosslinking monomers, and/or the ratio of crosslinking monomer(s) and/or non-crosslinking monomer(s) to non-multifunctional crosslinking monomers is 2:1 to 2:1 (e.g., 1:1, 1.1:1 to 1:1.1, or 1.5:1 to 1:1.5).

In various examples, the difunctional ionic group monomer(s) is/are 100% or the non-crosslinking monomer(s) or 1-50% (by weight based on the total weight of the non-crosslinking monomer(s)) (e.g., 10-50% by weight or 20-50% by weight), including all 0.1% by weight values and ranges therebetween.

Use of "dangling" group monomer(s) (which may be referred to as a non-crosslinked monomer(s) or non-crosslinking monomer(s)) typically provides a solid phase electrolyte with "dangling" groups. "Dangling" groups may be formed by selecting a skewed stoichiometry or selecting the appropriate conditions to result in a lower conversion (e.g., less than 100% conversion). In various examples, for a 1:1 monomer stoichiometry (ratio of difunctional polyether monomer(s) to multifunctional crosslinking monomer(s)), the conversion may be less than 100%.

A "dangling" group monomer may further comprise one or more anionic group(s) (e.g., one or more anionic group(s) covalently bound to a "dangling" group monomer). Such anionic group(s) and their cation(s) may be referred to as tethered ions.

A reaction can be carried out with various monomer conversion. In various examples, the conversion (e.g., reaction of more or all of the monomer(s) (e.g., difunctional polyether monomer(s), one or more difunctional ionic monomer(s), "dangling" group monomer(s), multifunctional crosslinking monomer(s), or a combination thereof)) of the polymerization is 80% or more, 90% or more, 95% or more, 99% or more, or 100%.

Reactant stoichiometry can vary. Reaction stoichiometry is typically 1:1 to 2:1 (e.g., thiol:ene or thiol:alkyne, respectively), including all 0.1 ratio values and ranges therebetween. Without intending to be bound by any particular theory, it is considered thiol:ene ratios in this range provide desirable conversion. Reactant stoichiometry is typically 1:1 thiol:ene or 2:1 thiol:alkyne to maximize functional group conversion. However, reactant stoichiometry may be skewed to create non-crosslinked "dangling" groups without needing to add a monofunctional monomer.

A reaction mixture may comprise one or more polymerization initiator(s). Various polymerization initiators can be used. Combinations of polymerization initiators may be used. Non-limiting examples of polymerization initiators include photoinitiator(s), thermal initiator(s), redox initiator(s), and the like, and combinations thereof. Suitable initiators are described herein. Suitable initiators are also known in the art and/or commercially available. Only a small amount of initiator is typically used (e.g., about 1 mol %).

A reaction may be carried out at various temperatures. In various examples, a reaction is carried out at room temperature or at a temperature of (e.g., heated to a temperature of) 22 to 90° C., including all 0.1° C. values and ranges therebetween.

A reaction may be carried out for various times. The reaction time may depend on factors such as, for example, initiator/initiation efficiency, temperature, intensity of light (in the case of photochemical reactions with or without a photoinitiator), film thickness, or the like, or a combination thereof. In various examples, reaction times range from seconds (e.g., two seconds) to 24 hours, including all integer second values and ranges therebetween.

A method may comprise exposing the reaction mixture to electromagnetic radiation. Without intending to be bound by any particular theory, it is considered that exposing the reaction mixture to electromagnetic radiation initiates the reaction of at least a portion of the one or more difunctional polyether monomer(s) and one or more multifunctional crosslinking monomer(s) and, optionally, one or more non-crosslinking monomer(s). The exposing can be carried out for various lengths of time. In various examples, the exposing is carried out for 2 seconds to 24 hours, including all integer second values and ranges therebetween.

It may be desirable that at least a portion or all of the electromagnetic radiation wavelength(s) are absorbed by the one or more photosensitizer(s) (e.g., photoinititator(s) and the like). Typically, wavelengths of 200 nm to 450 nm are used.

A reaction may be carried out without an initiator. Radical initiation may be carried out in the absence of a photoinitiator by direct irradiation with light, typically in the UV spectrum. Typical irradiation wavelengths are 200 nm to 450 nm. In various examples, a reaction is carried out without an initiator, by heating the reaction mixture and/or using electromagnetic radiation such as, for example, 254 nm light.

It may be desirable or necessary to remove all or substantially all of the solvent(s) (e.g., in the case of solvents, such as, for example, acyclic carbonates, cyclic carbonates, alkyl nitriles (e.g., succinonitrile and the like, or a combination thereof)) from the solid phase electrolyte. In an example, all or substantially all of the solvent(s) are removed from the solid phase electrolyte prior to assembly of a device.

In various examples, polymerization is carried out in the temperature range of 22° C. to 90° C., including all 0.1° C. values and ranges therebetween, in an ambient atmosphere or under an inert atmosphere (e.g., nitrogen, and the like, or a combination of inert gases). Reaction times may vary from a few seconds to 24 hours depending on the initiator efficiency, heat or intensity of light, film thickness, etc.

Stand-alone films may be made. For example, stand-alone films are made by polymerization in a mold where the thickness of the film was defined.

Polymerization can also be carried out directly on an electrode surface (either in an in situ or ex situ method). In various examples, such polymerization is a photochemically or thermally initiated polymerization.

The polymer networks may be made in situ. For example, a polymer network is made in situ using a thermal initiator. A method may be carried out in situ in a device (such as, for example, a battery, a supercapacitor, a fuel cell, or the like) to form a solid phase electrolyte, which may be a gel electrolyte. A method may be carried out to form a solid phase electrolyte on an electrode surface.

In an aspect, the present disclosure provides uses of solid-polymer electrolytes. The solid-polymer electrolytes may be solid-polymer electrolytes of the present disclosure. Non-limiting examples of uses of solid-polymer electrolytes are described herein.

A device may comprise one or more solid-polymer electrolyte(s) of the present disclosure. Non-limiting examples of devices include batteries, supercapacitors, fuel cells, and the like. In the case of a device comprising two or more solid-polymer electrolytes, one or more of the solid-polymer electrolytes may be different (e.g., in terms of one or more compositional feature(s) and/or one or more structural feature(s)) than the other electrolytes or all of the solid-polymer electrolytes may be different (e.g., in terms of one or more compositional feature(s) and/or one or more structural feature(s)). The solid-polymer electrolyte(s) may be formed in situ in the device.

A solid-polymer electrolyte may be formed in situ in a device. A device may comprise a composition that reacts in situ in a device to form a solid-polymer electrolyte. A composition may comprise, optionally, one or more difunctional polyether monomer(s), one or more multifunctional crosslinking monomer(s), optionally, one or more difunctional ionic monomer(s), optionally, one or more non-crosslinked ("dangling" group) monomer(s), and, optionally, one or more solvent(s). In various examples, the individual monomers have one or more groups that can react with a group on another monomer to form a cross-linking group. In various examples, the composition comprises at least one difunctional monomer. In various examples, the composition comprises at least one difunctional ionic monomer. In various examples, the composition comprises at least one difunctional monomer and at least one difunctional ionic monomer. In various examples, the composition comprises at least one difunctional monomer and at least one difunctional ionic monomer and at least one non-crosslinking monomer. In various examples, the composition does not comprise a non-crosslinking monomer. Without intending to be bound by any particular theory, it is considered that one or more difunctional polyether monomer(s) have at least two reactive groups (or all the reactive groups) that react with at least two reactive groups (or all the reactive groups) of the one or more multifunctional crosslinking monomer(s) to form at least two crosslinking groups, each crosslinking group comprising a thioether group (e.g., a carbon-sulfur bond), and the one or more difunctional polyether monomer(s) and one or more multifunctional crosslinking monomer(s) and, optionally, one or more non-crosslinked ("dangling" group) monomer(s) react to form the solid-polymer electrolyte. A composition may comprise one or more polymerization initiator(s), one or more conducting salt(s) (e.g., lithium salt(s), sodium salt(s), potassium salt(s), aluminum salt(s), magnesium salt(s), ammonium salt(s), or the like, or a combination thereof). A composition may further comprise a liquid, which may be a component of a liquid electrolyte.

A device may be a battery. A battery may be an ion-conducting battery. In various examples, a battery also comprises: a cathode; an anode; optionally, a separator, a current collector, where the solid-polymer electrolyte, and, if present, the separator, is disposed between the cathode and anode.

Various cathode materials can be used. Suitable cathode materials are known in the art and are commercially available. Non-limiting examples of lithium-containing cathode materials include $LiCoO_2$, $LiFePO_4$, $Li_2MMn_3O_8$, where M is selected from Fe, Co, and combinations thereof, $LiMn_2O_4$, $LiNiCoAlO_2$, $LiNi_xMn_yCoO_2$, where x+y+z=1 (e.g., 0.5:0.3:0.2), and the like, and combinations thereof. Non-limiting examples of sodium-containing cathode materials include $Na_2V_2O_5$, P2-$Na_{2/3}Fe_{1/2}Mn_{1/2}O_2$, $Na_3V_2(PO_4)_3$, $NaMn_{1/3}Co_{1/3}Ni_{1/3}PO_4$, and $Na_{2/3}Fe_{1/2}Mn_{1/2}O_2$@graphene composite, and the like, and combinations thereof. Non-limiting examples of magnesium-containing cathode materials include doped manganese oxides, and combinations thereof, and the like, and combinations thereof.

Various anode materials can be used. Suitable anode materials are known in the art and are commercially available. Non-limiting examples of lithium-ion conducting anode materials include lithium titanate ($Li_4Ti_5O_{12}$), and the like, and combinations thereof.

A device may comprise a liquid electrolyte. Non-limiting examples of liquid electrolytes include $LiPF_6$ in EC/DMC, LiTFSI in EC/DMC, and the like.

The following Statements are examples of solid-polymer electrolytes, methods of making solid-polymer electrolytes, and devices of the present disclosure:

Statement 1. A solid-polymer electrolyte comprising a cross-linked polymer network comprising: a plurality of groups chosen from cross-linked difunctional polyether groups, cross-linked difunctional ionic groups, "dangling" group(s), and combinations thereof, and a plurality of cross-linked multifunctional crosslinker groups, where individual cross-linked difunctional polyether groups and/or individual cross-linked difunctional ionic groups(s) and individual cross-linked multifunctional crosslinker groups are connected (e.g., covalently bonded) by at least one crosslinking group comprising a thioether group (e.g., a carbon-sulfur bond).

Statement 2. A solid-polymer electrolyte according to Statement 1, where the solid-polymer electrolyte further comprises one or more non-crosslinked group(s) (which may be referred to as "dangling" groups) (e.g., groups having at least one terminal group not covalently bound to the cross-linked polymer network) covalently bonded to the cross-linked polymer network via a group comprising a thioether group (e.g., a carbon-sulfur bond).

Statement 3. A solid-polymer electrolyte according to Statement 1 or 2, where the solid-polymer electrolyte has a $M_x$ (a molecular weight between crosslinks) of 44-10,000 g/mol, including all 0.1 g/mol values and ranges therebetween.

Statement 4. A solid-polymer electrolyte according to any one of the preceding Statements, where the solid-polymer of the solid-polymer electrolyte comprises amorphous and/or crystalline domains (e.g., as determined by differential scanning calorimetry (DSC)).

Statement 5. A solid-polymer electrolyte according to any one of the preceding Statements, where the solid-polymer electrolyte, which may be a gel electrolyte, comprises one or more conducting salt(s) (e.g., metal salt(s), tetraalkyl ammonium salt(s), and the like, and combinations thereof), the conducting salt(s) individually comprising one or more conducting cation(s) (e.g., metal cation(s), tetraalkyl ammonium ion(s), and the like, and combinations thereof), such as, for example, lithium cation(s), sodium cation(s), potassium ion(s), aluminum ion(s), magnesium ion(s), tetraalkyl ammonium ion(s), or the like, or a combination thereof.

Statement 6. A solid-polymer electrolyte according to any one of Statements 1-4, where the solid-polymer electrolyte further comprises a liquid electrolyte and, optionally, a metal salt. Such a solid-polymer electrolyte may be a gel electrolyte.

Statement 7. A solid-polymer electrolyte according to Statement 6, where the liquid electrolyte comprises one or more liquid(s) chosen from carbonates (such as, for example, ethylene carbonate (EC), propylene carbonate (PC), fluorinated ethylene carbonates (e.g., fluoroethylene carbonate (FEC),

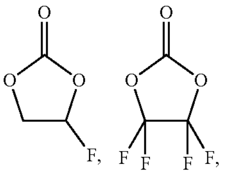

and the like), vinylene carbonate (VC), dimethyl carbonate (DMC), ethyl methyl carbonate (EMC), diethyl carbonate (DEC), 1,2-dimethoxyethane (DME), and the like),

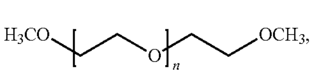

where n is 1, 2, or 3 (e.g., diglyme (DEGDME), tetraglyme (TEGDME), and the like), and the like, and combinations thereof and/or one or more conducting salt(s) (e.g., metal salt(s), tetraalkylammonium salt(s), and the like, and combinations thereof), the conducting salt(s) individually comprising one or more conducting cation(s) (e.g., metal cation(s), tetraalkyl ammonium ion(s), and the like, and combinations thereof), such as, for example, lithium cation, sodium cation, potassium cation, aluminum cation, magnesium cation, ammonium ion, or the like, or a combination thereof).

Statement 8. A solid-polymer electrolyte according to any one of Statements 5-7, where one or more of the metal salt(s) and/or one or more of the liquid(s) is an ionic liquid (e.g., a lithium ionic liquid, a sodium ionic liquid, a potassium ionic liquid, an aluminum ionic liquid, a magnesium ionic liquid, an ammonium ionic liquid, or the like, or a combination thereof).

Statement 9. A solid-polymer electrolyte according to Statement 8, where the anions of the ionic liquid are sulfonamide anions, sulfonimide anions, sulfate anions, phosphate anions, carboxylate anions, or the like, or a combination thereof.

Statement 10. A solid-polymer electrolyte according to any one of Statements 5-9, where the metal salt(s) is/are present in the composition at a concentration of 0.1 M to 5 M (e.g., in the liquid electrolyte), including all 0.1 M values and ranges therebetween.

Statement 11. A method of making a solid-polymer electrolyte (e.g., a solid-polymer electrolyte according to any one of Statements 1-10) comprising: forming a reaction mixture comprising: optionally, one or more difunctional polyether monomer(s) (e.g., PEG diallyl ether monomers, and the like) comprising a polyether group and two reactive groups chosen from alkenyls, alkynyls, acryloyls, thiol groups, and the like, and combinations thereof, optionally, one or more difunctional ionic monomer(s) comprising one or more ionic group(s) (such as, for example, anionic group(s)) and two reactive groups chosen from alkenyls, alkynyls, acryloyls, thiol groups, and the like, and combinations thereof, optionally, one or more non-crosslinked monomer(s) (which may be referred to as "dangling" group monomer(s)) and comprising one or more reactive groups chosen from alkenyls, alkynyls, acryloyls, thiol groups, and the like, and combinations thereof, one or more multifunctional crosslinking monomer(s) comprising two or more (e.g., 2, 3, 4, 5, 6, etc.) reactive groups chosen from alkenyls, alkynyls, acryloyls, thiol groups, and the like, and combinations thereof, and optionally, one or more solvent(s), where one or more difunctional polyether monomer(s) and one or more difunctional ionic group monomer(s) have at least two reactive groups that react with at least two reactive groups (or all the reactive groups) of the one or more multifunctional crosslinking monomer(s) to form at least two crosslinking groups, each crosslinking group comprising a thioether group (e.g., a carbon-sulfur bond), and the one or more difunctional polyether monomer(s) groups and one or more multifunctional crosslinking monomer(s) and, optionally, one or more "dangling" group monomer(s) react to form the solid-polymer electrolyte.

Statement 12. A method according to Statement 11, where the reaction mixture is carried out at room temperature or at a temperature of (e.g., heated to a temperature of) 22 to 90° C., including all 0.1° C. values and ranges therebetween, and/or the reaction is carried out for 2 seconds to 24 hours, including all integer second values and ranges therebetween.

Statement 13. A method according to Statement 11 or 12, where the reaction mixture further comprises one or more polymerization initiator(s) (such as, for example, photoinitiator(s), thermal initiator(s), redox initiator(s), and the like, and combinations thereof).

Statement 14. A method according to statement 13, where the initiators are photoinitiator(s) chosen from alpha hydroxy ketones (e.g.,

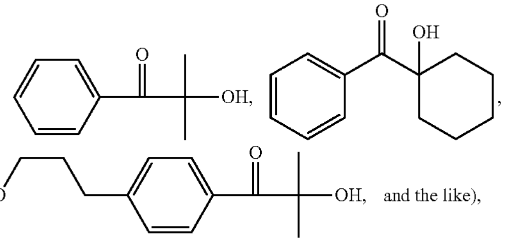

and the like), alpha amino ketones (e.g.,

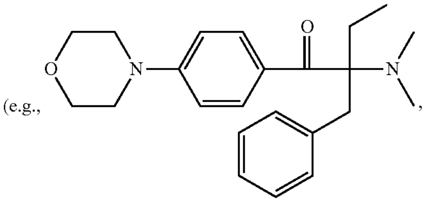

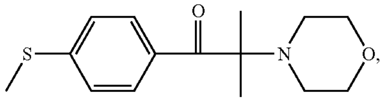

and the like), phenyl glyoxolates (e.g.,

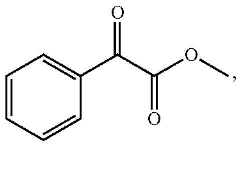

, and the like), benzylmethyl ketone, diaryl ketones (e.g., 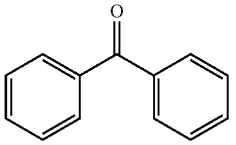 and the like), aryl diketones (e.g., 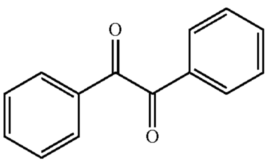 and the like), acyl phosphine oxides (e.g., 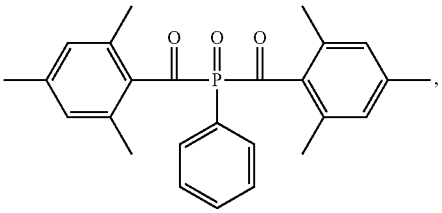

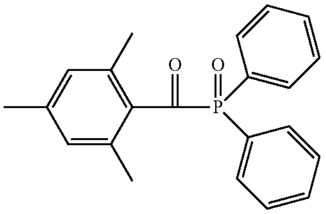 and the like), 3-ketocoumarins, arylalkylketones, benzoin ethers, thioxanthones, quinones, hexaarylbiimidazoyls, oximes, and the like, and combinations thereof, thermal initiator(s) chosen from diazoinitiators (e.g., R—N═N—R, where R is independently

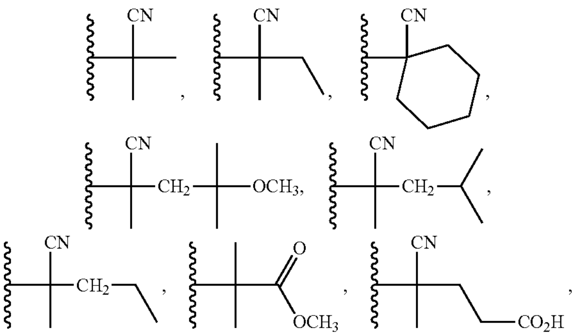

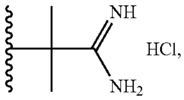 HCl, 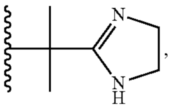

-continued

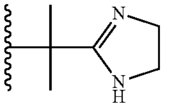 HCl, 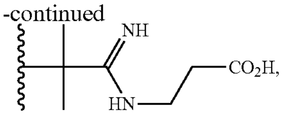 or

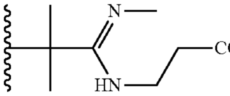 or the like), and the like, and combinations thereof, peroxide(s), which may be symmetrical peroxide(s), (e.g., R—O—O—R, where R is independently

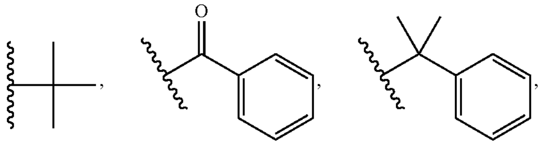

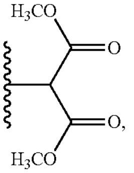 or 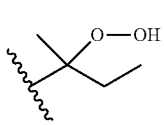 or the like,

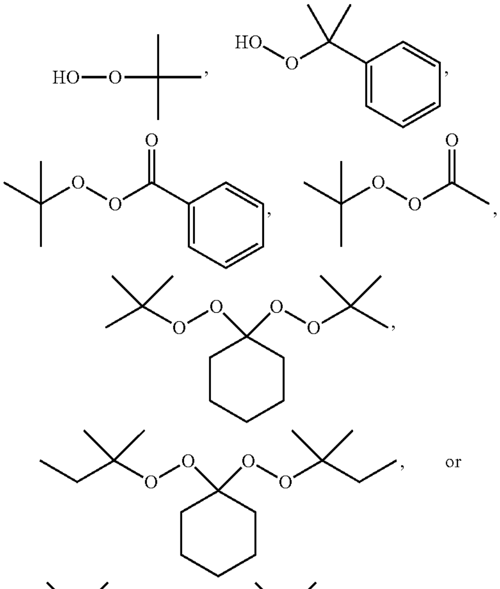 or

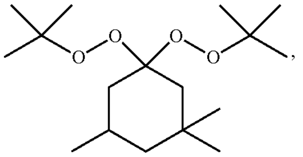 or the like), and the like, and combinations thereof, redox initiator(s) chosen from peroxomonosulfates, peroxodisulfates, metal ion oxidants (e.g., Mn(III) compounds, Mn(VII) compounds, Ce(IV) compounds, Fe(II) compounds, Fe(III) compounds, Co(III) compounds, and the like), and the like, and combinations thereof, or a combination thereof.

Statement 15. A method according to Statement 13 or 14, where the method further comprises exposing the reaction mixture to electromagnetic radiation to initiate the reaction of the one or more difunctional polyether monomer(s) and one or more multifunctional crosslinking monomer(s) and, optionally, one or more non-crosslinked monomer(s) and/or the reaction is carried out 2 seconds to 24 hours.

Statement 16. A method according to any one of Statements 11-15, where the one or more difunctional polyether monomer(s), if present, is/are chosen from:

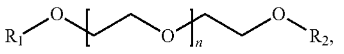

where n is 0 to 250 (e.g., 1 to 250) (e.g., $M_x$ is 44 to 10,000 g/mol), and $R_1$ is independently chosen from alkenyl (which may be alkyl, alkenyl, alkynyl (which may be alkyl alkenyl), acryloyl, and thiol groups (examples of thiol groups include, but are not limited to, acylthiol groups (e.g., 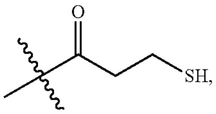

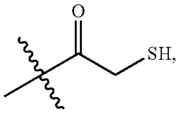 and the like), alkylthiol groups (e.g., 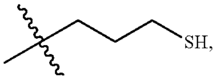

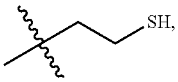 and the like), and the like), and the like)

(examples of alkenyl groups include, but are not limited to, alkyl alkenyl groups (e.g., 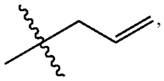

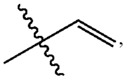 and the like), alkyl alkynyl groups (e.g., 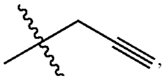

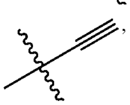 and the like), acryloyl groups (e.g.,

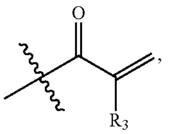

where $R_3$ is independently H or an alkyl group, and the like), cycloalkenyl alkenyls (e.g., 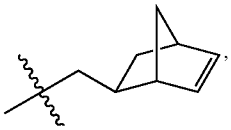 and the like), and $R_2$ is a group chosen from those described for $R_1$ and non-reactive groups (such as, for example, alkyl groups (e.g., methyl, ethyl, and the like)).

$R_2$ may be the same as or different than $R_1$, and/or the one or more difunctional ionic monomer(s), if present, is/are chosen from:

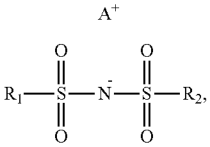

where $A^+$ is a cation (e.g., $M^+$, such as, for example, $Li^+$, $Na^+$, $K^+$, $Mg^+$, $Al^{+3}$ (in this case the number of singlecharged anions in the above examples would triple) and the like, or $NR_4^+$, where R is independently a $C_1$ to $C_6$ alkyl group, or the like, or a combination thereof), where $R_1$ and $R_2$ are independently chosen from

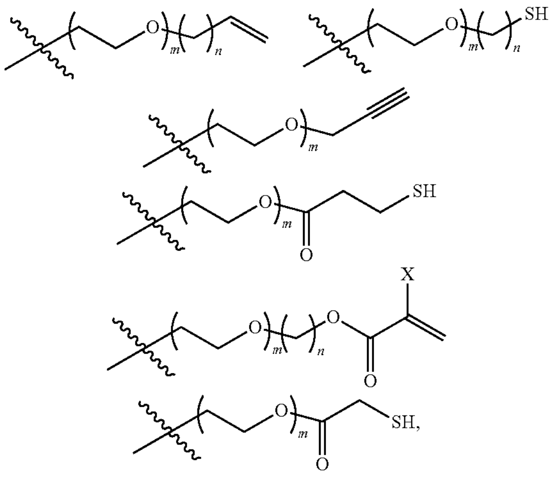

where n is 0 to 20 (e.g., 0, 1, 2, 1 to 10, 1 to 20, or 2 to 20), including all integer values and ranges therebetween, m is 0 to 250 (e.g., 1 to 250), including all integer values and ranges therebetween, and x is H or methyl.

Statement 17. A method according to any one of Statements 11-16, where the one or more multifunctional crosslinking monomer(s) is/are chosen from multifunctional triazinanyl crosslinking monomer(s)

(e.g., 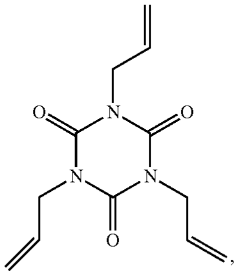 , and the like), multifunctional trialkyl isocyanurate crosslinking monomer(s)

(e.g., 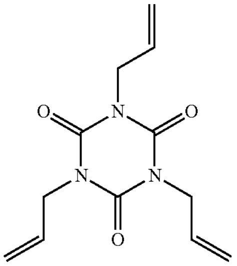 and the like), multifunctional triazinyl crosslinking monomer(s) (e.g.,

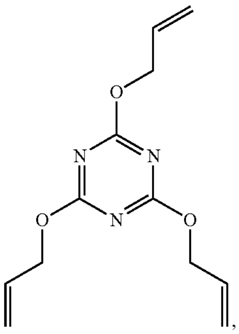 [SMILES: C=CCOc1nc(OCC=C)nc(OCC=C)n1]

and the like, and combinations thereof.

The multifunctional triazinanyl crosslinking monomer(s), multifunctional 2,4,6-trione triazinanyl crosslinking monomer(s), or multifunctional triazinyl crosslinking monomer(s) may have alkenyls (e.g., allyl groups, which may be allyl ether groups) on one or more N and/or one or more carbons of the triazinanyl or triazine ring.

Statement 18. The method according to any one of Statements 11-16, where the multifunctional polyether crosslinking monomer(s) is/are chosen from:

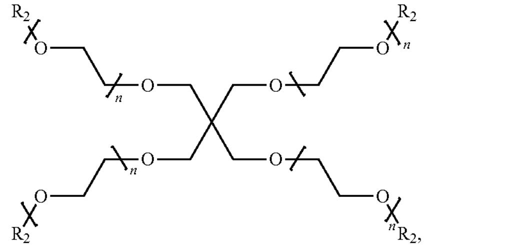

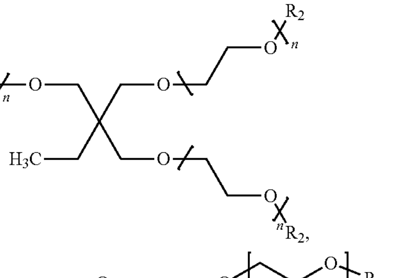

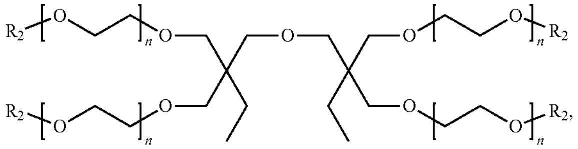

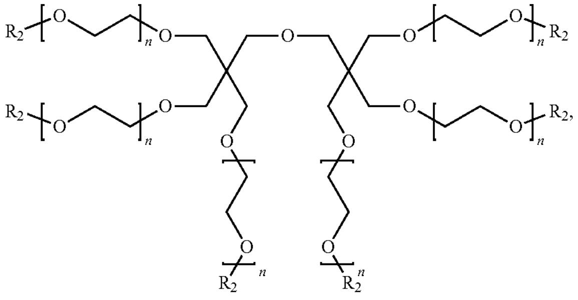

and combinations thereof, where n is 0 to 250 (e.g., 1 to 250), including all integer values and ranges therebetween, and $R_2$ is independently chosen from thiol groups and alkenyl groups (examples of thiol groups include, but are not limited to, acylthiol groups (e.g., 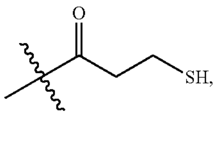 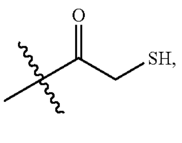 and the like), alkylthiol groups (e.g., 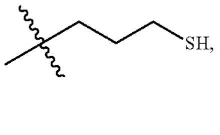 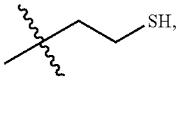 and the like), and the like), and the like)

(examples of alkenyl groups include, but are not limited to, alkyl alkenyl groups (e.g., 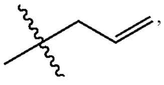, 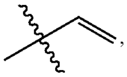, and the like), alkyl alkynyl groups (e.g., 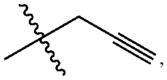, 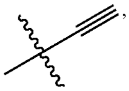, and the like), acryloyl groups (e.g.,

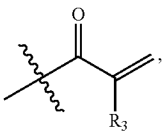, where $R_3$ is independently H or an alkyl group, and the like), cycloalkenyl alkenyls (e.g., 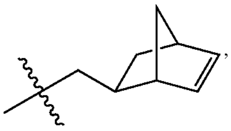, and the like).

Statement 19. A method according to any one of Statements 11-18, where the one or more non-crosslinking ("dangling" group) monomer(s) is/are chosen from:

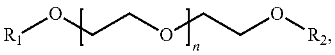, where n is 0 to 250 (e.g., 1 to 250) (e.g., $M_x$ is 44 to 10,000 g/mol), including all integer values and ranges therebetween, and $R_1$ is independently chosen from thiol groups and alkenyl groups (examples of thiol groups include, but are not limited to, acylthiol groups (e.g., 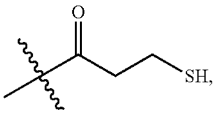, 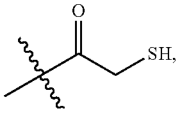, and the like), alkylthiol groups (e.g., 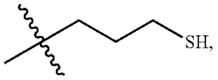, 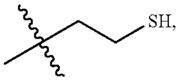, and the like), and the like), and the like) (examples of alkenyl groups include, but are not limited to alkyl alkenyl groups (e.g., 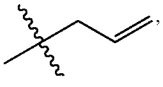, 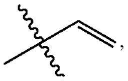, and the like), alkyl alkynyl groups (e.g., 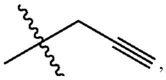, 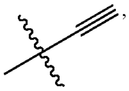, and the like), acryloyl groups (e.g.,

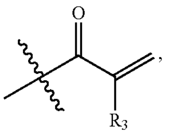, where $R_3$ is independently H or an alkyl group, and the like), cycloalkenyl alkenyls (e.g., 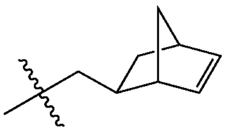, and the like), and $R_2$ is independently chosen from thiol groups, alkenyl groups, alkynyl groups, acryloyl groups, and the like,

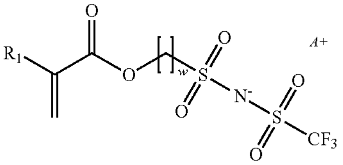

where $R_1$ is independently chosen from H and alkyl groups, w is 1-20 (e.g., 1 to 10 or 2 to 20), including all integer values and ranges therebetween), and $A^+$ is a cation (e.g., $M^+$, such as, for example, $Li^+$, $Na^+$, $K^+$, $Mg^+$, $Al^{+3}$ (in this case the number of single charged anions in the above examples would triple), and the like, or $N(R)_4^+$, where R is independently a $C_1$ to $C_6$ alkyl group, or the like), and

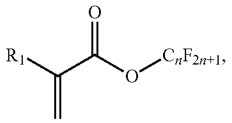

where $R_1$ is independently chosen from H and alkyl groups, n is 1 to 10, and the like, and combinations thereof.

Statement 20. A method according to any one of Statements 11-19, where the solvent is independently chosen from liquids, which may be a component of a liquid electrolyte, such as, for example, acyclic or cyclic carbonates (such as, for example, ethylene carbonate (EC), propylene carbonate (PC), fluorinated ethylene carbonates (e.g., fluoroethylene carbonate (FEC),

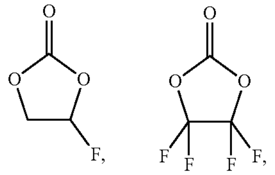 [SMILES: O=C1OCC(F)O1 ; O=C1OC(F)(F)C(F)(F)O1]

and the like), vinylene carbonate (VC), dimethyl carbonate (DMC), ethyl methyl carbonate (EMC), diethyl carbonate (DEC), 1,2-dimethoxyethane (DME), and the like),

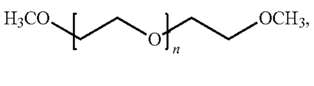

where n is 1, 2, or 3 (e.g., diglyme (DEGDME), tetraglyme (TEGDME), and the like), and the like, alkyl nitriles (e.g., succinonitrile, acetonitrile, and the like), and the like and combinations thereof, and the like, and combinations thereof.

Statement 21. A method according to any one of Statements 11-20, where the forming a reaction mixture comprises: forming the reaction mixture in (or introducing the reaction mixture into) a space (e.g., an interior space) between the cathode and anode (e.g., in an interior space of a device, such as, for example, a battery, supercapacitor, or the like); and allowing the composition to polymerize and/or polymerizing the monomers to form the cross-linked polymer network, where the cross-linked polymer network partially or completely fills the space and/or is in electrical contact with the anode and/or cathode and the conversion of reactive functional groups required to reach the gel point ($P_{gel}$) is achieved.

Statement 22. A solid-polymer electrolyte, where the solid-polymer of the solid-polymer electrolyte is made by a method of any one of Statements 11-21.

Statement 23. A device comprising one or more solid-polymer electrolyte(s) according to any one of Statements 1-10 and/or one or more solid-polymer electrolyte(s) according to Statement 22.

Statement 24. A device comprising: a solid-polymer electrolyte formed from a composition comprising: one or more difunctional polyether monomer(s) comprising a polyether group and two reactive groups chosen from alkenyls, alkynyls, acryloyl, thiol groups, and the like, and combinations thereof; one or more multifunctional crosslinking monomer(s) comprising two or more (e.g., 2, 3, 4, 5, etc.) reactive groups chosen from alkenyls, alkynyls, acryloyl, thiol groups, and the like, and combinations thereof; optionally, one or more non-crosslinked ("dangling" group) monomer(s) comprising one or more reactive groups chosen from alkenyls, alkynyls, acryloyl, thiol groups, and the like, and combinations thereof; and optionally, one or more solvent(s), where one or more difunctional polyether monomer(s) have at least two reactive groups (or all the reactive groups) that react with at least two reactive groups (or all the reactive groups) of the one or more multifunctional crosslinking monomer(s) to form at least two crosslinking groups, each crosslinking group comprising a thioether group (e.g., a carbon-sulfur bond), and the one or more difunctional polyether monomer(s) and one or more multifunctional crosslinking monomer(s) and, optionally, one or more non-crosslinked ("dangling" group) monomer(s) react to form the solid-polymer electrolyte.

Statement 25. A device according to Statement 24, where the composition further comprises a polymerization initiator (e.g., a polymerization initiator according to any one of Statements 13 or 14).

Statement 26. A device according to Statement 24 or 25, where the composition further comprises a lithium salt, a sodium salt, a potassium salt, an aluminum salt, a magnesium salt, an ammonium salt, or the like, or a combination thereof.

Statement 27. A device according to any one of Statements 24-26, where the composition further comprises a liquid, which may be a component of a liquid electrolyte, chosen from acyclic or cyclic carbonates (such as, for example, ethylene carbonate (EC), propylene carbonate (PC), fluorinated ethylene carbonates (e.g., fluoroethylene carbonate (FEC),

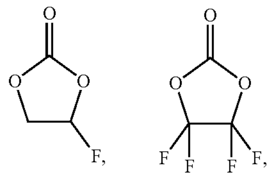 [SMILES: O=C1OCC(F)O1 ; O=C1OC(F)(F)C(F)(F)O1]

and the like), vinylene carbonate (VC), dimethyl carbonate (DMC), ethyl methyl carbonate (EMC), diethyl carbonate (DEC), 1,2-dimethoxyethane (DME), and the like),

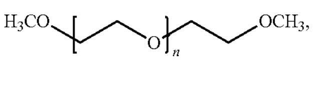

where n is 1, 2, or 3 (e.g., diglyme (DEGDME), tetraglyme (TEGDME), and the like), and the like, alkyl nitriles (e.g., succinonitrile, acetonitrile, and the like), and the like and combinations thereof.

Statement 28. A device according to any one of Statements 23-27, where the device is a battery (e.g., an ion-conducting battery), a supercapacitor, a fuel cell, or the like.

Statement 29. A device according to Statement 28, where the battery is a primary battery, secondary battery, or the like.

Statement 30. A device according to any one of Statements 23-29, where the solid-polymer electrolyte comprises a network of interconnected (covalently crosslinked) polymer chains, which may be entangled polymer chains.

Statement 31. A device according to any one of Statements 23-30, where the solid-polymer electrolyte comprises amorphous and/or crystalline domains.

Statement 32. A device according to any one of Statements 23-31, where device is a battery and the battery further comprises: a cathode; an anode; optionally, a separator, current collector, where the solid-polymer electrolyte, and, if present, the separator, is disposed between the cathode and anode.

Statement 33. A device according to Statement 32, where the device is a lithium-ion conducting solid-state battery and the polymeric material of the solid-polymer electrolyte is a lithium-ion conductor.

Statement 34. A device according to Statement 33, where the cathode comprises a material chosen from lithium-containing cathode materials.

Statement 35. A device according to Statement 33 or 34, where the anode comprises a material chosen from lithium metal, lithium-ion conducting anode materials, and combinations thereof.

Statement 36. A device according to Statement 32, where the device is a sodium-ion conducting solid-state battery and the polymeric material is a sodium-ion conductor.

Statement 37. A device according to Statement 36, where cathode comprises a material chosen from sodium-containing cathode materials and conversion type cathode materials.

Statement 38. A device according to Statement 36 or 37, where the anode comprises a material chosen from sodium metal, sodium-ion conducting anode materials, and combinations thereof.

Non-limiting examples of sodium-containing anode materials include $Na_2C_8H_4O_4$, $Na_{0.66}Li_{0.22}Ti_{0.78}O_2$, and the like, and combinations thereof.

Statement 39. A device according to Statement 32, where the device is a magnesium-ion conducting solid-state battery and the polymeric material is a magnesium-ion conductor.

Statement 40. A device according to Statements 38, where cathode comprises a material chosen from magnesium-containing cathode materials.

Statement 41. A device according to Statement 38 or 39, where the anode comprises a material chosen from magnesium metal, magnesium-ion conducting anode materials, and combinations thereof. Non-limiting examples of magnesium-containing anode materials include $Mg_2Si$, and the like, and combinations thereof.

Statement 42. A device according to any one of Statements 23-32, 33, 36, or 39, where the cathode and/or anode comprises a conducting carbon material and a cathode material.

Statement 43. A device according to any one of Statements 23-32, 33, 36, 39, or 42, where the cathode comprises a conversion type material chosen from sulfur, sulfur composite materials, polysulfide materials, air, iodine, metal sulfides, and the like, and combinations thereof.

Statement 44. A device according to any one of Statements 23-32, 33, 36, 39, 42, or 43, where the anode comprises a material chosen from metals (e.g., lithium metal, sodium metal, potassium metal, magnesium metal, aluminum metal, and the like), silicon-containing materials, tin and its alloys, tin/carbon, phosphorus, organic electrodes, and the like, and combinations thereof.

Statement 45. A device according to any one of Statements 23-44, where the device further comprises a liquid electrolyte, which is in contact with the solid-polymer electrolyte.

Statement 46. A device according to any one of Statements 32-42, where the solid-polymer electrolyte, cathode, anode, and, optionally, the current collector form a cell, and the battery comprises a plurality of the cells and each adjacent pair of the cells is separated by a bipolar plate.

The steps of the method described in the various examples disclosed herein are sufficient to carry out the methods of the present disclosure. Thus, in an example, a method consists essentially of a combination of the steps of the methods disclosed herein. In another example, a method consists of such steps.

The following example is presented to illustrate the present disclosure. The examples are not intended to be limiting in any manner.

EXAMPLE

This example describes examples of solid phase electrolytes and synthesis and characterization and use of same.

In this Example, lithium electrodeposition was investigated in uniformly porous, nanostructured media formed in cross-linked poly(ethylene oxide) polymer networks enabled by thiol-ene click chemistry. Using galvanostatic strip-plate experiments along with scanning electron microscopy and operando visualization techniques, the effectiveness of these materials in enabling uniform, planar deposition of lithium was critically assessed. The thiol-ene click networks that host a liquid electrolyte in their pores are more effective than their liquid electrolyte or solid polymer network components in regulating Li deposition at both the nucleation and growth phases. It was shown further that compressive interfacial stresses imparted by the networks during electrodeposition may serve to augment surface tension to enable uniform Li electrodeposition. The application of the electrolytes was demonstrated in full-cell battery configurations with desirable long-term stability.

Thiol-ene chemistry was used to cross-link macromonomers based on poly(ethylene oxide) (PEO) to create novel solid-state polymer electrolyte materials with exceptional electrochemical stability when in contact with a Li metal anode. Through simple adjustments of the synthesis conditions, it was shown further that it is possible to manipulate the network pore size over a broad range, allowing precise evaluation of the effectiveness of the materials in preventing dendrite proliferation through in situ galvanostatic visualization experiments. The results show that cross-linked polymer membranes are desirable electrolytes, when used either as dry/solvent-free electrolytes or as a gel host for a liquid electrolyte. Finally, the feasibility of these networks for high-voltage lithium metal batteries was demonstrated for broader applications.

Figure 7:
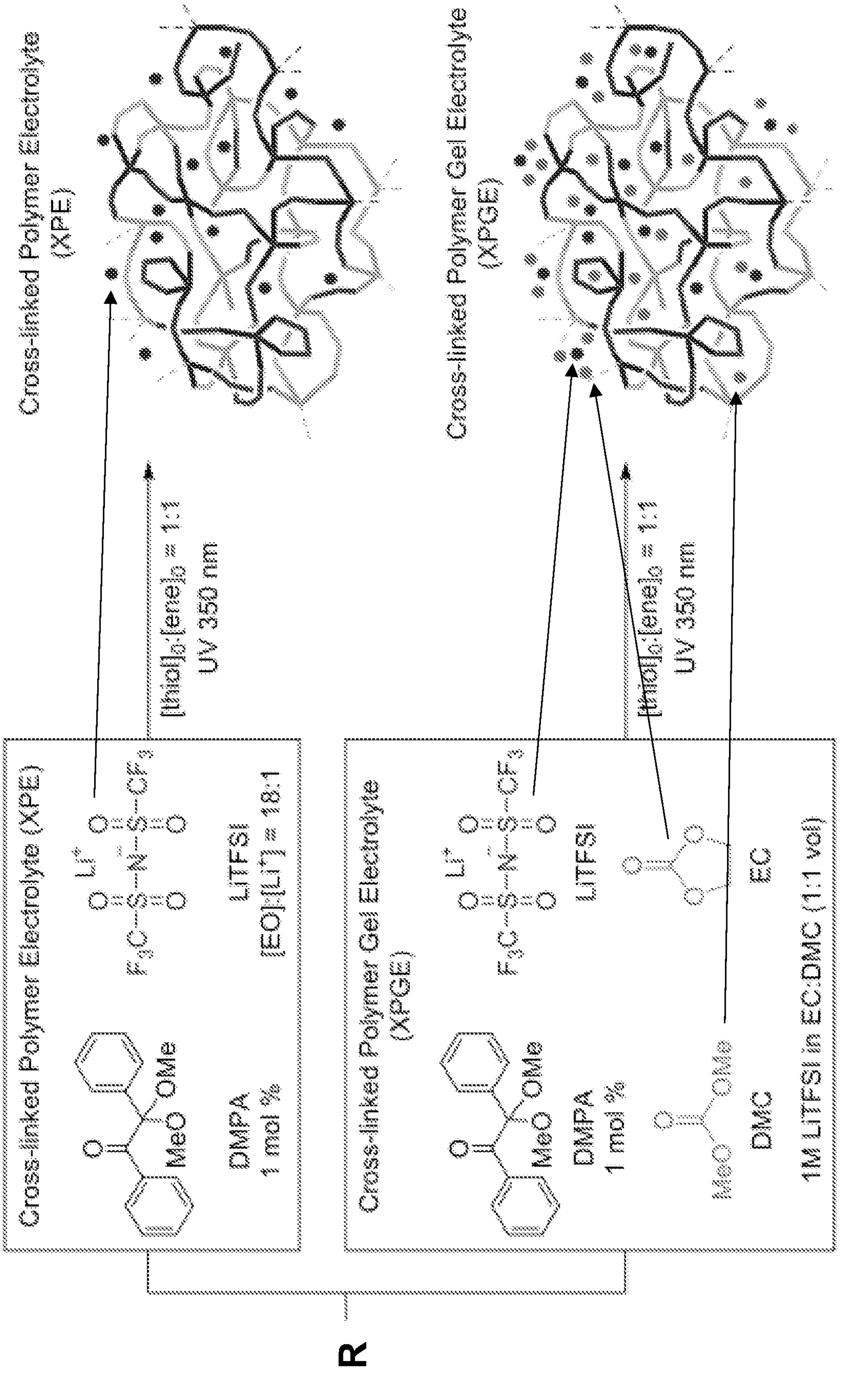
FIG. 7 shows synthesis of examples of cross-linked polymer electrolytes of the present disclosure.
Figure 8A:
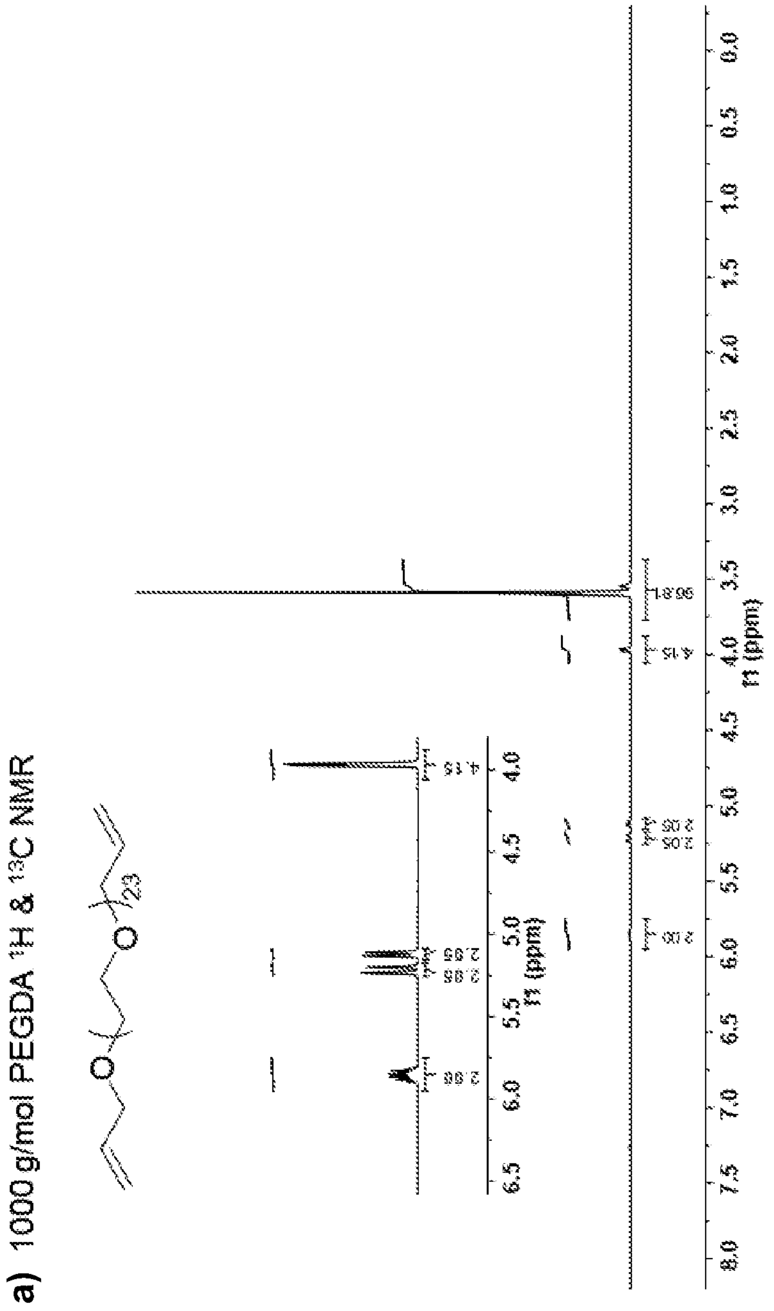
FIG. 8 shows representative $^1H$ NMR Spectrum (500 MHz, $CDCl_3$) and $^{13}C$ NMR Spectrum (125 MHz, $CDCl_3$) of PEG diallyl ether (PEGDAE). a) 1000 g/mol PEGDAE. $M_{n\ nmr}$=1065 g/mol. b) 3000 g/mol PEGDAE. $M_{n\ nmr}$=3300 g/mol. c) 5000 g/mol PEGDAE. $M_{n\ nmr}$=5020 g/mol.
Figure 8A:
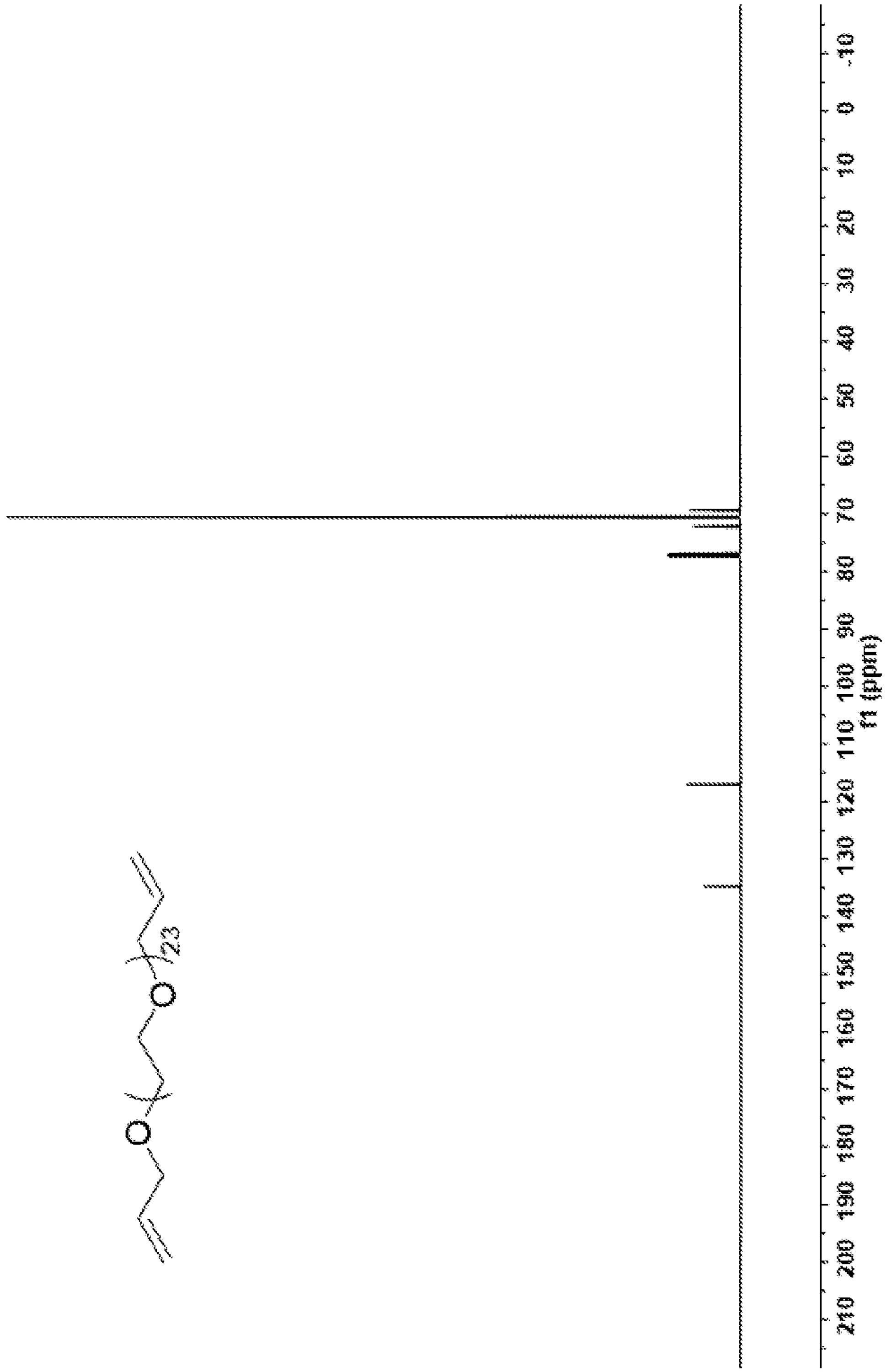
Figure 8B:
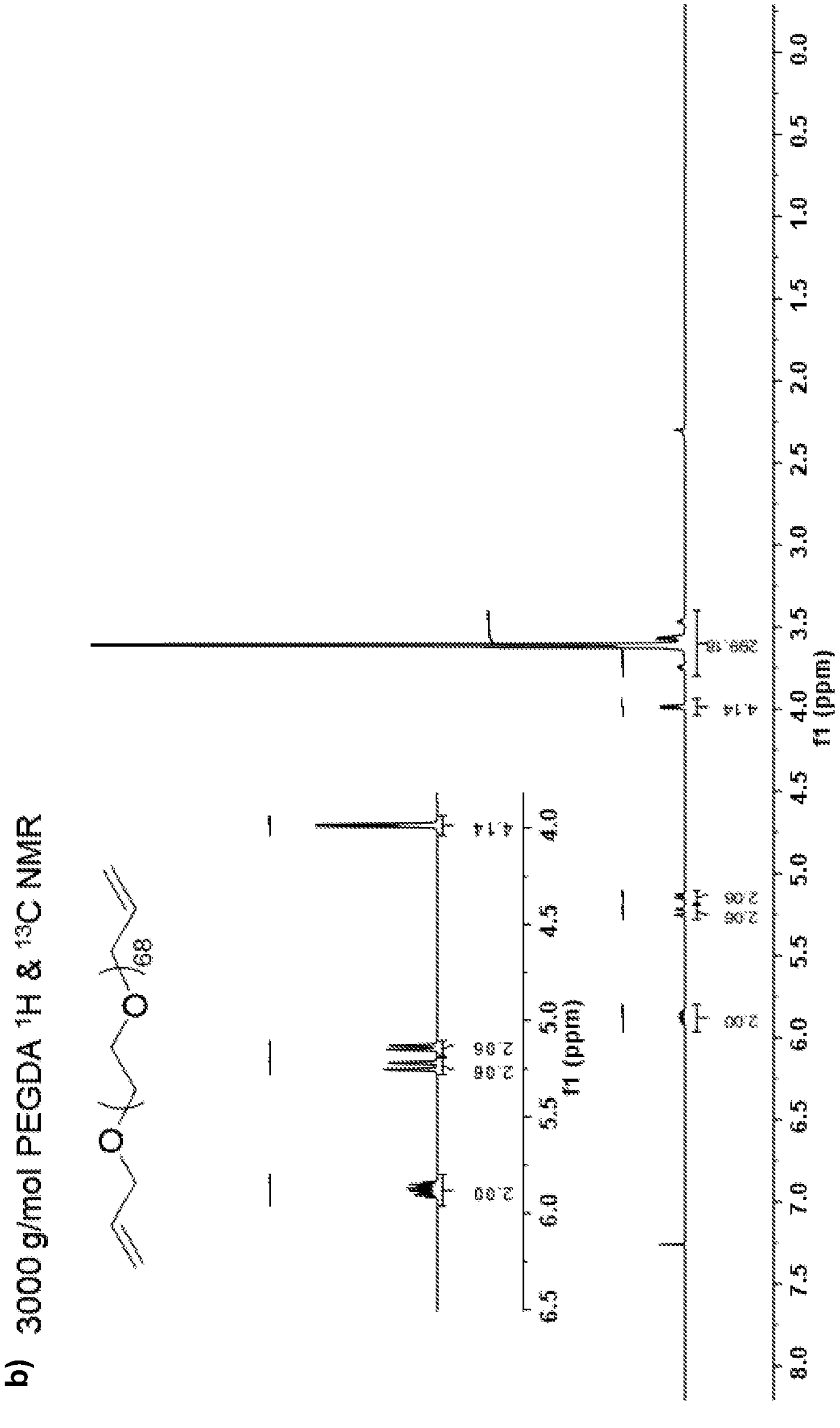
Figure 8B:
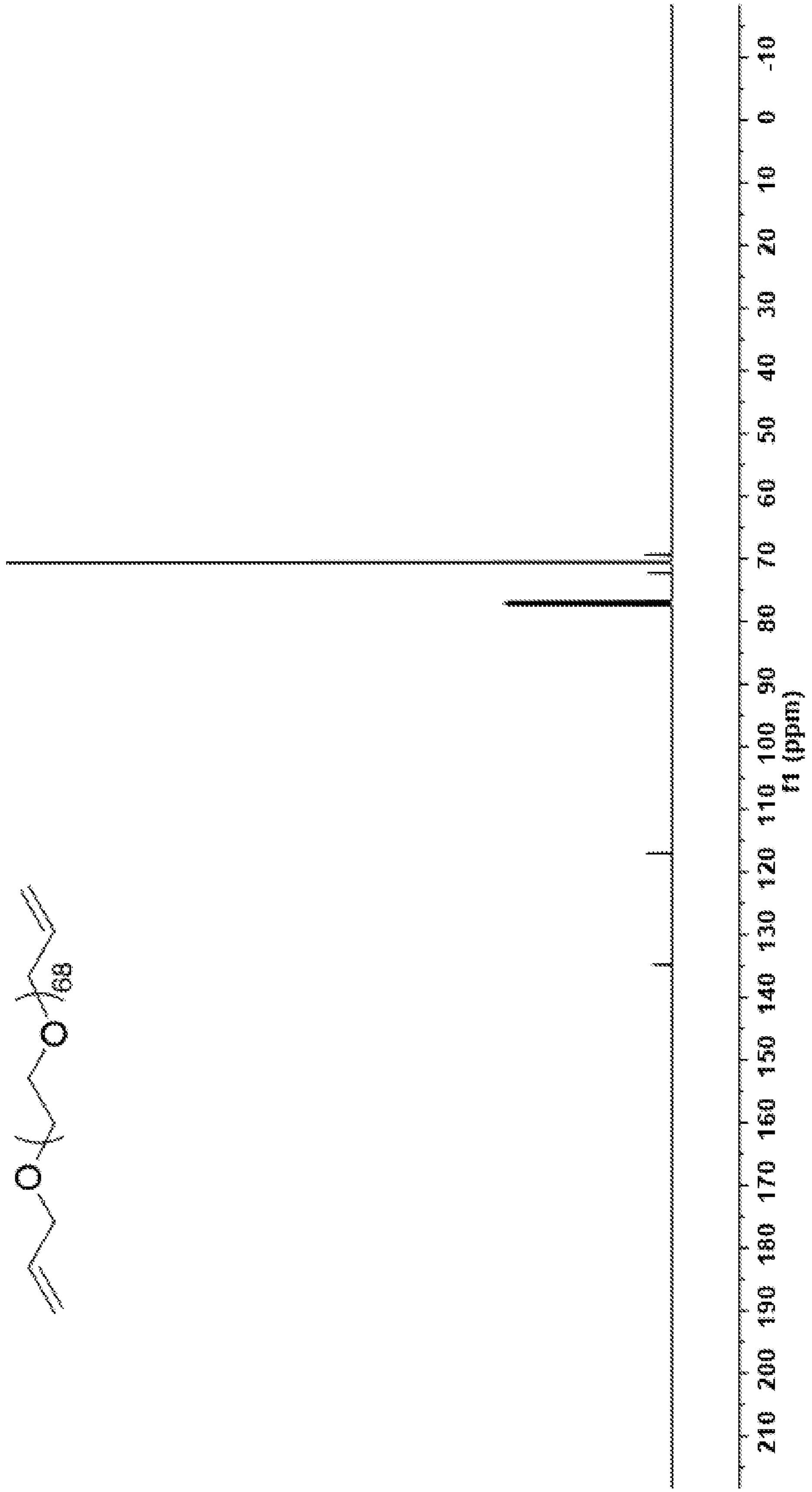
Figure 8C:
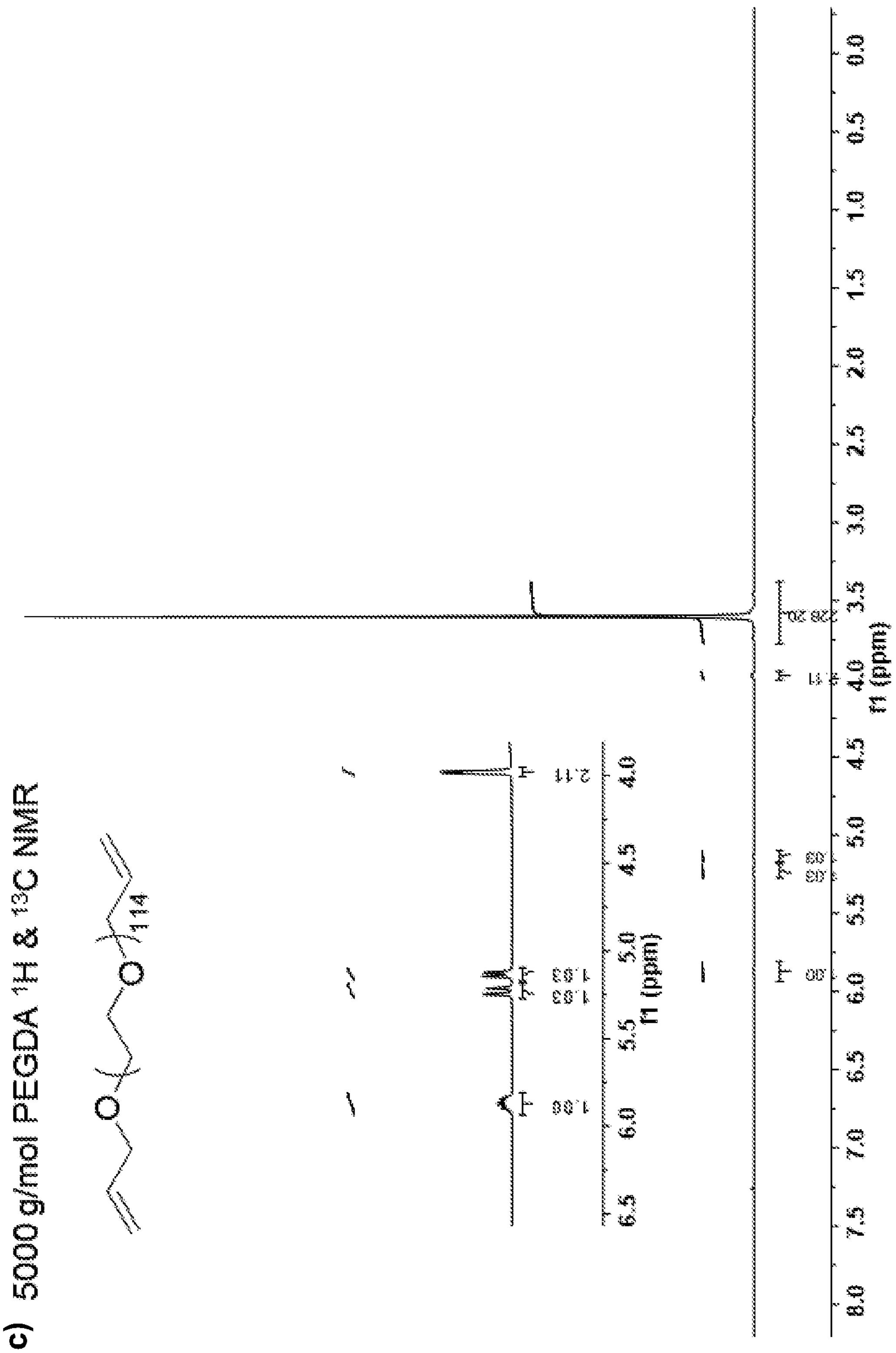
Figure 9:
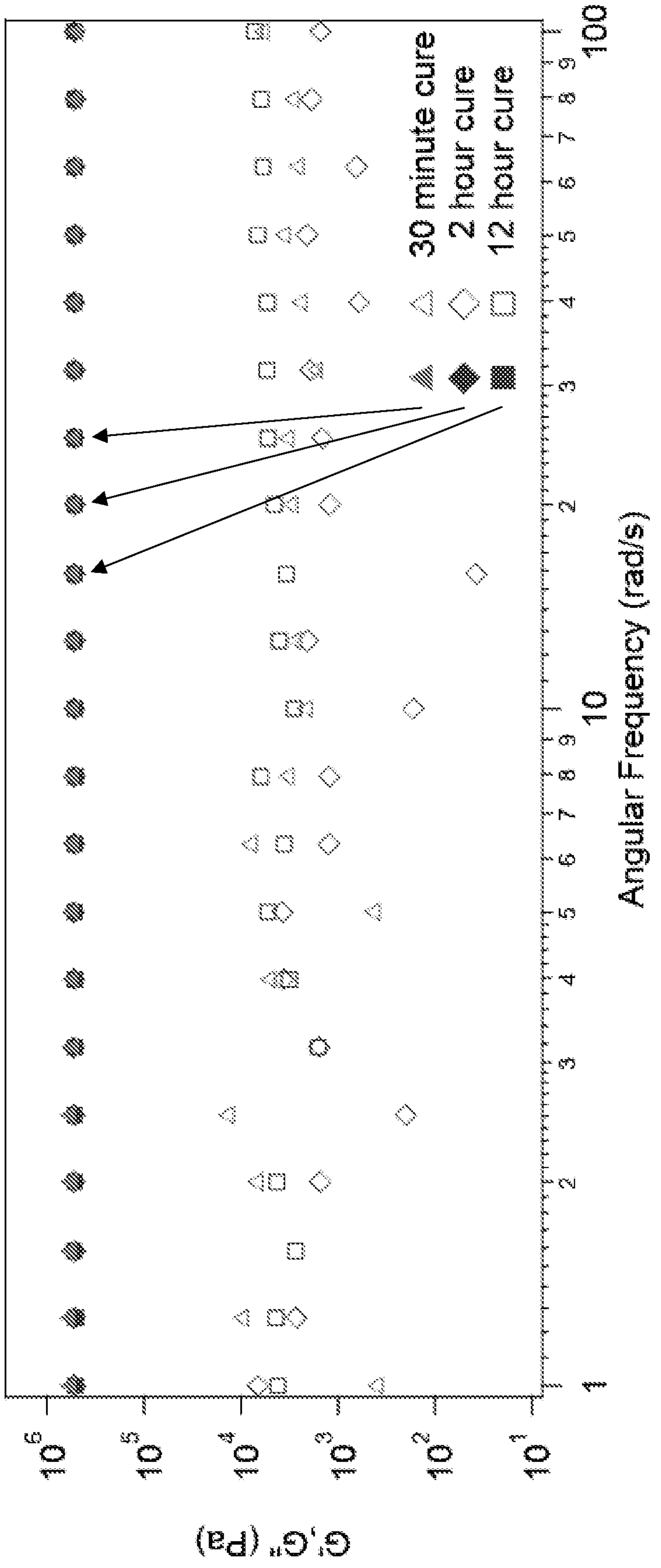
FIG. 9 shows storage and loss modulus of XPE-3k at different cure times.
Figure 10:
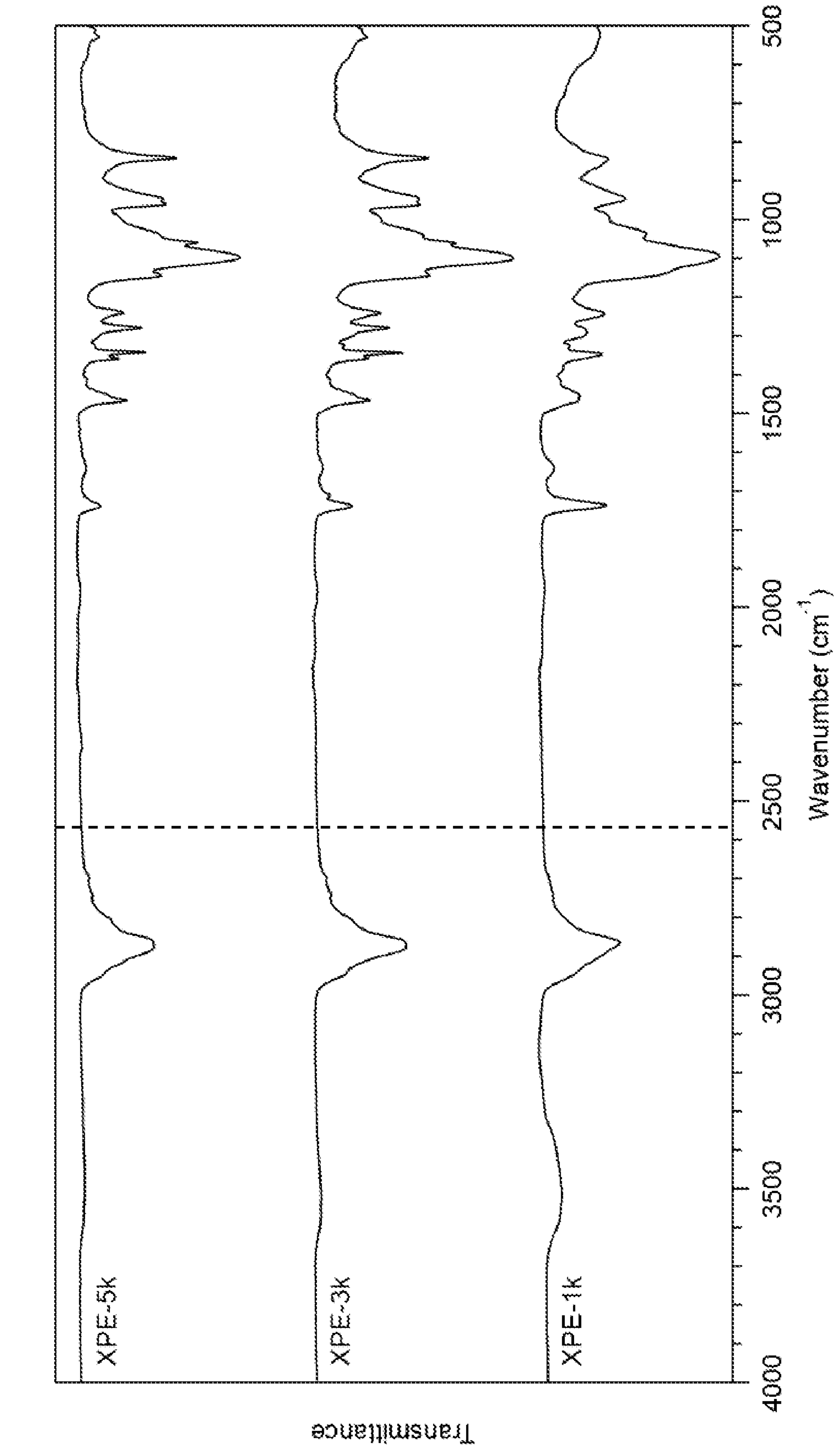
FIG. 10 shows FT-IR spectra of the XPE networks. Given the relatively low concentration of thiol and allyl functional groups present during the reaction, functional group conversion was difficult to measure.
Figure 11A:
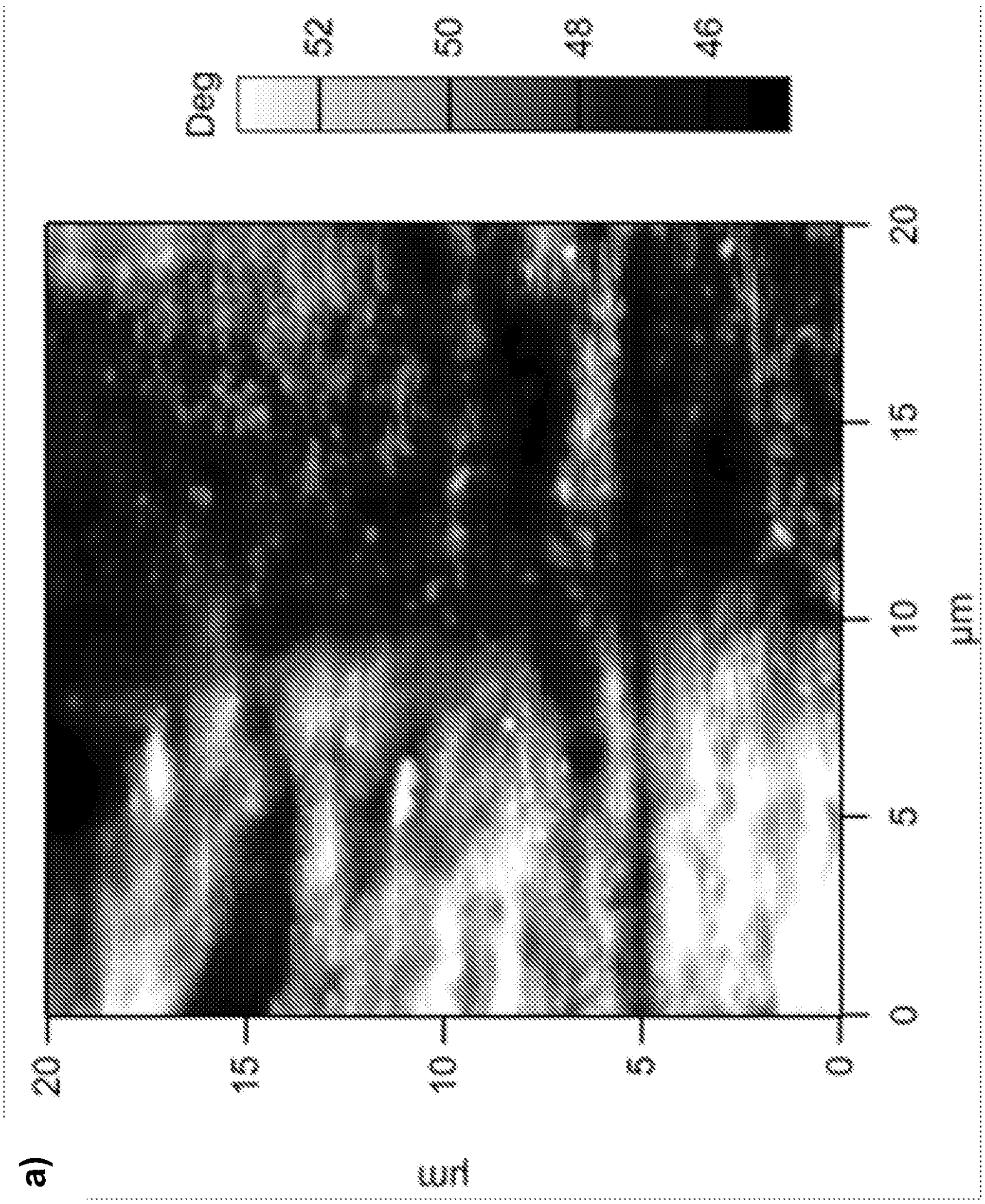
FIG. 11 shows phase mapping using Atomic Force Microscopy. a) Thiol-ene polymer networks. b) Thiol-ene polymer networks in the presence of LiTFSI.
Figure 11B:
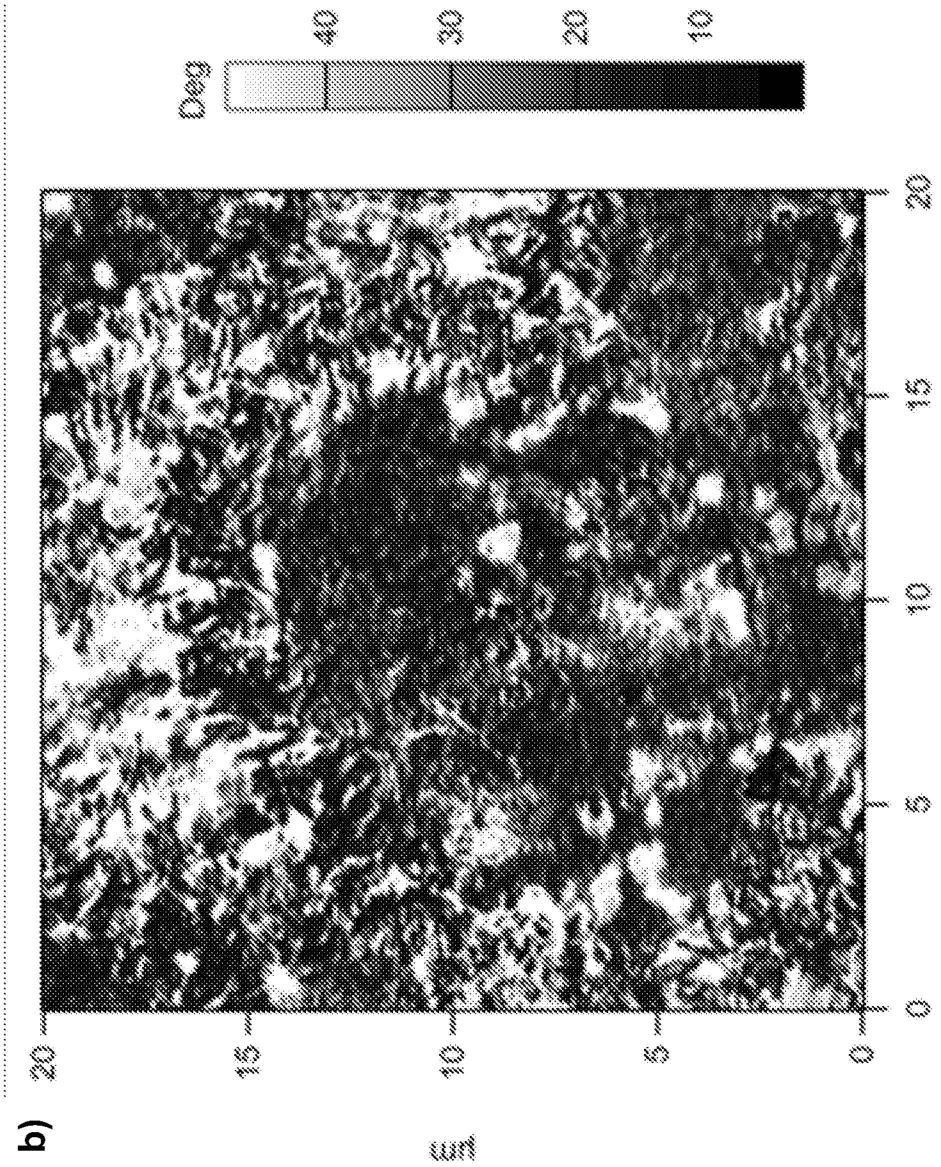

In this Example, cross-linked network films were synthesized using photoinitiated thiol-ene polymerization as depicted in FIG. 7. Thiol-ene networks have several advantages, including efficient and uniform network formation, mild reaction conditions, tolerance to a variety of functional groups, and inexpensive commercial monomers. Poly(ethylene glycol) diallyl ether (PEGDAE) macromonomer was synthesized by reacting PEG diol with sodium hydride and allyl bromide. PEGDAE was then mixed with tetra-thiol cross-linker (4T), photoinitiator (DMPA), and LiTFSI until homogeneous. A stoichiometric balance between $[thiol]_0$ and $[ene]_0$ content was maintained for all samples. The concentration of lithium in each sample was determined by r, which is the molar ratio of lithium ions to ether oxygens ($[Li^+]/[EO]$). Samples used in this study used r=0.056 ([Li]:[EO]=1:18) unless otherwise noted. The mixture was then cast on silylated glass plates and cured under 350 nm UV light at 80° C. A spacer was used to generate films of desired thickness (typically 100 m). Cured films were characterized by FT-IR (FIG. 10) to confirm the disappearance of thiol peaks around 2550 $cm^{-1}$. Atomic force microscopy (AFM) was used to observe the morphology and topology of the films. As seen in FIG. 11, the cross-linked membranes are relatively homogenous with no prominent surface features. This was further supported with phase mapping (FIG. 11*a*). The topology of the cross-linked membrane with salt, however, showed some roughness and inhomogeneity. It was hypothesized that this was due to salt aggregates which occur at room temperature from partial dissociation of the LiTFSI salt in the membrane. Phase mapping shows a phase difference in certain areas of the sample (FIG. 11*b*).

Figure 12:
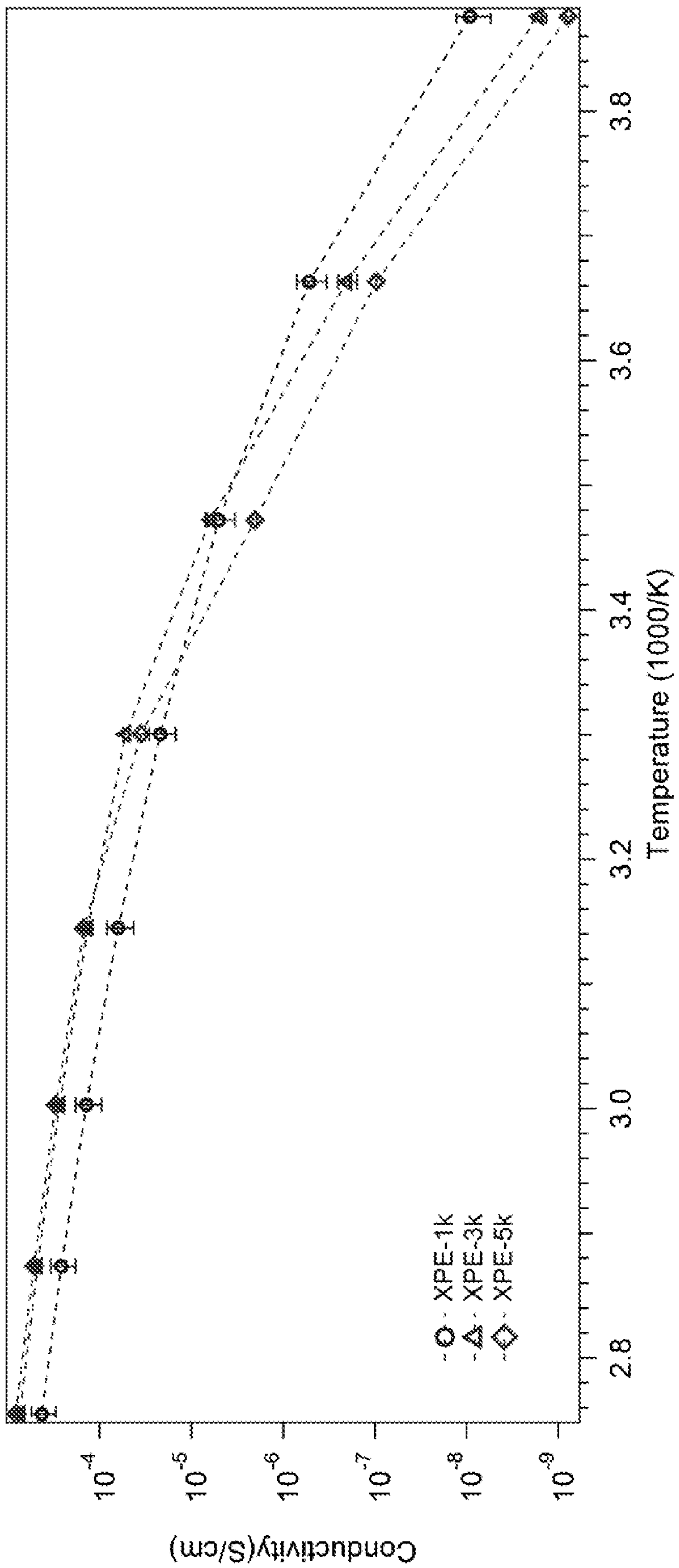
FIG. 12 shows temperature-dependent conductivity of cross-linked polymer electrolytes with different PEO molecular weights between cross-links.

Lithium-ion transport predominately occurs in the amorphous region of a polymer electrolyte, promoted by the segmental motion of polymer chains. To evaluate the effect of chain length between cross-links on ionic conductivity and electrolyte physical properties, PEGDAE macromonomers of different molecular weights were synthesized and cross-linked into networks of varied cross-link density. Thermal properties and ionic conductivities for the different networks are shown in Table 1. Ionic conductivities over a temperature range of −15° C. to 90° C. are reported in FIG. 12. It was observed that as molecular weight between cross-links increased, starting at approximately 3000 g/mol, a melting transition emerged. This value is comparable to the critical molecular weight, $M_c$, ($M_c \approx 2M_{entanglement}$=3248 g/mol) at which intermolecular entanglements begin to dominate transport properties in PEO. This suggests that there is a competition between chain mobility and crystallization with varying molecular weight In other words, at high cross-link densities, low segmental motion and a denser network impairs ion transport. However, at low cross-link densities the molecular weight between cross-links is high enough for intermolecular entanglements and crystallization to impede ion transport. Accordingly, because cross-link density and PEO molecular weight are inversely coupled for the networks studied, a maximum in conductivity was observed for networks comprised of PEO macromonomer of $M_n$ near $M_c$. It is noted that the conductivity maximum was also observed at a similar molecular weight for other cross-linked systems based on PEO and LiTFSI salt, regardless of the cross-linking chemistry utilized. This is consistent with the idea that this molecular weight is a fundamental characteristic of cross-linked PEO networks associated with $M_c$. For subsequent studies in this Example, the focus was on networks using 3000 g/mol PEO-based macromonomers.

Figure 13A:
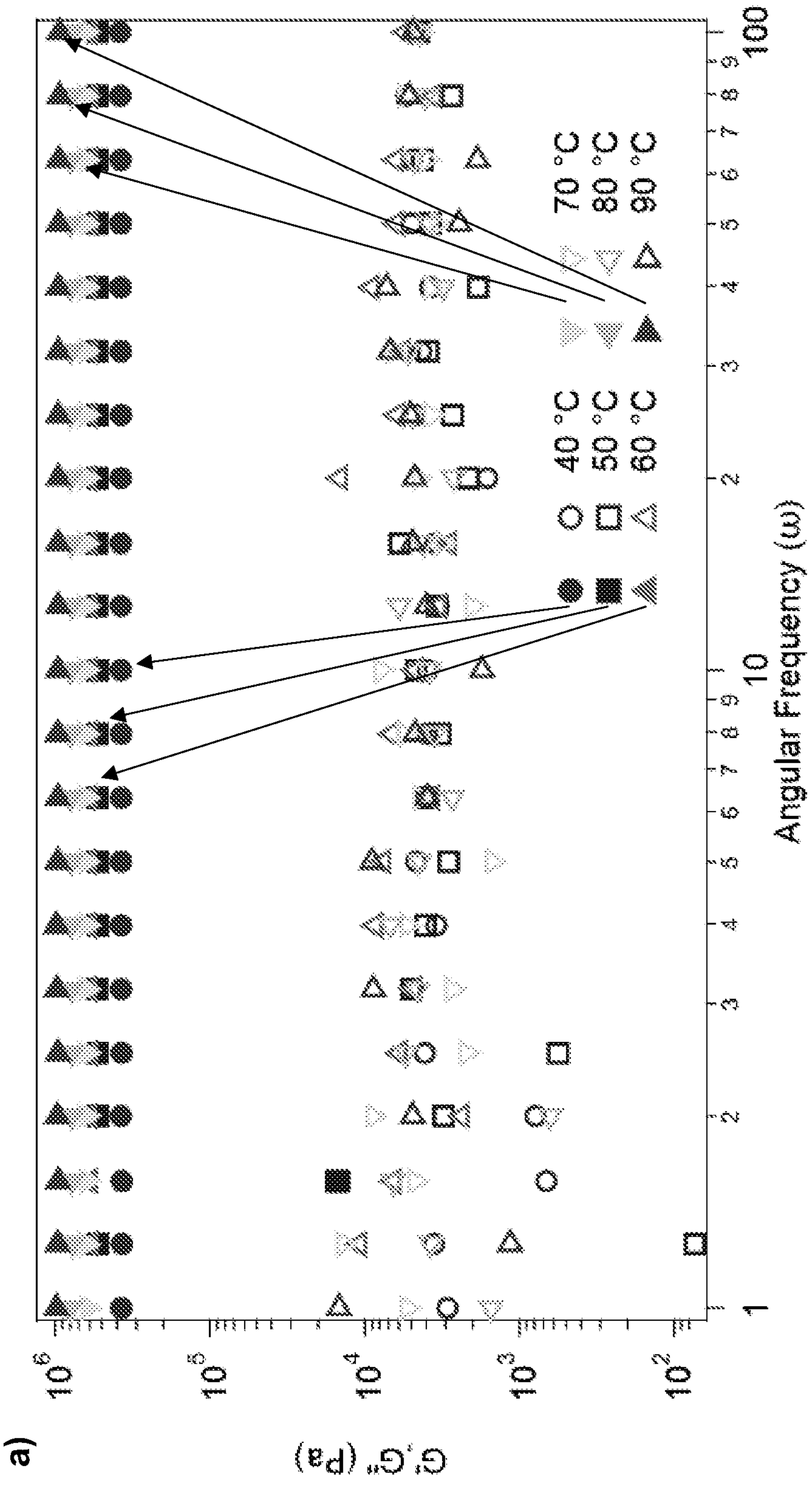
FIG. 13 shows rheological properties of cross-linked networks. a) Storage and loss modulus of XPE-3k networks obtained from frequency sweep at a fixed strain of 0.1%. b) Storage modulus as a function of temperature for cross-linked polymer electrolytes with varying PEGDA molecular weights.

A motivation for using a cross-linked polymer electrolyte is to evaluate the predictions of recent theory that such materials may be able to confine electrodeposition of metals to small length scales proportional to the cross-link density or mesh size of the network. To characterize the average mesh size of the networks, rheological measurements were performed at different temperatures. Dynamic storage (G') and loss (G") moduli measured in small strain amplitude (strain=0.1%) oscillatory shear measurements in the linear viscoelastic regime are reported in FIG. 13*a* and a direct comparison with XPE-1k and XPE-5k is presented in FIG. 13*b*. It is evident that the G' values are nearly independent of frequency and almost two orders of magnitude higher than G", indicating the elastomeric nature of the electrolytes. The high-frequency storage modulus value, $G_e$, increases with increasing cross-link density as expected. $G_e$ also increased with increasing absolute temperature, with typical values ranging from 0.4 MPa (at 40° C.) to 0.85 MPa (at 90° C.) for XPE-3k. This allows us to estimate the average mesh size, a, of the networks using the following equation:

$$a = \sqrt[3]{(kT/G_e)} \tag{1}$$

Figure 13B:
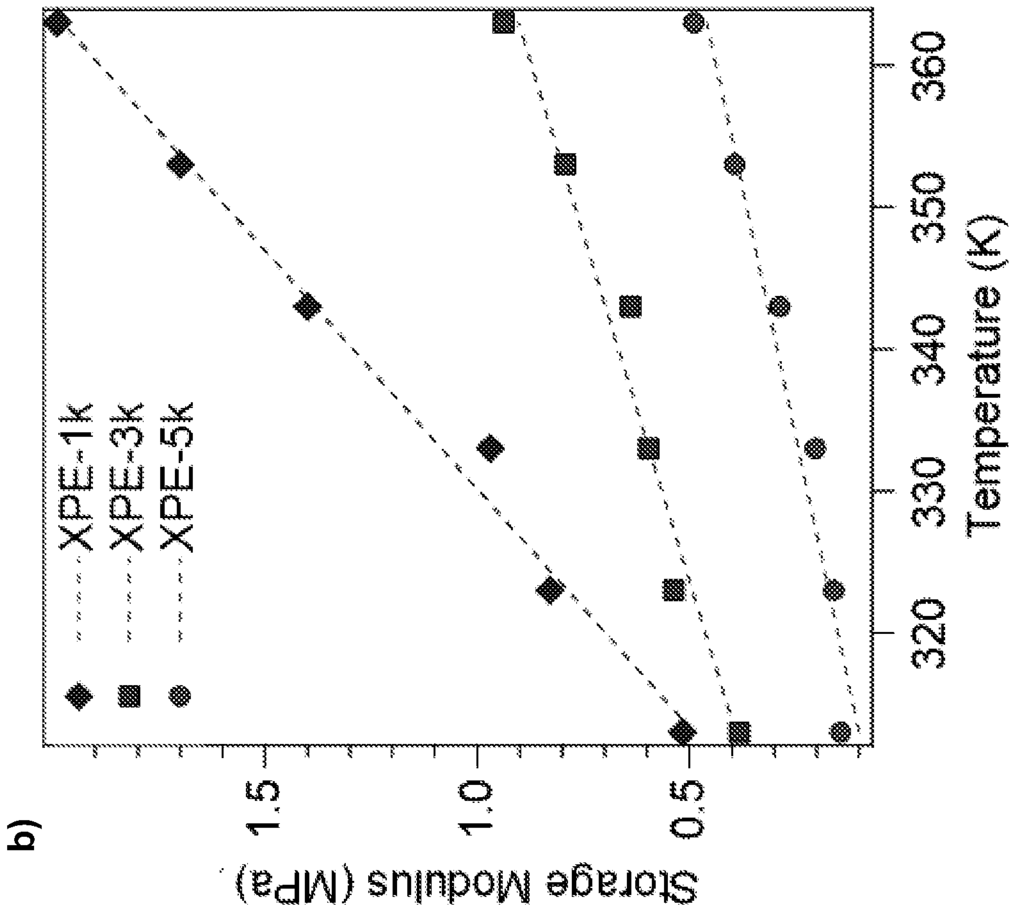

The calculated values are in the range 1-5 nm for the three systems, indicating the networks are tightly cross-linked. Alternatively, the measured G" can be used to obtain an empirical value for the molecular weight between cross-links, $M_x$, using the relationship:

$$M_x = \rho RT/G_e \tag{2}$$

where $p=\rho_{network} \approx 1.2$ g/$cm^3$ and $G_e \approx 2$ MPa, 0.9 MPa, and 0.5 MPa at 90° C. for XPE-1k, XPE-3k, and XPE-5k, respectively (see FIG. 13*b*). The obtained values for $M_x$—1600 g/mol, 3500 g/mol, and 6100 g/mol for XPE-1k, XPE-3k, and XPE-5k, respectively—closely agree with the predicted values for a highly uniform cross-linked network of PEO chains, further showing the precision of the thiol-ene click chemistry used for the XPE synthesis.

Figure 14A:
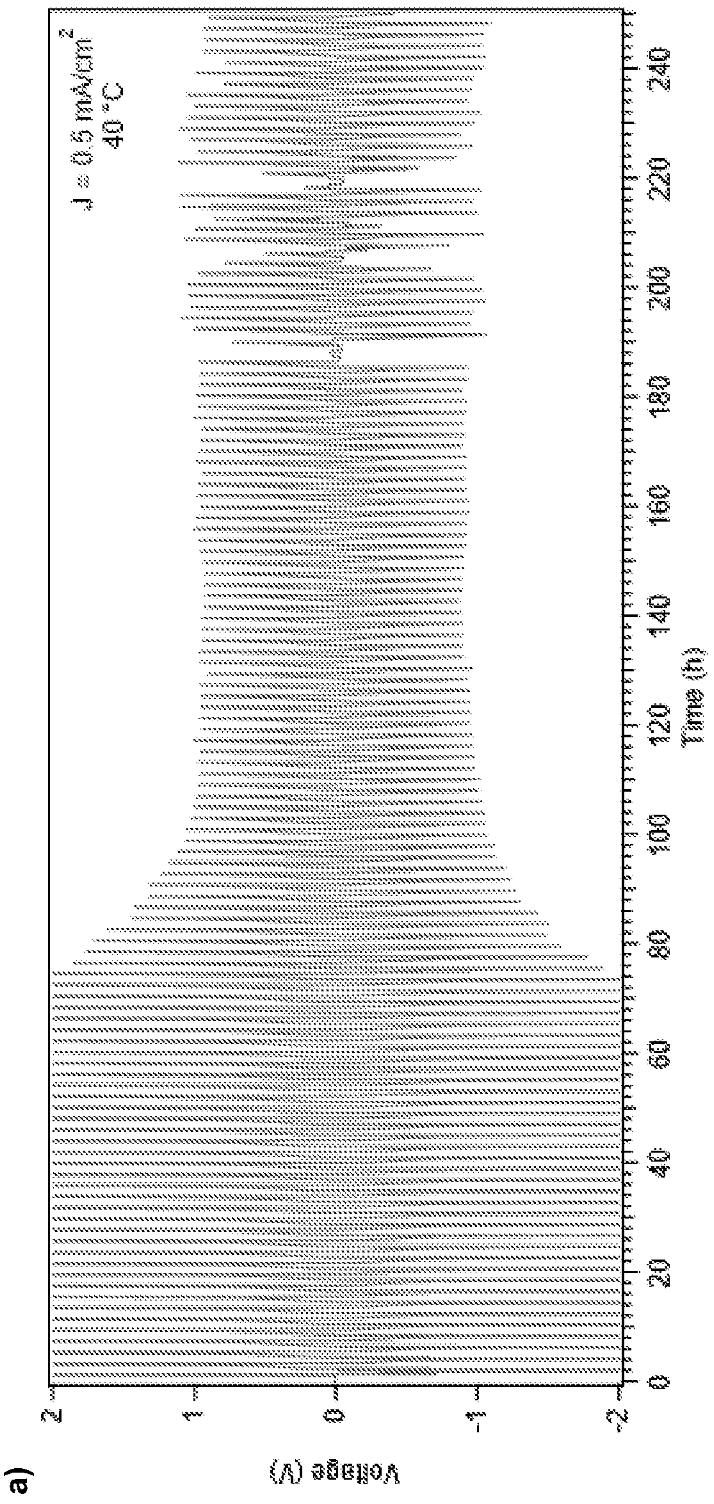
FIG. 14 shows galvanostatic stripping-plating of XPE-3k at different temperatures. a) 40° C. b) 60° C. c) 90° C.
Figure 14B:
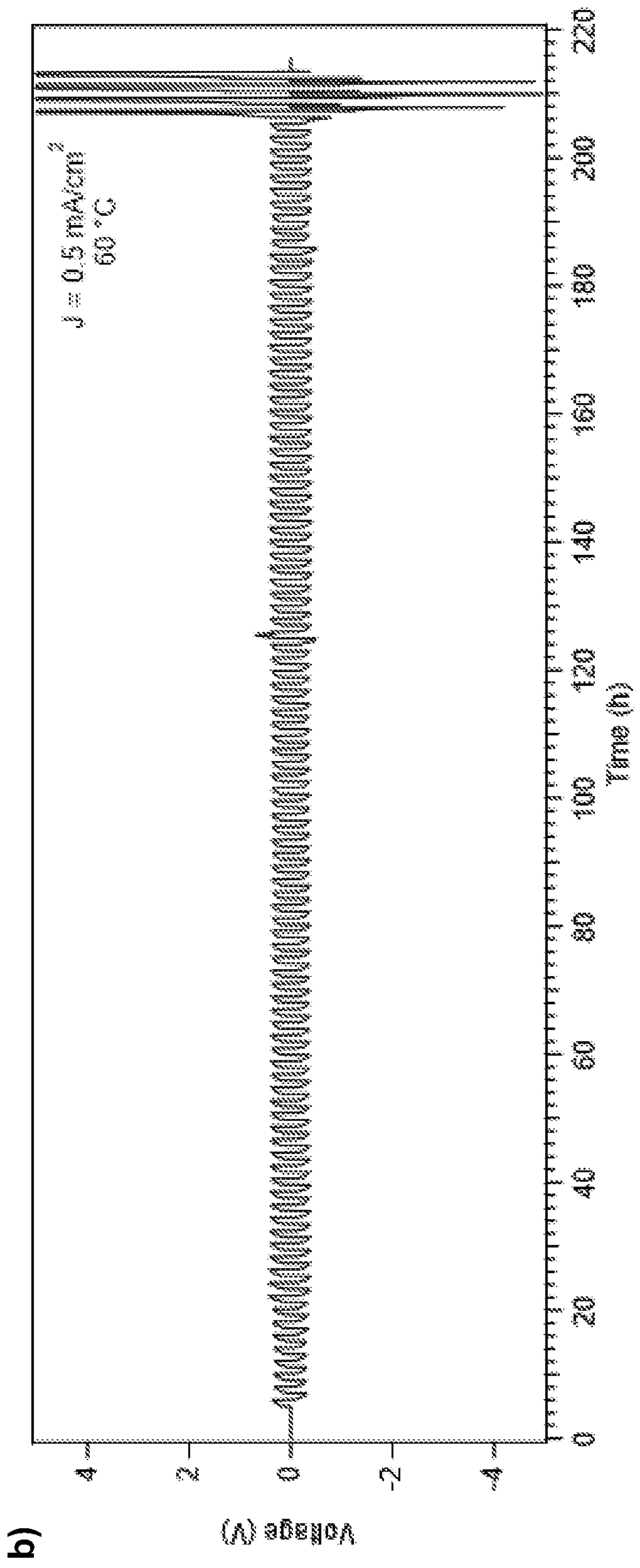
Figure 14C:
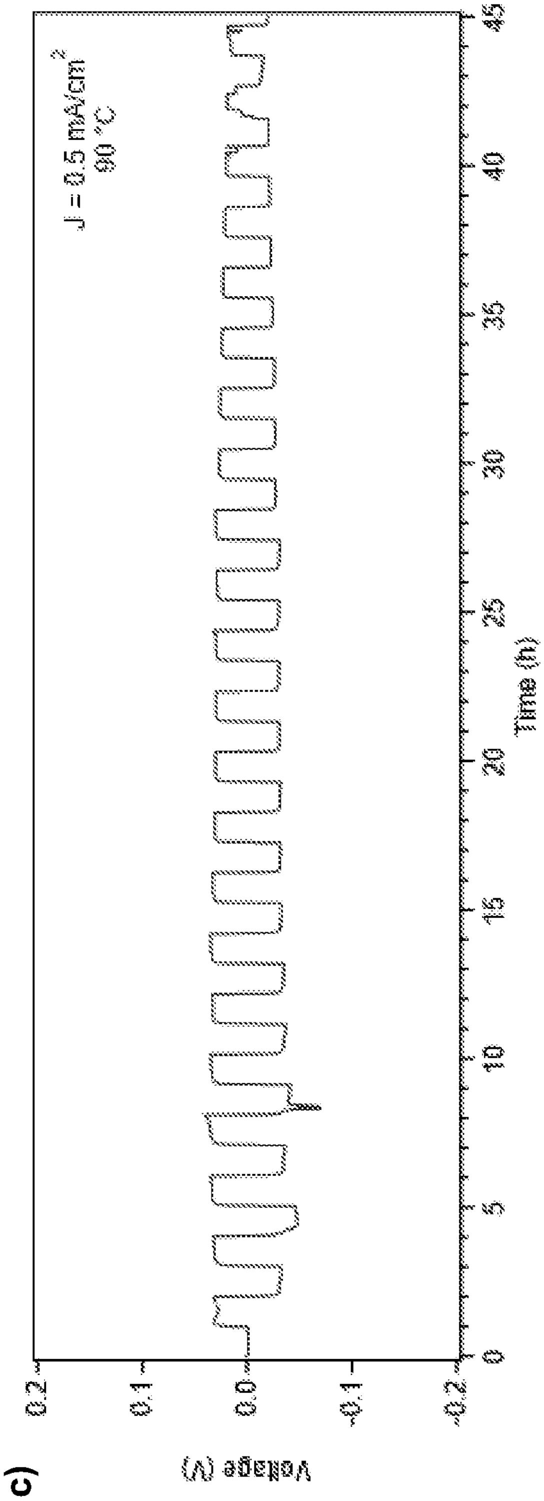
Figure 15:
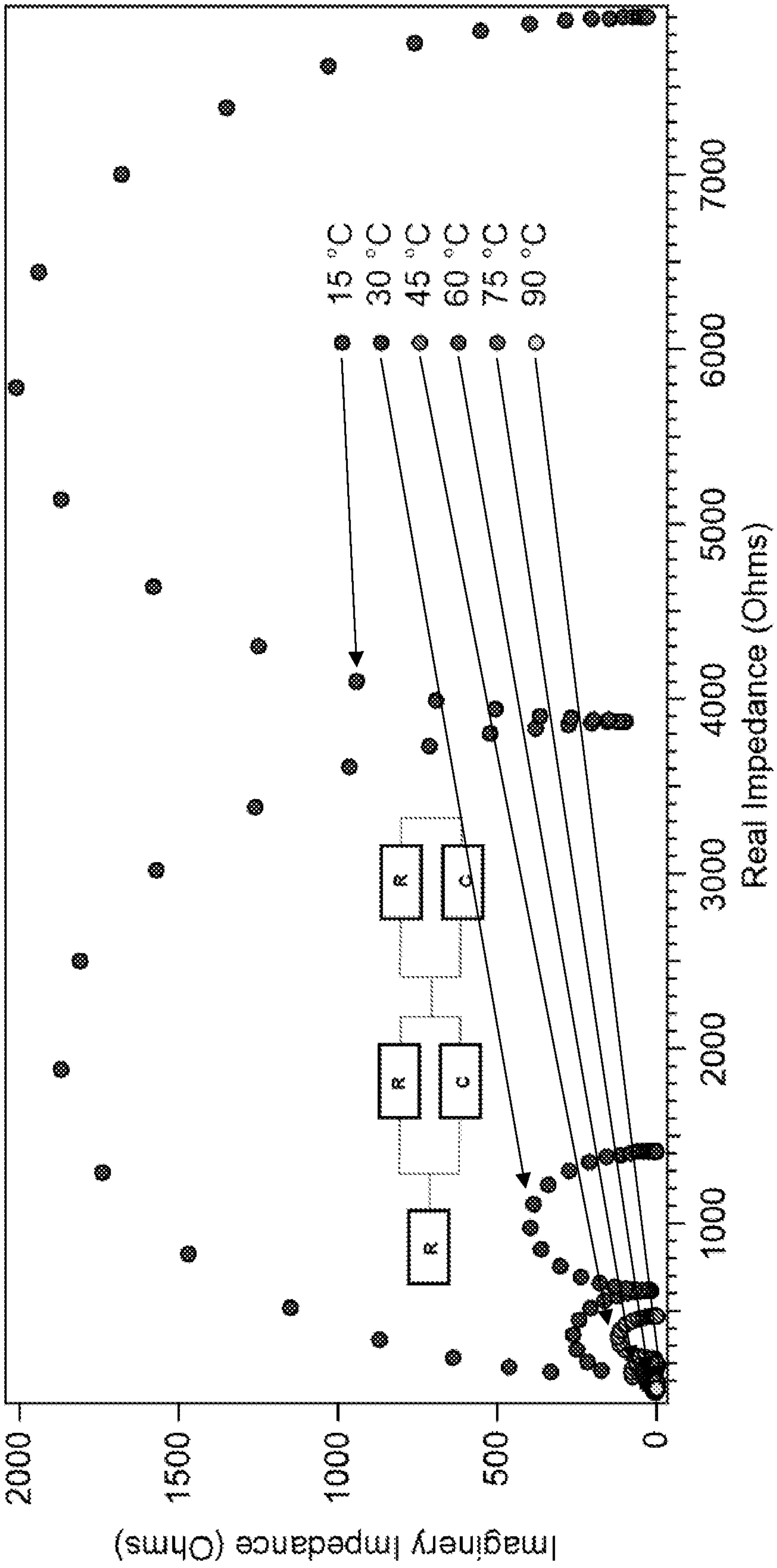
FIG. 15 shows impedance spectra of XPE-3k at different temperatures. (Inset) Model used to fit data.
Figure 16:
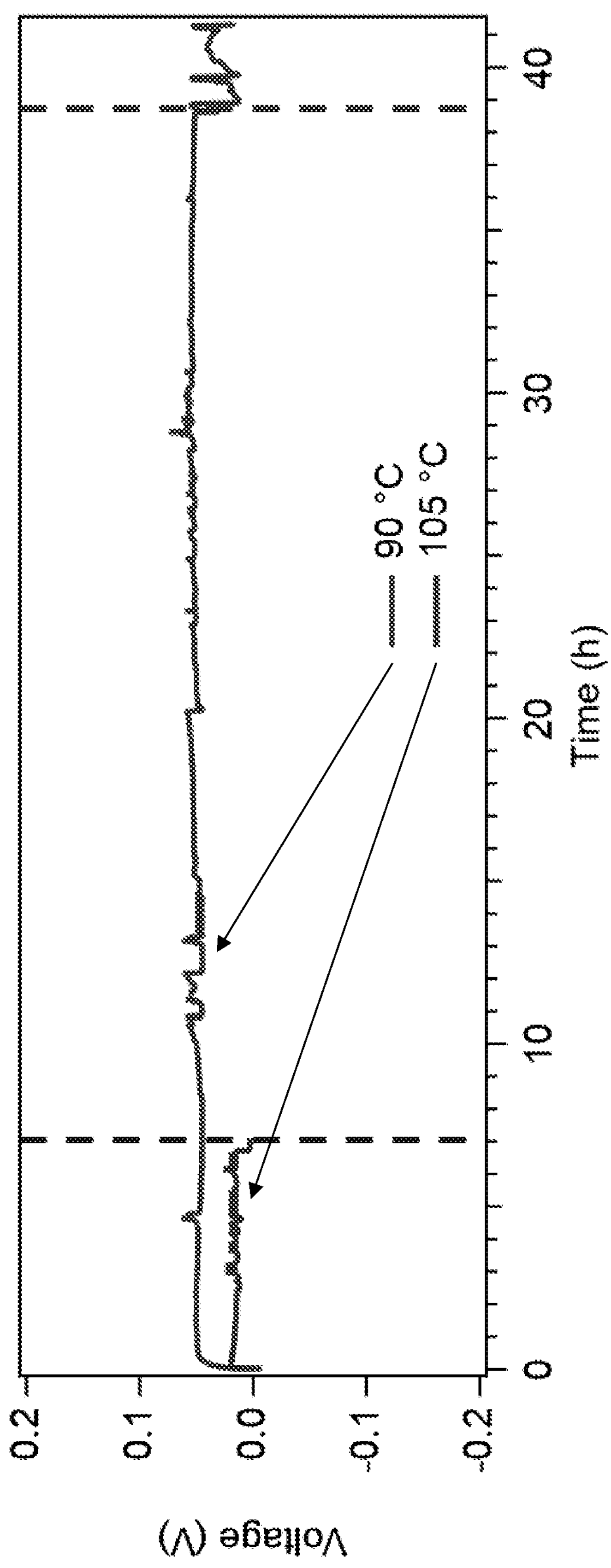
FIG. 16 shows galvanostatic polarization of XPE-3k at 0.5 $mA/cm^2$ with different temperatures of operation. Vertical dashed lines indicate where cell failure occurs.
Figure 17:
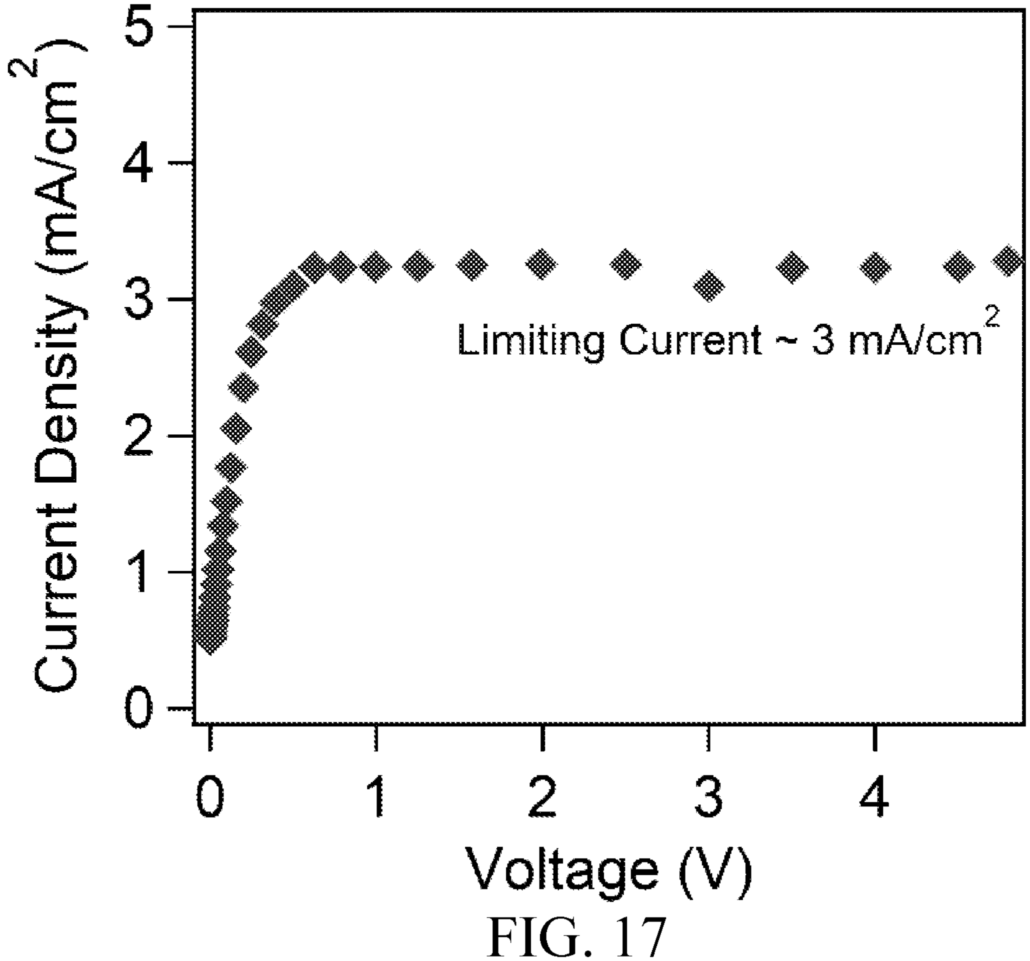
FIG. 17 shows an IV curve of XPE-3k at 90° C. Measurements were done by holding the sample at each potential-step from 0-5 V for five minutes until steady-state current was reached.

To evaluate the effectiveness of the cross-linked polymer electrolytes in stabilizing electrodeposition, first performed were galvanostatic strip-plate measurements at 40° C., 60° C., and 90° C. using the solid-state XPE-3k. It is noted that these materials contain no solvent or plasticizer. FIG. 14 shows the voltage responses at different temperatures for a sequence of 1-hour plating and stripping experiments. At 60° C. the overpotentials are high (~0.5 V), but the materials exhibit stable cycling profiles for over 100 cycles (200 hours). At 90° C. the overpotentials are substantially lower (0.04 V), however, despite stable initial cycling the cells quickly fail. FIG. 1*a-c* shows magnified versions of the profiles for each temperature. The initial voltage response at 90° C. is notable for its square-wave shape, which exactly tracks the imposed current. This feature is not found in liquid electrolytes and appears to be characteristic for solid-state electrolytes. In the case of liquid electrolytes, it was previously proposed that the sharp voltage extrema observed during the onset of Li plating and stripping are associated, respectively, with formation of mossy dendrites and pitting at the electrode surface. These designations have recently been confirmed in direct optical visualization studies for sodium metal anodes, indicating that the nearly Ohmic voltage response observed from the XPEs is associated with suppression of mossy dendrite formation and pitting. The large transient overpotentials at 40° C. disappear at 90° C. It was hypothesized that ion transport "bottlenecks", where the interface resistance is larger than the bulk resistance, is the source of this observation. In liquid electrolytes, a higher interfacial resistance to ion transport arises from slower, solid-state ion transport in the SEI. For cross-linked polymer electrolytes the difference could arise either from electrochemical reduction of the electrolyte to form an SEI or poor interfacial contact with the electrode FIG. 1*d* shows the bulk and interfacial resistances of the cross-linked polymer electrolytes obtained by fitting the temperature-dependent impedance data reported in FIG. 15. The results show that the interfacial resistance is generally much larger than the bulk resistance, particularly at lower temperatures. Arrhenius fits to the data show that the activation energy for the interface transport process is also substantially larger; implying that the higher interfacial resistance arises from slower ion transport at the polymer-Li interface in comparison to the electrolyte bulk. At temperatures above 70° C. the interfacial resistance becomes lower than the bulk resistance. The transition to faster interfacial ion transport coincides with our observations of square-wave like profiles at 90° C., supporting the hypothesis that deviations of the voltage response from the imposed current profile in a strip-plate experiment originates from ion transport "bottlenecks" at the interface. However, at higher temperatures the cells unexpectedly failed faster. The voltage profiles at 90° C. and 105° C. for cells polarized at 0.5 $mA/cm^2$ show that cells failed four times faster at the higher temperature, despite the increase in network modulus with temperature (FIG. 16). To gain insight into the underlying phenomena, cyclic voltammetry was used to measure the exchange current density, $J_o$, at Li/XPE-3k interfaces over the same range of temperatures. The current-overpotential plot (FIG. 1*e*) shows an increase in the exchange current with temperature, particularly in the range 60° C. to 90° C. FIG. if reports exchange current density, $J_o$, values for the Li/XPE-3k interface, normalized by the current density, J (a fixed value), at which the Li plate-strip experiments were performed. It is apparent that $J_o$ is not only a strongly increasing function of temperature, but that the strongest increase (nearly two orders of magnitude) occurred over a narrow temperature range that correlates more closely with the normal melting transition temperature ($T_m \approx 60°$ C.) of uncross-linked or loosely cross-linked high molecular weight PEO. This is potentially due to low cross-linking at the surface of the XPE compared to the bulk. It is noted further that the large increase in $J_o$ coincided with very large reductions in the interface resistance (FIG. 1*d*) and commensurately lower overpotentials in the Li plate-strip experiment. Both observations were attributed to improved interfacial contact between the solid-polymer electrolyte and the Li metal electrode, which would increase the effective concentration of $Li^+$ ions at the electrode/electrolyte interface that are able to participate in the reduction reaction. It is also apparent that at a temperature above approximately 70° C., $J_o >> J$, meaning that the electrode reaction becomes transport limited; a requirement for rapid dendrite growth. The limiting current density, $J_{limiting}$, was measured using a combination of current-voltage measurements (see FIG. 17) and calculations. Normalizing $J_o$ by the temperature-dependent $J_{limiting}$ values (see FIG. 1*f*, right axis) shows that the kinetics of the Li reduction reaction at the anode increase more rapidly with temperature than the bulk diffusivity of the electrolyte, leading to the same conclusion that the electrode reaction in the solid XPE electrolyte becomes progressively more transport limited at elevated temperature. Thus, it was concluded that the faster failure of the XPE electrolyte at higher temperature is a consequence of the rapid increase in Li reduction rate with temperature rather than the mechanical, transport, and surface energetic impediments to dendrite propagation in the networks.

Figure 18:
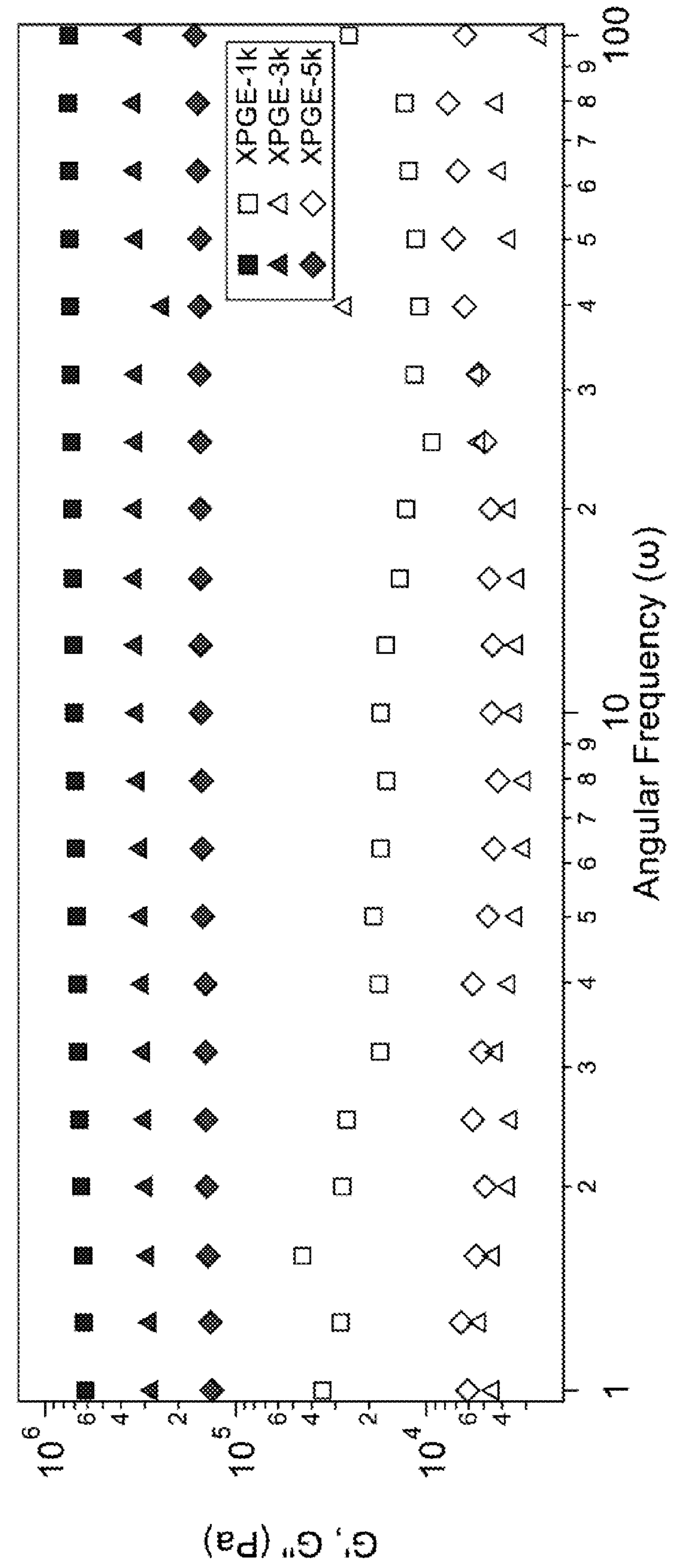
FIG. 18 shows shear rheology of XPGE-1k, XPGE-3k, and XPGE-5k at a fixed strain of 0.1%. Note that the measured modulus of the gel electrolytes (XPGE) are very similar to the modulus of their non-gelled counterparts (XPE).
Figure 19:
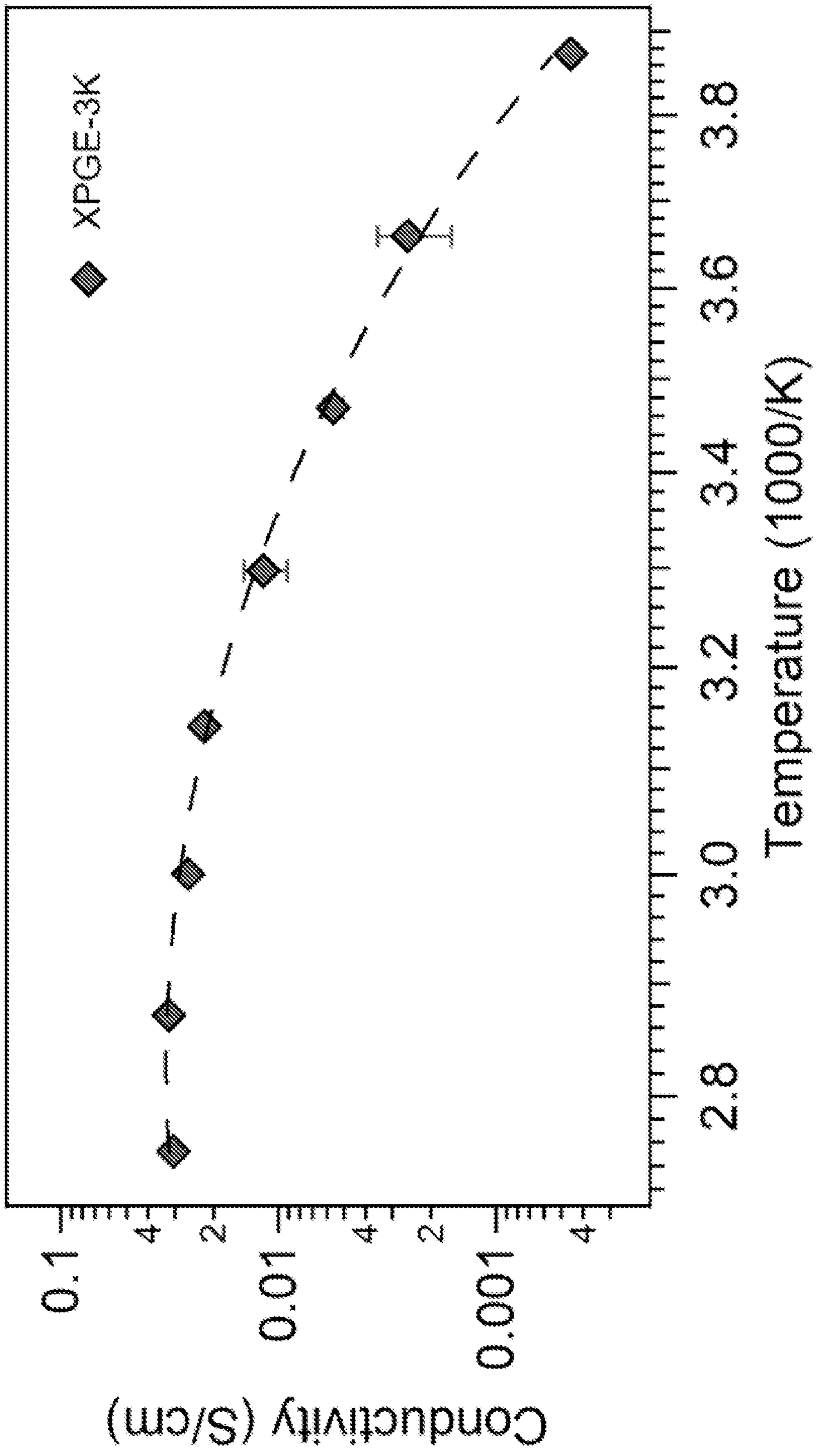
FIG. 19 shows measured conductivity of XPGE-3k (soaked with 1M LiTFSI in EC/DMC) as a function of temperature.

To overcome transport limitations of the solid XPE electrolytes, the cross-linked polymer networks were soaked in liquid electrolyte to increase their bulk and interfacial ionic conductivities. A liquid electrolyte composed of 1M LiTFSI dissolved in a 1:1 (v:v) mixture of ethylene carbonate (EC) and dimethyl carbonate (DMC) was used in all studies. The cross-linked networks swelled by an average of 40-60% by mass in the liquid electrolyte. The resulting materials obtained after maximum electrolyte uptake were mechanically tough, elastic materials with $G_e$ values comparable to those of the original XPEs (FIG. 18). Remarkably, however, the room temperature ionic conductivity of the materials was much higher (on the order of 10 mS/cm, i.e., 3 orders of magnitudes higher than the solid XPEs at 90° C., FIG. 19). The materials were termed cross-linked gel electrolyte (XPGE) membranes because they host the liquid electrolyte within the network; their mechanics are, however, similar to those of the solid XPEs. These features validate the uniformity of the cross-linking (few unlinked/dangling chains) present in the XPEs.

Figure 20:
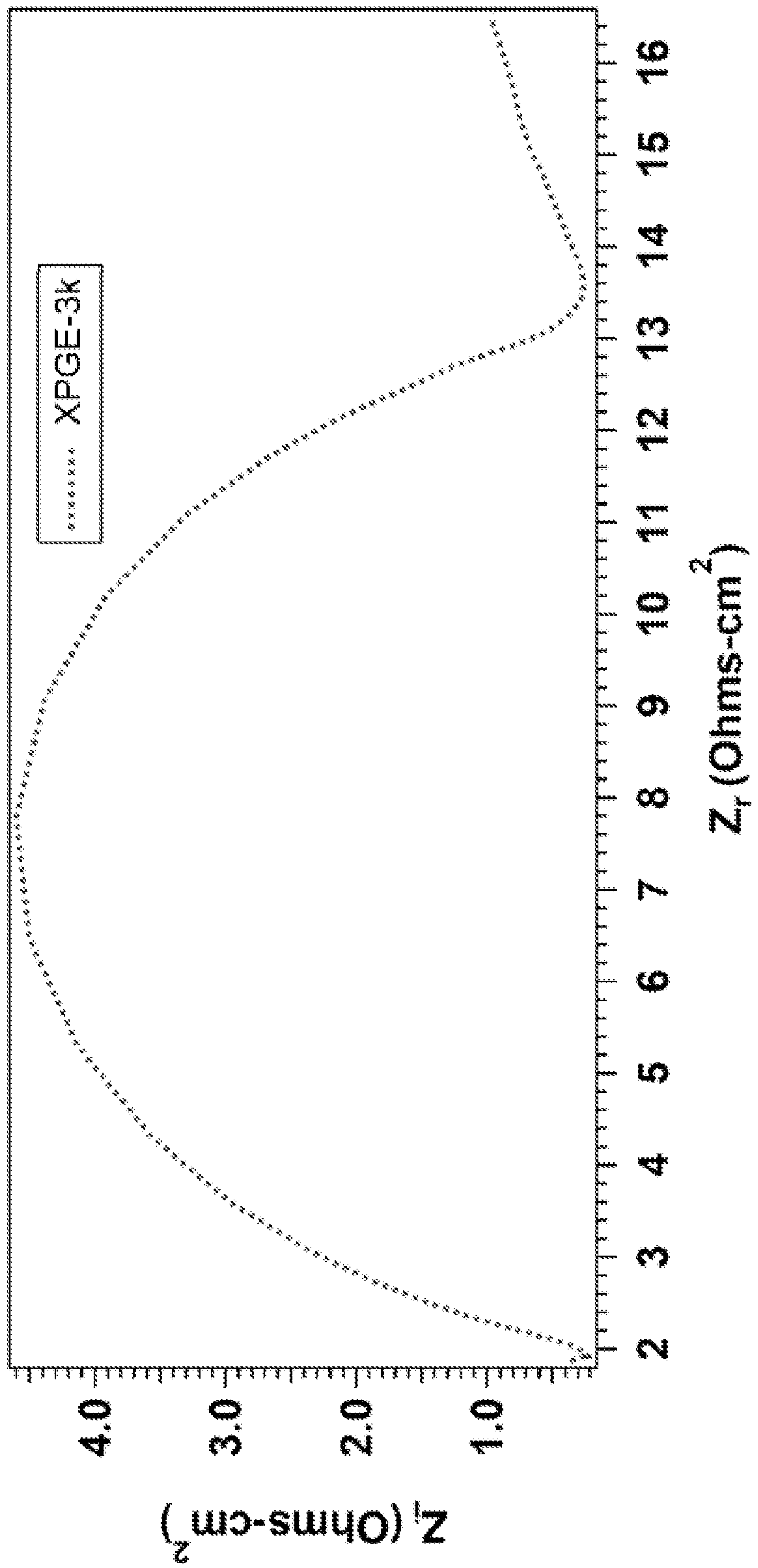
FIG. 20 shows impedance spectra of XPGE-3k at room temperature.
Figure 21A:
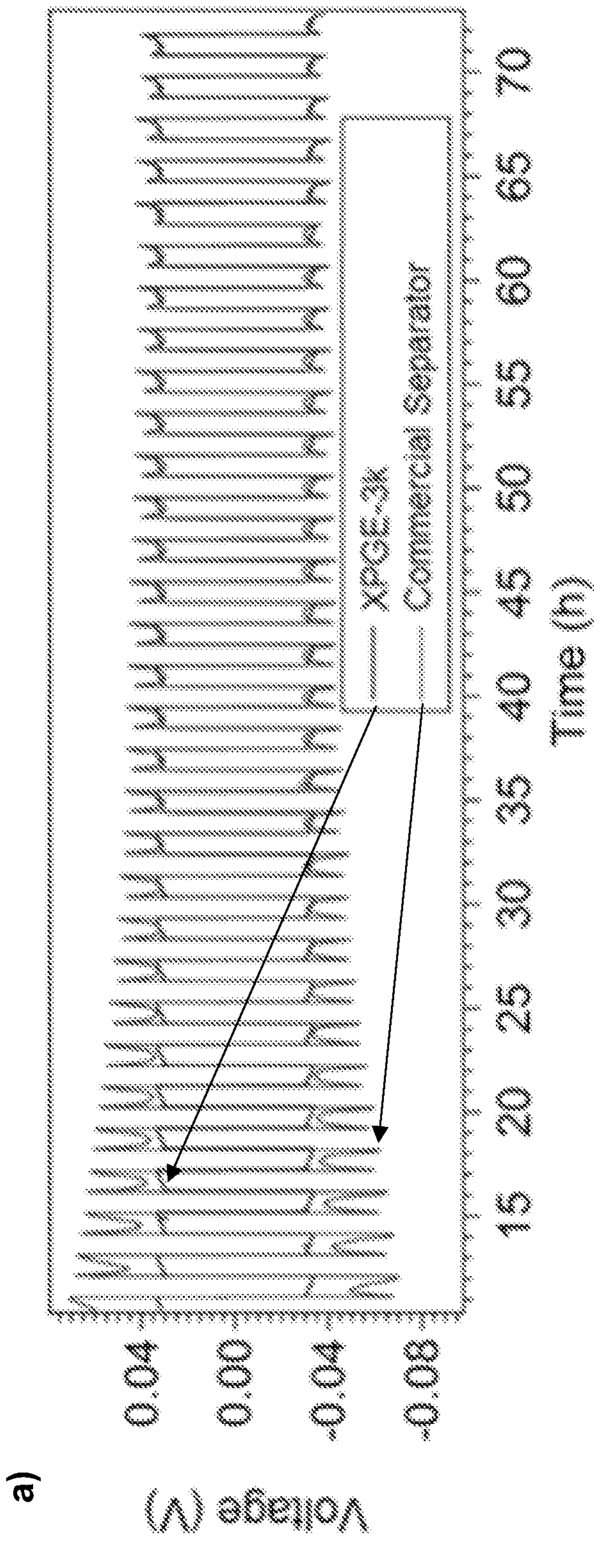
FIG. 21 shows comparison of voltage profiles between Celgard 3501 and XPGE-3k at different stages of time. a) 0-20 h (h=hour(s)). b) 650-800 h. c) 680-920 h.
Figure 21B:
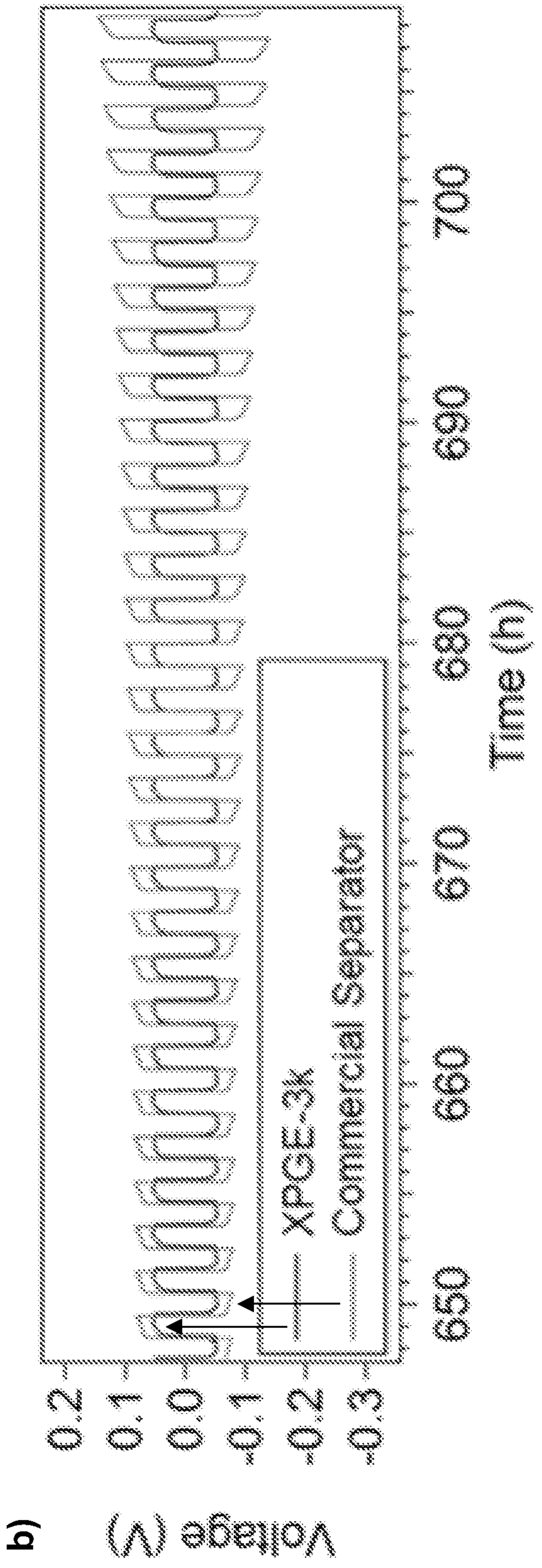
Figure 21C:
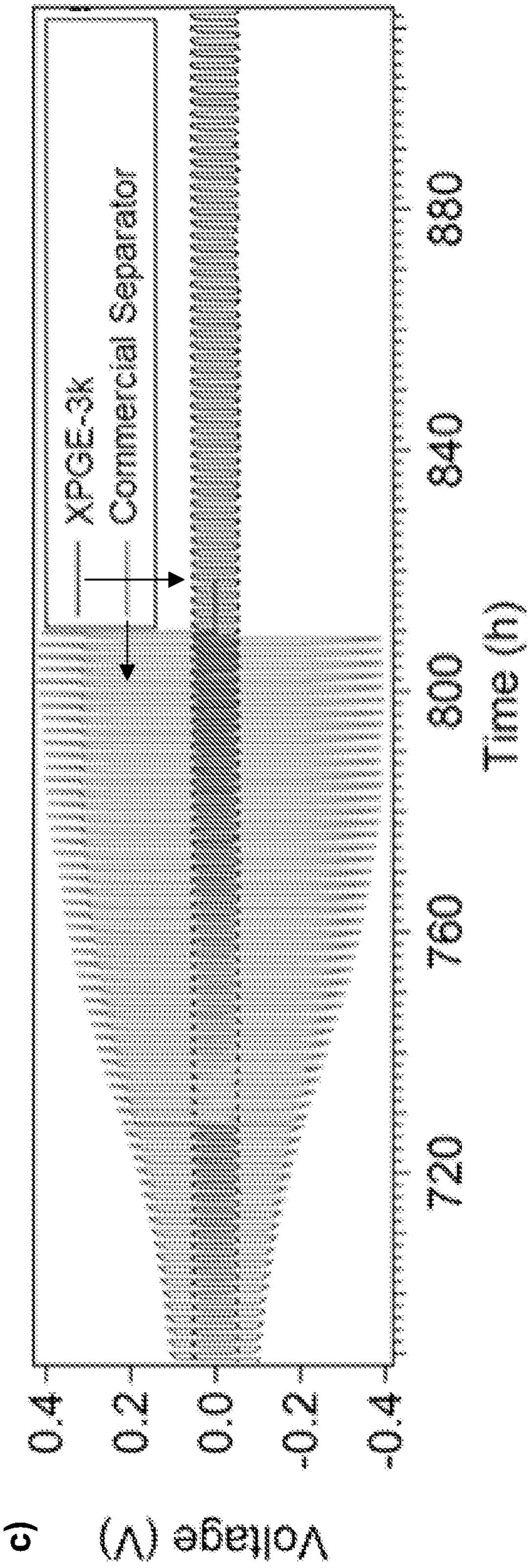
Figure 22:
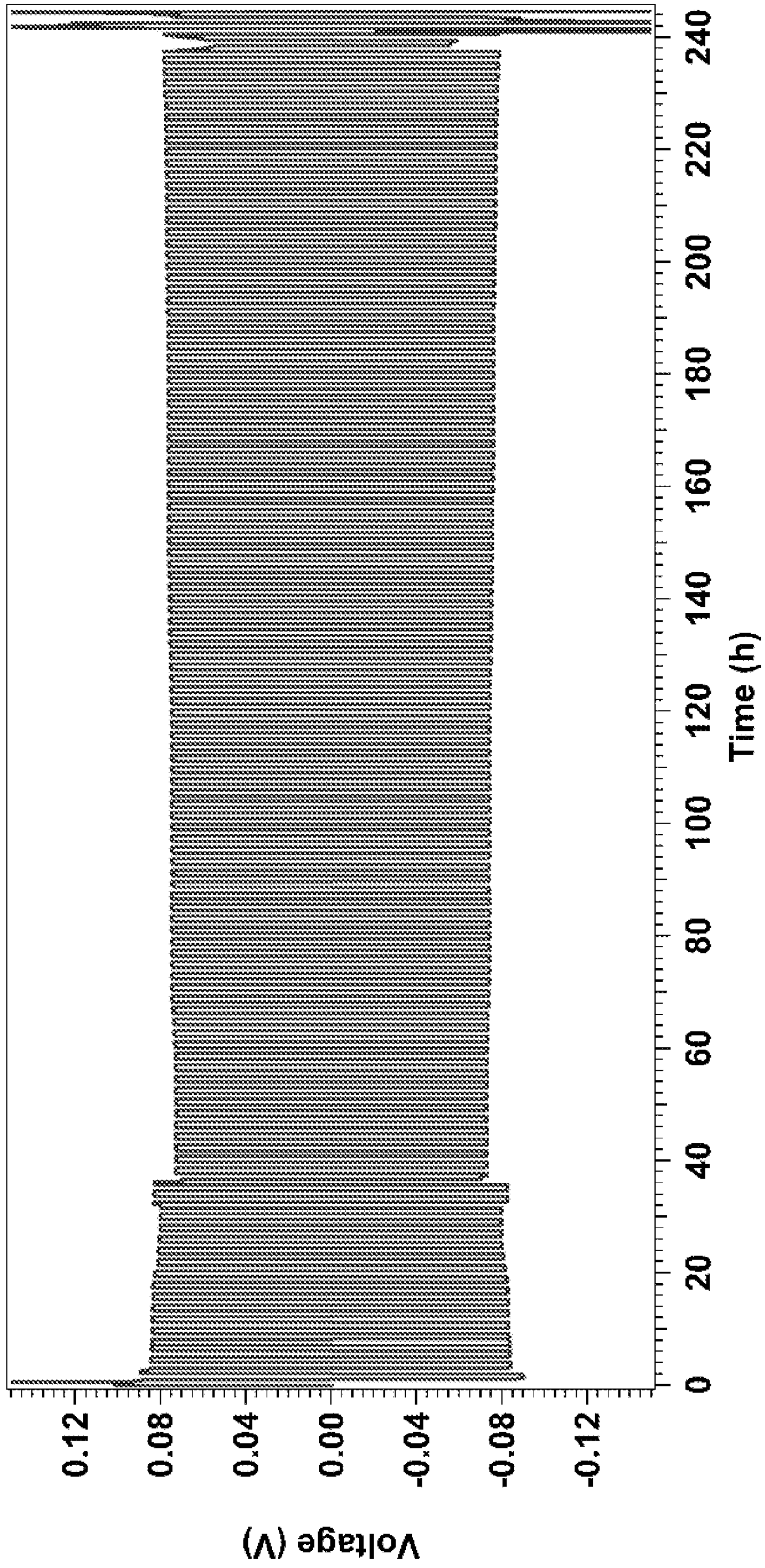
FIG. 22 shows galvanostatic strip-plate of XPGE-3k at 1 $mA/cm^2$.

Electrochemical Impedance Spectroscopy (EIS) measurements indicated that the liquid component in the XPGEs drastically reduced the interfacial resistance at room temperature to values comparable to those of the solid XPEs at 90° C. (FIG. 20). It was suspected that this arises from improved interfacial contact between the electrolyte and electrode. Room-temperature galvanostatic strip-plate experiments were performed for the XPGEs at a current density of 0.5 $mA/cm^2$. FIG. 2*a* reports the voltage response of XPGE-3k along with a control composed of the same liquid electrolyte infused in a 25 μm thick porous polyolefin (Celgard 3501) separator (expanded plots of the voltage response are shown in FIG. 21). The control electrolyte showed the typical large voltage overpotentials associated with pitting and stripping of lithium from underneath electrochemically disconnected mossy deposits. These features are absent in the XPGE-3k material. The voltage profile of XPGE-3k at 22° C. instead resembles the square-wave response previously observed in the solid-polymer system (XPE) at 90° C., indicating that pitting is suppressed. Galvanostatic cycling at a higher current density of 1 $mA/cm^2$ revealed similar square-wave like profiles (FIG. 22).

Figure 2B:
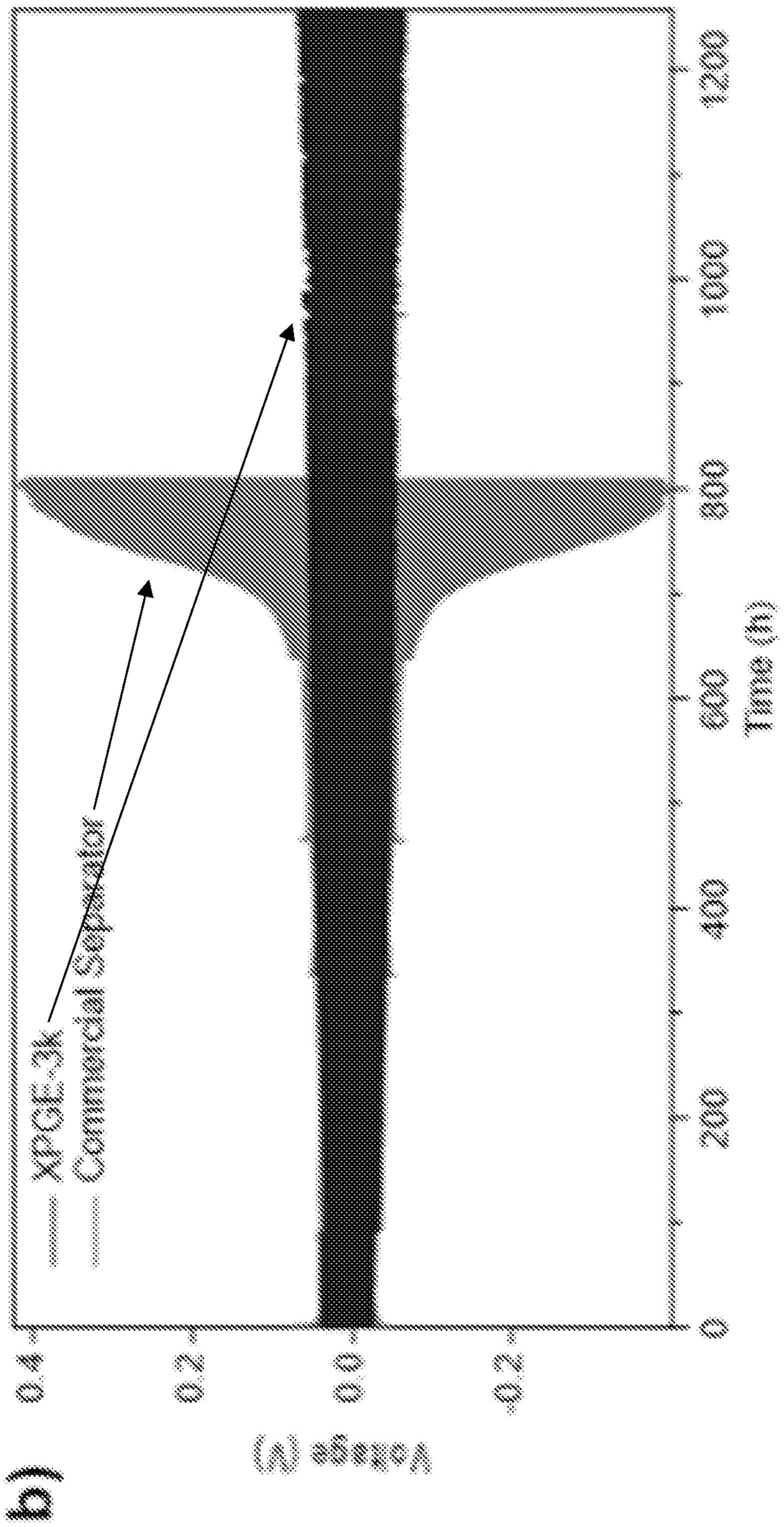
Figure 2C:
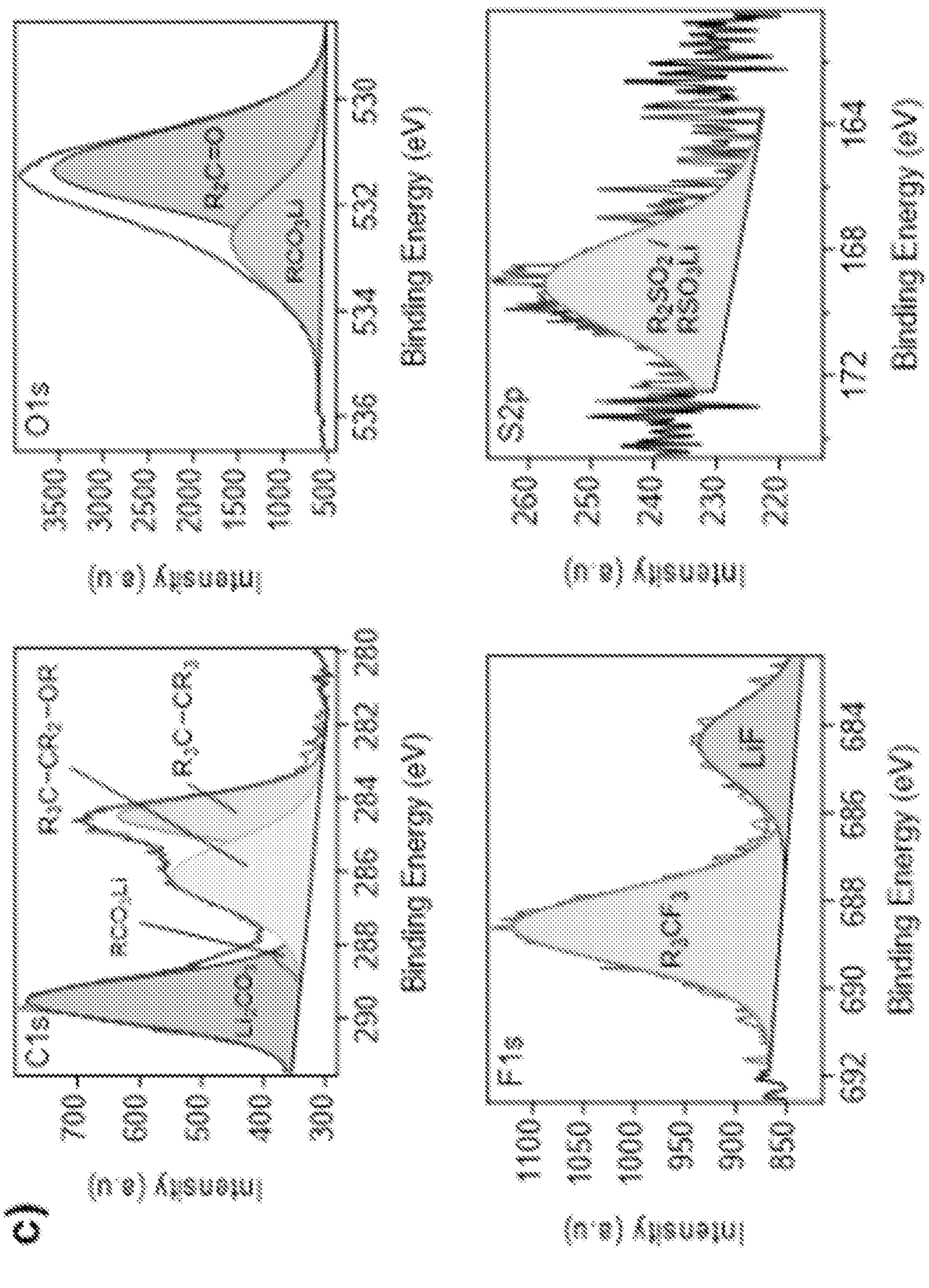
Figure 23:
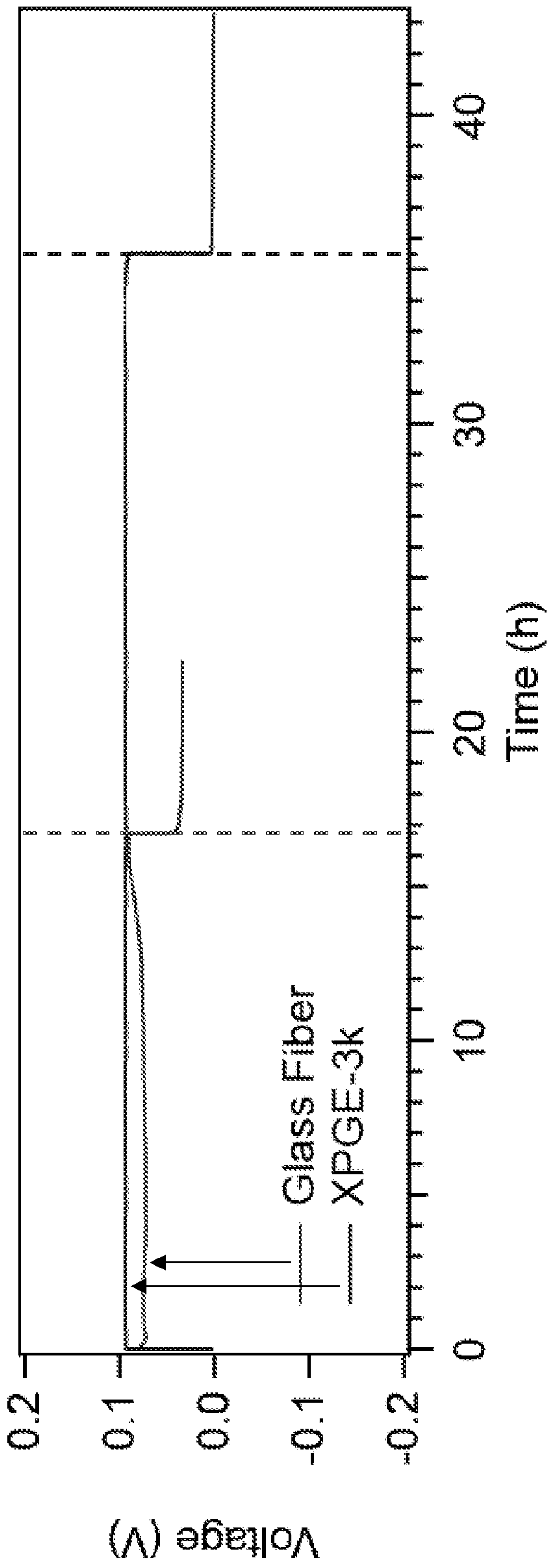
FIG. 23 shows galvanostatic polarization at 1 $mA/cm^2$ of a soaked glass fiber electrolyte compared to XPGE-3k. Vertical dashed lines indicate where cell failure occurs.
Figure 24:
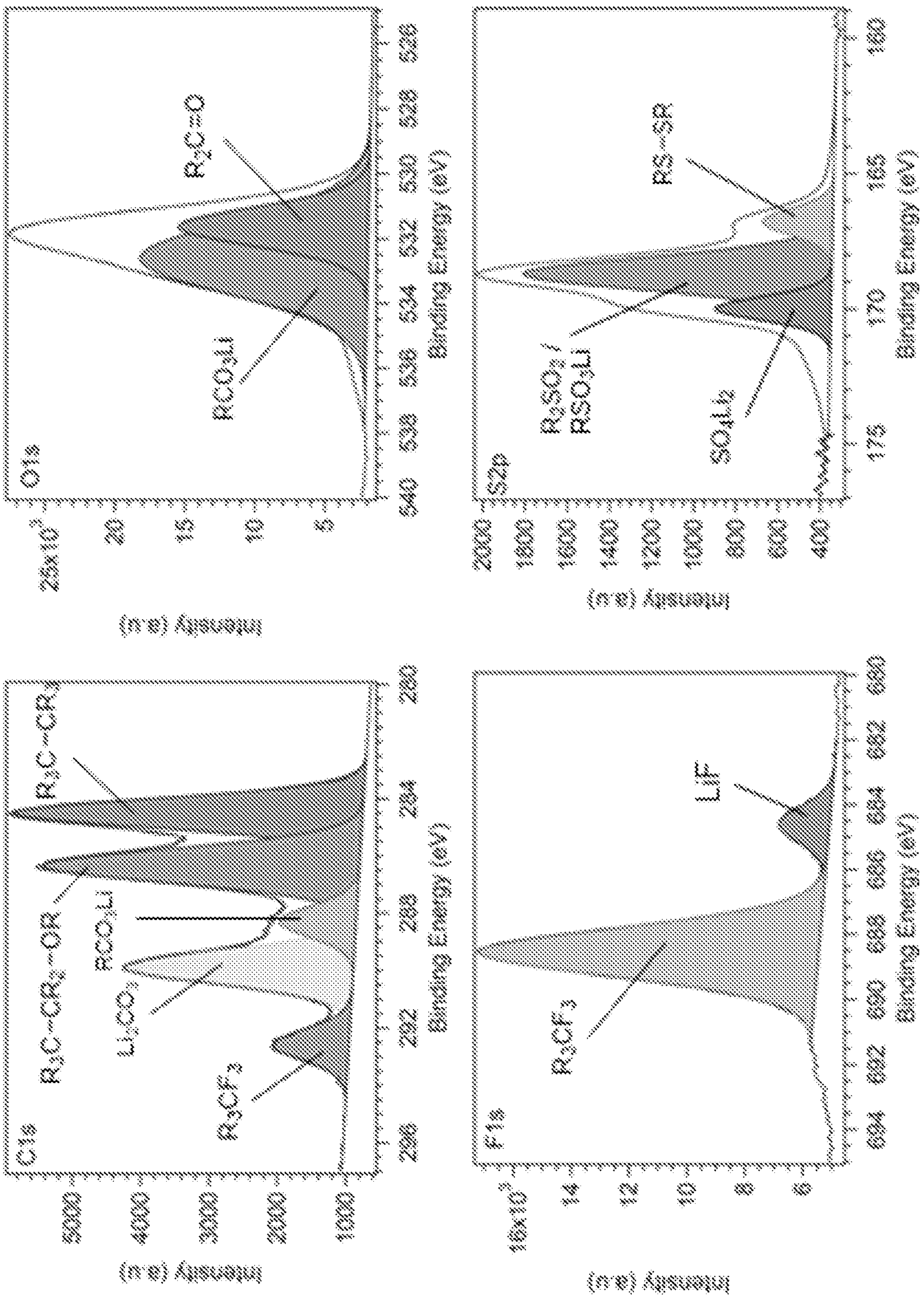
FIG. 24 shows XPS analysis of the SEI formed with a liquid electrolyte composed of 1 M LiTFSI in 1:1 (v:v) EC/DMC. Comparison with the SEI formed in the XPGE system suggests there is little to no polymer degradation relative to the byproducts formed by reaction of the liquid electrolyte component.

In order to eliminate the effect of thickness difference between XPGE-3k and the Celgard control, additional polarization experiments at 1 $mAh/cm^2$ were performed with glass fiber separators. The glass fiber separators were the same thickness as XPGE-3k (100 μm) and were soaked in the same electrolyte. FIG. 23 shows that XPGE-3k is nearly twice as effective as the glass fiber separator in resisting failure by short-circuit. Our results therefore imply that cross-linked polymer gels are effective in preventing mossy lithium electrodeposition, orphaning of the mossy lithium deposits, or both. FIG. 2*b* reports the voltage profiles obtained from long-term strip-plate cycling experiments. The XPGE-3k cell showed superior cyclability relative to XPE-3k and was able to maintain stable cycling with minimal potential drift for more than 1000 hours (>600 cycles). In comparison, the control cells in which the same liquid electrolyte was hosted in a commercial polyolefin separator failed after ~800 hours (400 cycles). XPS analysis of the lithium metal anode surface after cycling with XPGE-3k showed that the SEI was primarily composed of carbonates and lithium fluoride salts (FIG. 2*c*). The distribution of by-products was similar to that found in typical carbonate-based electrolytes, implying that they arose primarily from decomposition of the liquid carbonate and LiTFSI salt (FIG. 24). On this basis it was concluded that better interface contact and not the SEI composition is the likely source of the enhanced stability of the XPGE-3k electrolyte.

To study the morphology of lithium deposits at early stages of deposition, a small capacity of lithium (0.1 $mAh/cm^2$) was deposited on a stainless-steel substrate in cells containing XPGE-3k and were compared to cells containing a Celgard 3501 separator as a control. SEM analysis of the deposits revealed that the average diameter of Li nuclei formed in the XPGE-3k electrolytes were much smaller (0.14 m in XPGE-3k compared to 0.96 m in Celgard) and the number density of nuclei correspondingly larger (5.9 nuclei/$\mu m^2$ versus 0.27 nuclei/$\mu m^2$) (FIG. 3). Using equation 1 and the measured moduli for the XPGE electrolytes (see FIG. 18), the network mesh diameter of XPGE-3k was estimated to be at most 5 nm, which is evidently much smaller than the average nuclei diameter, confounding any straightforward relationship between the network structure and nucleate size.

Figure 25:
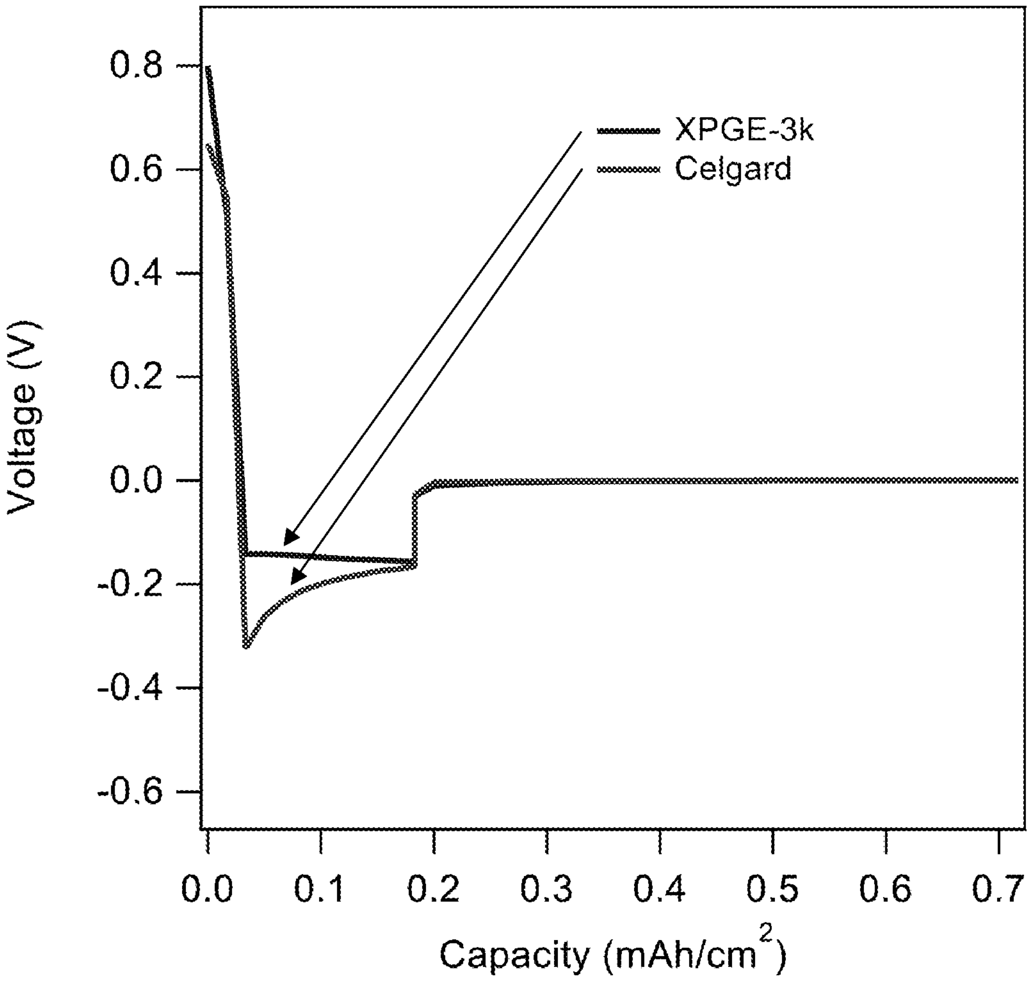
FIG. 25 shows voltage profile vs capacity for cells containing XPGE-3k or liquid electrolyte with Celgard 3501 at 1 $mA/cm^2$.

In order to determine the cause of the different Li morphologies, the mechanism of Li nucleation was attempted to be described. Metal nucleation at lower areal capacities is characterized by a nucleation overpotential, while the subsequent growth at higher areal capacities is dominated by mass transfer overpotentials.[33] A sharp peak in the voltage response marks the nucleation overpotential while the later gradual plateauing of the voltage response to lower voltage indicates the transition to mass transfer overpotentials. In FIG. 25, the nucleation overpotential can be identified at areal capacities of approximately 0.03 mAh/$cm^2$ for both the Celgard separator and the XPGE-3k. The voltage response for the commercial separator gradually plateaus to a lower voltage at higher capacities. Surprisingly, the XPGE networks showed no plateauing transition in voltage response to the mass transfer-controlled zone, even at higher capacities. The nucleation overpotential is a consequence of an interplay between activation and nuclei surface formation. The activation overpotential can be interpreted as the charge-transfer overpotential due to the heterogeneous nature of electrodeposition at the interface of the liquid bulk electrolyte and solid stainless-steel current collector. On the other hand, the nuclei surface formation overpotential is a consequence of the extra energy required to grow nuclei. For the XPGE networks, It was observed that the nuclei density and average nuclei size increased with increasing electrodeposited areal capacity (FIGS. 3*b* and 3*c*). Coalescence of lithium nuclei was also observed as areal capacity increased. This indicates simultaneous progressive nucleation, growth, and agglomeration are all contributing to the plateau overpotential. The smaller lithium nuclei supported in the elastic polymer framework would maintain better contact with the interface, facilitating more efficient electron transport and reversibility of the lithium deposition. The larger number density is also potentially beneficial as it would lead to a higher probability of merging of nuclei to produce the flatter electrodeposit profiles observed by SEM analysis.

At least two hypotheses can therefore be proposed to explain the effectiveness of cross-linked polymers in facilitating stable lithium electrodeposition. First, the smaller pore size of the cross-linked polymer, in comparison to Celgard, could amplify the effect of forces such as surface tension that are strongest on small length scales in preventing rapid growth of nuclei. Alternatively, the mechanical stresses produced by the cross-linked polymer membrane in contact with the growing nuclei will exert a local tensile force on the growing nuclei that is analogous to surface tension. This force will augment normal surface tension by an amount proportional to the shear modulus of the polymer network and would produce a planarizing effect on the Li nuclei analogous to what is observed in the experiments.

Figure 4A:
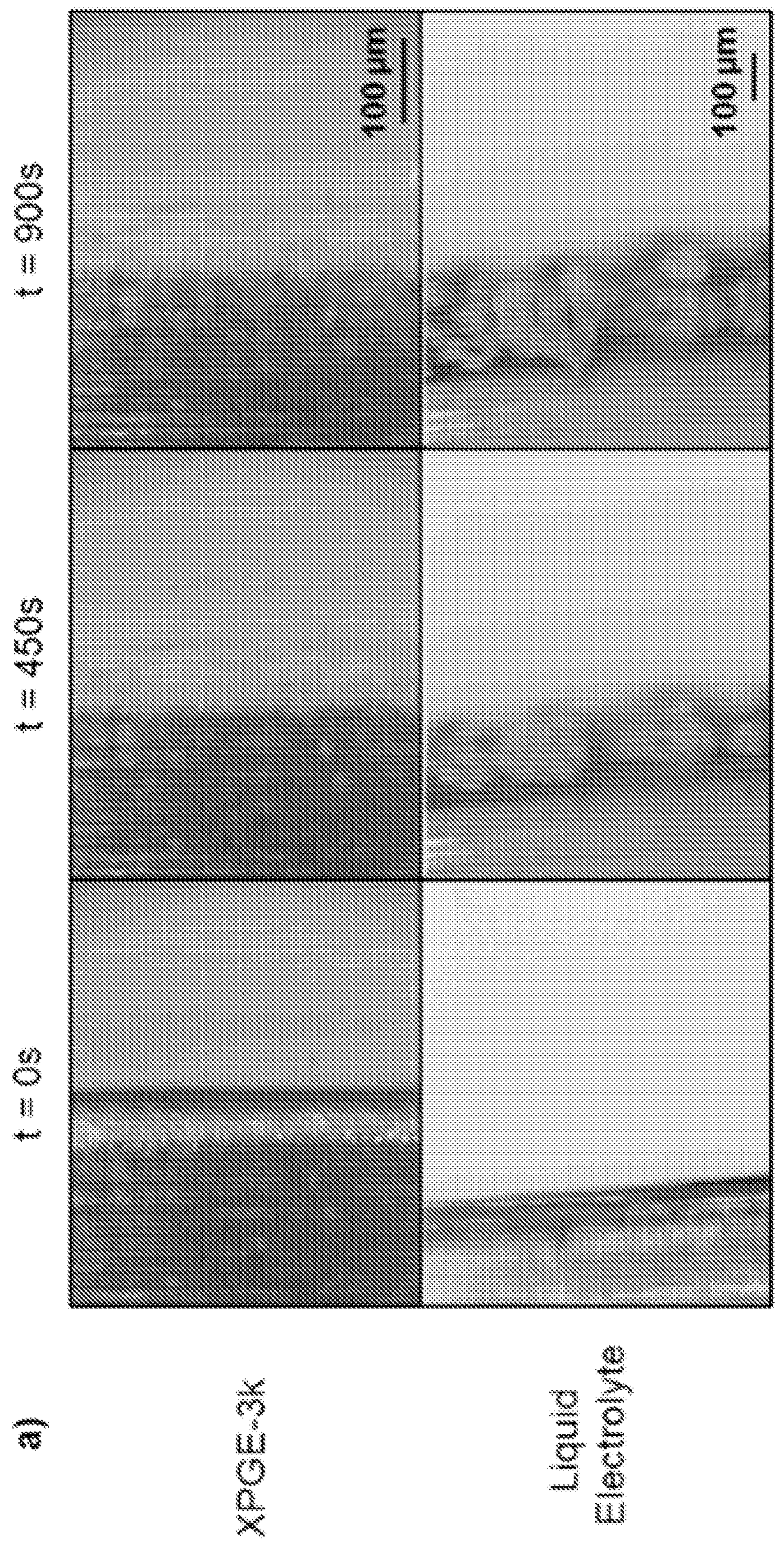
FIG. 4 shows visualization of lithium deposition. a) Comparison of deposition in a cross-linked polymer gel electrolyte (XPGE) and liquid electrolyte (1 M LiTFSI in 1:1 (v:v) EC/DMC) at J=6 $mA/cm^2$. b) Analysis of electrodeposit height at J=6 $mA/cm^2$ for the liquid electrolyte and XPGE networks. c) Growth rate as a function of time compared to theoretical predicted values estimated from the current density and capacity of lithium deposited.
Figure 26:
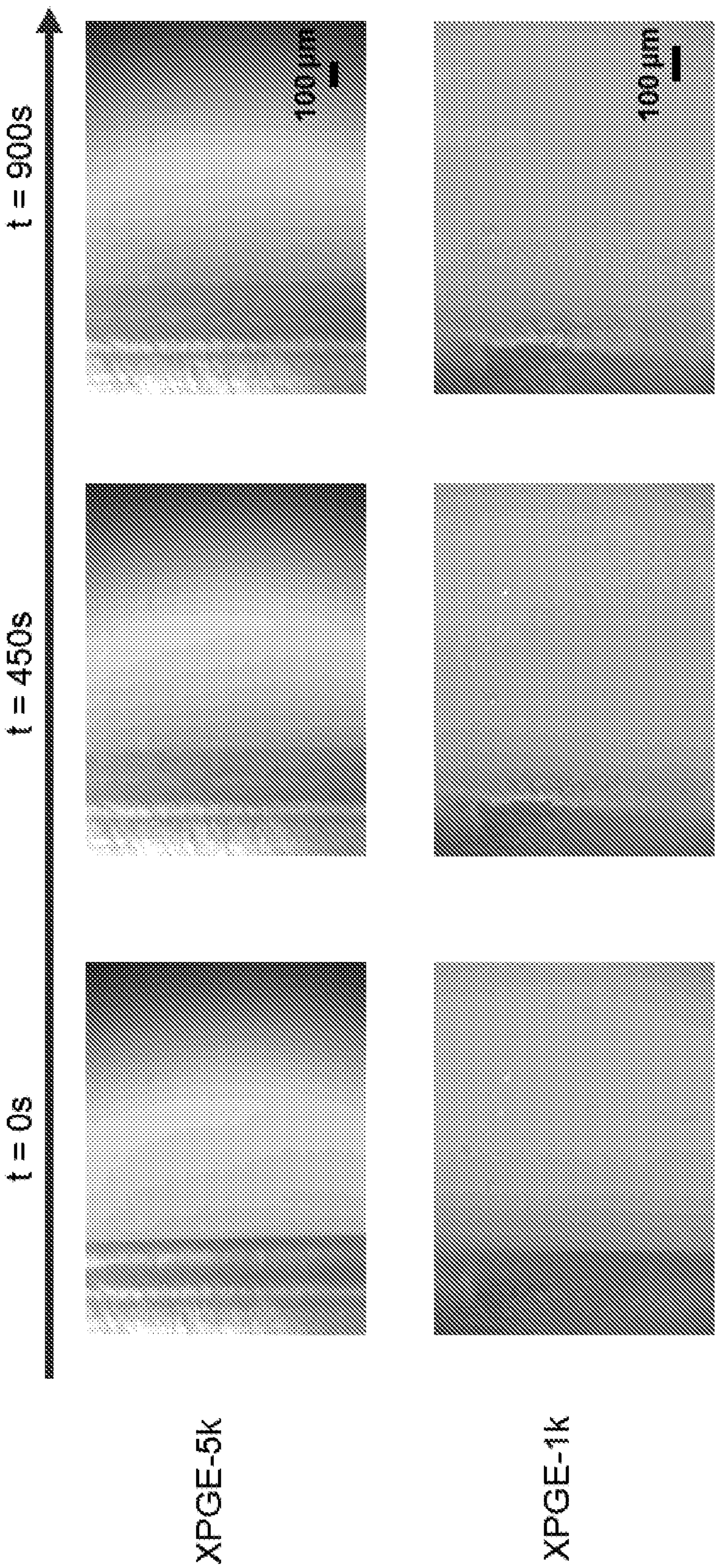
FIG. 26 shows visualization of lithium electrodeposition in XPGE-5k and XPGE-1k at J=6 $mA/cm^2$.

To evaluate these hypotheses, direct operando visualization experiments were performed at fixed current densities to visualize time-dependent morphology changes at the Li anode during continuous plating/polarization. FIG. 4*a* shows the results from a visualization experiment performed at 6 mA/$cm^2$. The Li deposits in XPGE-3k are notably more uniform and less mossy in comparison to the carbonate-based liquid electrolyte. Results for analogous visualization experiments using XPGE-5k and XPGE-1k are reported in FIG. 26. These results also show that the morphology is consistently more compact when electrodeposition of Li is performed in the cross-linked polymer electrolytes.

The average electrodeposit thickness and growth rate at 6 mA/$cm^2$ were analyzed using Matlab to gain insight into the evolution of lithium electrodeposition. Multiple points on the propagating front were tracked and averaged to obtain plots of the deposit height and growth rate over time for XPGE-1k, XPGE-3k, XPGE-5k, and a liquid electrolyte (1 M LiTFSI in EC/DMC) (FIG. 4*b-c*). As evident from FIG. 4*b*, the lithium deposit thickness increases more slowly in the XPGE electrolytes, in comparison to just the liquid electrolyte. The rate at which the electrodeposit thickness increases also varied with cross-link density, with higher cross-link density (i.e., lower PEO MW) networks resulting in slower growth (FIG. 4*c*). Additionally, the standard deviation in the electrodeposit thickness at each time point provides information about the spatial variation in growth rates of the propagating deposit front. Notably, all XPGE networks show narrow deviations in deposit height, and thus more uniform lithium deposition. However, it is noted that the suppressed growth rates in the cross-linked membranes are still substantially higher than expected for a lithium metal layer with density equal to that of the bulk metal. This indicates that while electrodeposition of lithium in the cross-linked polymers is more compact than in the liquid electrolyte, the electrodeposit structures are less dense than the bulk metal.

Figure 27:
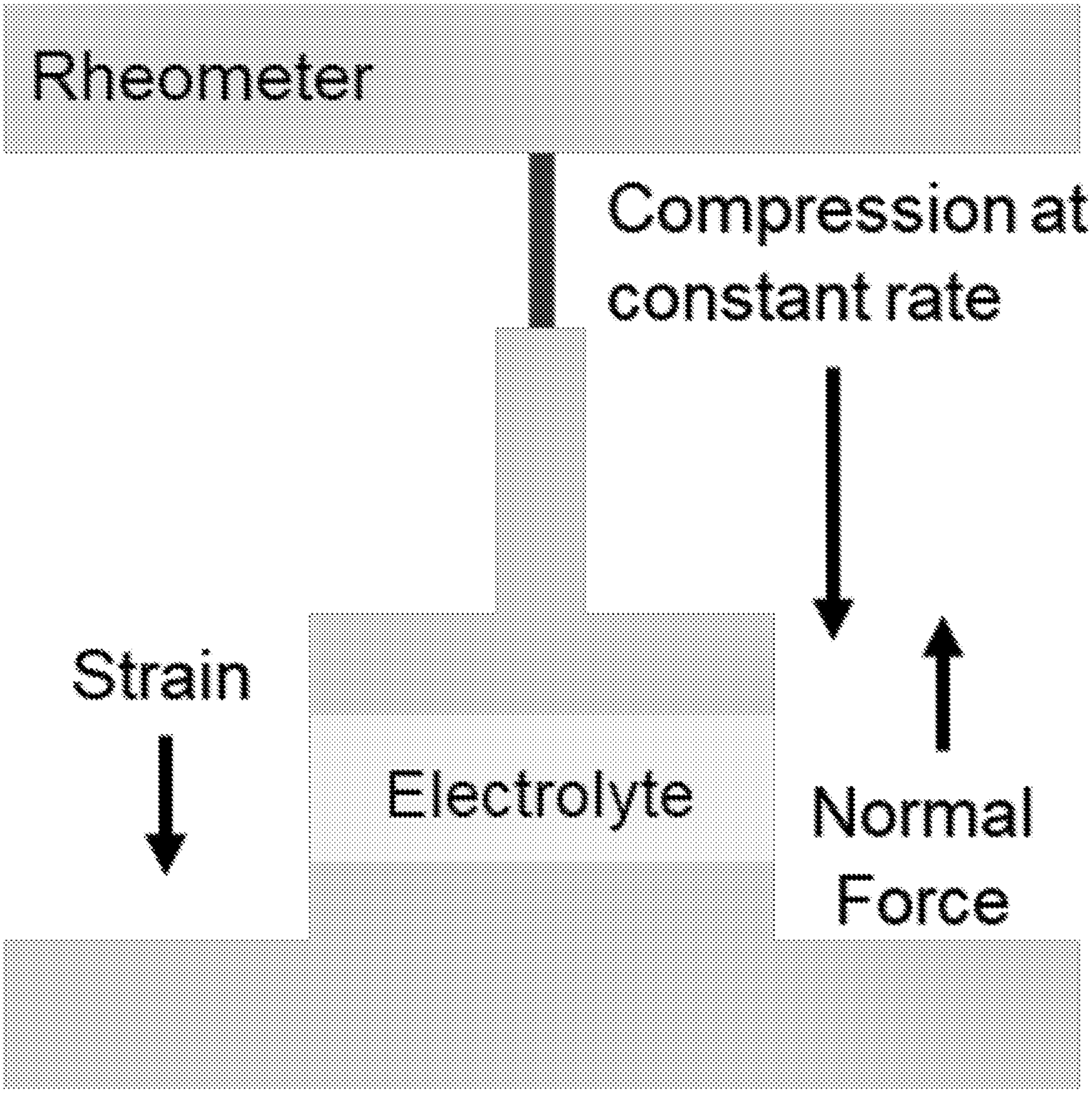
FIG. 27 shows diagram of the experimental setup used to model compression of the XPGE networks during the lithium deposition process. The custom-made parallel upper plate had a diameter of 1.5 mm. The upper plate was driven downward at a constant normal velocity to observe the response within the polymer network.
Figure 28A:
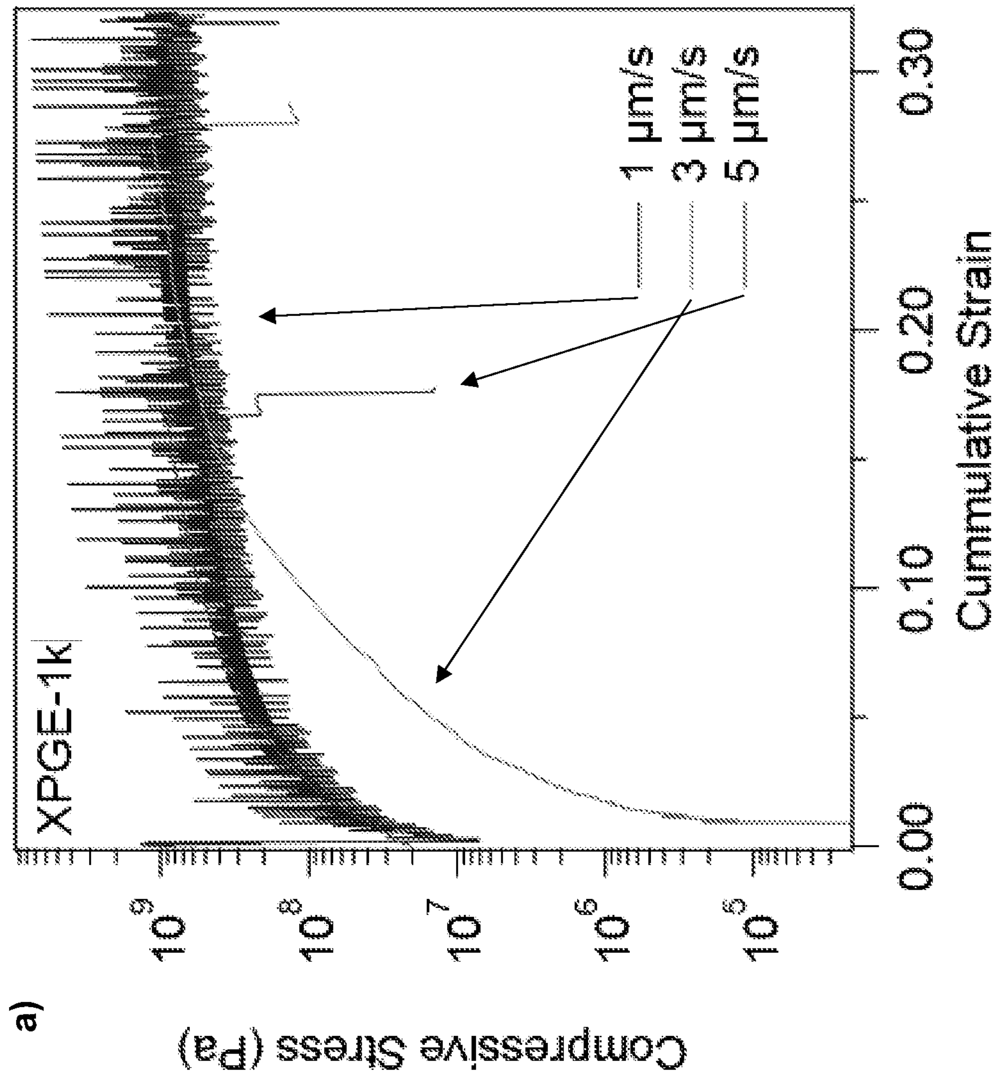
FIG. 28 shows compressive stress in cross-linked polymer gel electrolytes for three different compression velocities. a) XPGE-1k. b) XPGE-3k. c) XPGE-5k.
Figure 28B:
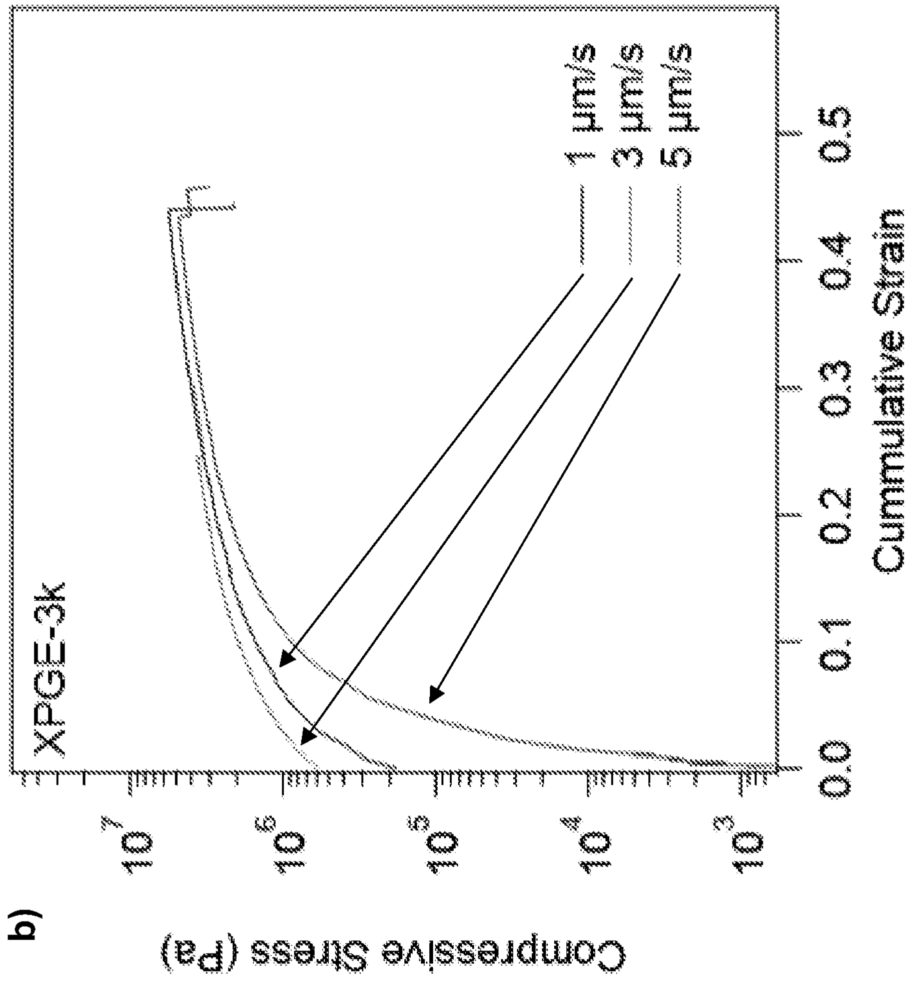
Figure 28C:
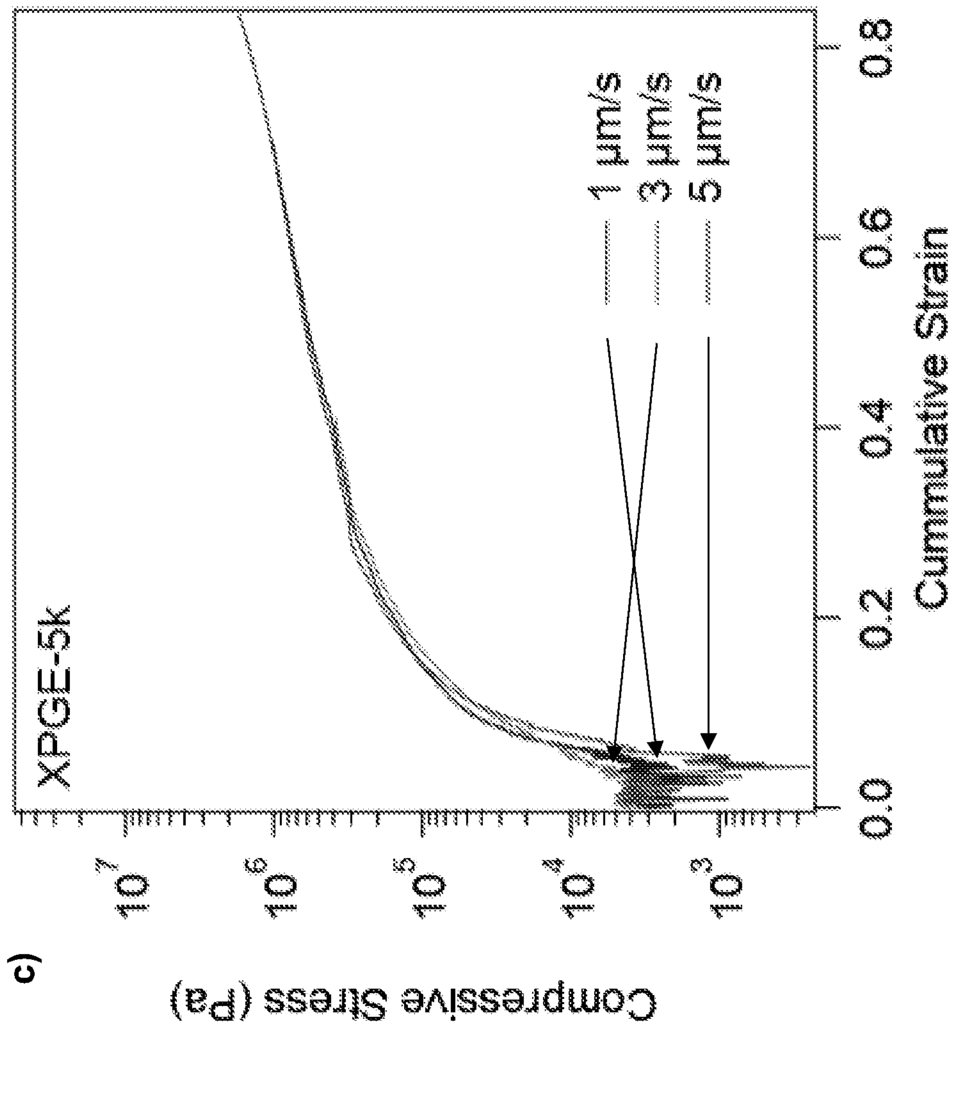

In all cases, it was observed that Li deposit growth rate decreased before reaching a constant value. It is possible that stress develops in the cross-linked network over time due to lithium deposition, eventually reaching a saturation point, which produces a constant, lower growth rate. To test this idea, a mechanical rheology experiment was designed to model the conditions of the visualization experiment and the deposition process (FIG. 27). A sample of XPGE-3k was compressed on a rheometer equipped with a custom-made upper parallel plate with a diameter of 1.5 mm. The upper plate was driven downward at a constant normal velocity to observe the response within the polymer network. The force per unit area was utilized to obtain the compressive stress in the network. As can be seen in FIG. 5*a*, the compressive stress on the networks saturated at a high stress value before eventual material failure was observed. XPGE networks comprising higher cross-link densities (lower molecular weight between cross-links) produced stress values orders of magnitude higher than lower cross-link density networks, offering a plausible explanation for the suppressed Li deposit growth rates observed for XPGE-1k. The experiment was also performed at three different compression velocities for each XPGE network (FIG. 28). For each network, the compressive stress increased moderately with higher compression velocity. This was likely due to easier deformation of polymer segments, which then exerted higher elastic forces to resist deformation on shorter time scales. The yield strain value deduced from the compression experiments decreased as compression velocity increased for the same reason.

In order to compare the model compression experiment to the visualization studies, the strain experienced by the polymer networks during deposition was calculated from the visualization experiments (FIG. 5*b*). At about 600 s, the cumulative strain in the networks began to plateau. This would increase the effective modulus experienced by the lithium deposits and lead to reduced growth rates on similar timescales. Results reported in FIG. 4*c* show that Lithium deposit growth rate also approached steady state within approximately 600 s. Thus, the effective suppression of dendritic propagation of lithium by cross-linked polymers may be due to the high levels of compressive stress developed in the network as the dendrites propagate.

Finally, to assess the potential for wider applications of cross-linked polymer gel electrolytes for practical lithium metal batteries, Li||NCM 622 cells were assembled with high cathode loadings (3 mAh/cm$^2$) and XPGE-3k as the electrolyte. Ether-based electrolytes are known to decompose at high voltages, but can be stabilized by lithium bis(oxalato) borate (LiBOB) salts owing to the formation of a protective cathode-electrolyte interface (CEI).[36] To create a stable CEI, the porous cathode was wetted with a LiBOB-containing liquid electrolyte (0.4 M LiBOB, 0.6 M LiTFSI, 0.05 M $LiPF_6$ in 1:1 (v:v) EC/DMC) prior to cell assembly. $LiPF_6$ is included in the formulation to prevent corrosion of the aluminum current-collector used for the cathode. XPGE-3k was used as the bulk electrolyte without modifying its previously described composition. The cycling results showed excellent active material utilization and capacity retention at a moderate rate of C/5 for over 120 cycles (FIG. 6*a*). The corresponding voltage profiles in FIG. 6*b* show a high coulombic efficiency of >99.5% and no signs of electrolyte decomposition.

Experimental Details. All air and water sensitive manipulations were carried out under dry nitrogen conditions in an MBraun Labmaster glovebox or by using standard Schlenk line technique. $^1$H spectra were collected on a Bruker AV III HD ($^1$H, 500 MHz) spectrometer with a broad band Prodigy cryoprobe and referenced to residual non-deuterated solvent shifts ($CHCl_3$=7.26 ppm). $^{13}$C NMR were collected on a Bruker AV III HD ($^{13}$C, 125 MHz) spectrometer with a broad band Prodigy cryoprobe and referenced to chloroform (δ=77.16 ppm). FT-IR spectra were recorded on a Bruker Tensor II FTIR Spectrometer equipped with an attenuated total reflectance (ATR) accessory.

Atomic force microscopy (AFM) images were measured at the Cornell Energy Systems Institute (CESI) using Cypher ES, Oxford Instruments Asylum Research, Inc. AC tapping mode was selected to collect topography and phase images using an AC160TS-R3 probe (frequency 300 kHz, spring constant 26 N/m, 7 nm tip radius).

Oscillatory shear measurements were performed using a MCR301 (Anton Paar) rheometer at Cornell Energy Systems Institute (CESI) equipped with a 10 mm parallel plate fixture at temperatures ranging from 40 to 90° C. A low strain rate of 0.1% was used for the frequency sweeps to remain in the linear viscoelastic regime.

X-ray Photoelectron Spectroscopy measurements were conducted at the Cornell Center for Materials Research (CCMR) using a Surface Science Instruments SSX-100 with an operating pressure of ~2×10$^{-9}$ torr. Monochromatic Al K-α x-rays (1486.6 eV) with beam diameter of 1 mm were used. Photoelectrons were collected at an emission angle of 550 and the electron kinetic energy was determined by a hemispherical analyzer, where a pass energy of 150 V was used for wide survey scans and 50V for high resolution scans. CasaXPS software was used for XPS data analysis with Shelby backgrounds and the spectra were referenced to adventitious C is at 284.5 eV.

Materials. Tetrahydrofuran (THF) was purified over a column of alumina and degassed by three freeze-pump thaw cycles and stored under nitrogen. Poly(ethylene glycol) ($M_n$ 1,000, 3,000, and 4,600 g/mol) (Sigma Aldrich) was dried by azeotroping with toluene at 80° C. under vacuum for 16 h. Sodium hydride (Sigma Aldrich, 90%) and Lithium bis (trifluoromethanesulfonyl)imide (Sigma Aldrich, 99.95% trace metals basis) were stored under nitrogen in a glovebox. Lithium foil was purchased from Alfa Aesar and NCM 811 cathodes were provided by Nohms Inc. Celgard 3501 was used for control samples in electrochemical testing and Glass Fibre Separators were obtained from Fischer Scientific. All other reagents were purchased from commercial sources and used as received unless otherwise noted.

Synthesis of PEG Diallyl Ether (PEGDAE). Poly(ethylene glycol)s of Mn 1,000 g/mol, 3,000 g/mol, and 5,000 g/mol were functionalized using the following representative procedure: To a suspension of NaH (1.33 g, 50.1 mmol) in anhydrous THF (50 mL) was added dropwise a solution of PEG ($M_n$=3,000 g/mol) (50 g, 16.7 mmol) in anhydrous THF (150 mL). The mixture was stirred under $N_2$ at 22° C. for 16 h with an oil bubbler to allow $H_2$ evolution. Allyl bromide (7.2 mL, 83.3 mmol) was then added dropwise over 10 min and the mixture was heated to 50° C. under $N_2$ for 24 h. The solution was quenched with a minimum amount of methanol and the solution was filtered through a pad of celite. The filtrate was concentrated under vacuum and the residue was taken up in DCM (~250 mL) and washed with 20% $NH_4OH$ (2×100 mL), 1 M HCl (2×100 mL), and brine. The organic layer was dried over $MgSO_4$, filtered, and concentrated under vacuum. The oil residue was then precipitated into cold ether (~500 mL), collected, and dried. Precipitations were repeated as necessary to obtain a white powder (41 g, 80%). $^1$H NMR (500 MHz, $CDCl_3$) (FIG. 8): δ 5.93-5.82 ppm (m, 2H), 5.27-5.21 ppm (dd, J=17.5, 1.8 Hz, 2H), 5.17-5.11 ppm (dd, J=10.4, 1.6 Hz, 2H), 3.99 ppm (d, J=5.7, 4H), 3.80-3.40 ppm (m, 299H). $^{13}$C NMR (125 MHz, $CDCl_3$) (FIG. 8): δ 134.75, 117.06, 72.21, 70.61, 70.55, 69.41 ppm. The number average molecular weight (Mn) by $^1$H NMR was determined to be 1065 g/mol, 3300 g/mol, and 5020 g/mol for the three PEGDAE macromonomers used in this Example.

Synthesis of Cross-linked Polymer Electrolyte (XPE). PEGDAE was mixed with pentaerythritol tetrakis (3-mercaptopropionate) (4T) in a 2:1 molar ratio to maintain a 1:1 stoichiometry between thiol and allyl reactive groups. Lithium bis(trifluoromethanesulfonyl)imide salt was added in the desired EO:Li ratio and the mixture was stirred at 80° C. until homogeneous. The photoinitiator, 2,2-Dimethoxy-2-phenylacetophenone (DMPA), was mixed into the precursor solution at 1 mol % immediately before casting the monomer mixture between silylated glass plates. A 100 m spacer was used to control the film thickness. The film was cured at 80° C. under 350 nm of UV light for 12 hours to ensure maximum conversion. We note, however, that films cured for 30 minutes showed identical mechanical properties to films cured for longer times (FIG. S2). The films were dried at 80° C. under vacuum for 48 hours and stored in an argon glovebox prior to cell assembly and electrochemical characterization.

Synthesis of Cross-linked Polymer Gel Electrolytes (XPGE). PEGDAE was mixed with pentaerythritol tetrakis (3-mercaptopropionate) (4T) in a 2:1 molar ratio to maintain a 1:1 stoichiometry between thiol and allyl reactive groups. The mixture was stirred at 80° C. until homogeneous. The photo-initiator, 2,2-Dimethoxy-2-phenylacetophenone (DMPA), was added to the precursor solution at 1 mol % and mixed briefly before film casting. Samples for the lithium deposition visualization studies were cast in a stainless-steel mold (15 mm diameter, 2 mm depth). Samples for full cell battery tests were cast between silylated glass plates at an average thickness of 100 m. The films were cured at 80° C. under 350 nm of UV light for 16 hours to ensure full conversion. The films were then dried at 80° C. under vacuum for 48 hours. Inside an argon glovebox, the membranes were soaked for 1 hour in an electrolyte solution until equilibrium swelling was achieved. For full cell Li||NCM 622 tests, the liquid electrolyte component was composed of 0.4 M LiBOB, 0.6 M LiTFSI, 0.05 M $LiPF_6$ in 1:1 (v:v) EC/DMC. For all other experiments utilizing XPGE membranes, the liquid component used was 1 M LiTFSI in 1:1 (v:v) EC/DMC.

Electrochemical Characterization. Ionic conductivity and impedance measurements as a function of temperature were measured at Cornell Energy Systems Institute (CESI) with a Novocontrol N40 broadband spectrometer fitted with a Quarto temperature control system. The coin cells were assembled by sandwiching the electrolyte between two stainless steel electrodes (and lithium as the electrodes for impedance measurements) and sealed in the glovebox to prevent contamination. Galvanostatic strip/plate experiments were performed using coin cells with the electrolyte sandwiched between two lithium electrodes (diameter=6.35 mm). Cyclic Voltammetry measurements were performed using a high scan rate of 0.2 V/s in symmetric cells with small electrodes (2 mm radius) to avoid ohmic drops and polarizations. High temperature measurements were performed by placing the coin cells in a convection oven (VWR). Visualization was performed in a setup previously described.1 Analysis of dendrite growth was performed using MatLab. Full cell measurements were performed using a high loading NCM cathode (3 mA/cm$^2$ from NOHMS Inc.) and lithium foil as the cathode. At the cathode side, a Celgard 3501 layer was soaked with a small amount of liquid electrolyte with the additives mentioned to wet the porous electrode.

Highly uniform PEG-based networks using thiol-ene chemistry were synthesized in order to study lithium electrodeposition in cross-linked polymer electrolyte networks. Conductivity measurements of the solid polymer networks in this Example indicated a critical molecular weight of PEO chains at which maximum conductivity was achieved. Galvanostatic strip-plate experiments and impedance measurements showed stable solid-state cycling as a result of low interfacial resistance at high temperature. However, investigation into the interplay between lithium-ion diffusion through the network and reaction rate at the electrode interface using cyclic voltammetry suggests that the ratio between diffusion and reaction rate may be an important factor to consider in the design of cross-linked polymer electrolytes.

Soaking the polymer networks in a liquid electrolyte to form XPGE networks improved lithium-ion diffusion and interfacial kinetics. Notably, the XPGE networks showed stable cycling in excess of 150 cycles despite hosting a liquid electrolyte known to decompose at the electrode over time. Optical microscopy in-operando visualization techniques showed the XPGE networks are capable of significant suppression of lithium dendrite growth by enabling controlled, uniform lithium deposition. SEM analysis of the lithium anode surface further revealed that the network architecture enabled small, dense lithium deposits in the initial phase of nucleation. As deposition progressed, the nuclei were found to merge and form planar deposits. Additionally, the effect of cross-link density and subsequently the compressive stresses developed in the networks during electrodeposition were also investigated using rheology. It was found that the compressive stresses in the network play a key role in the suppression and saturation of the growth rate of lithium deposits over time, possibly leading to the observed planar deposits. Finally, the practical applicability of these electrolytes was demonstrated in full cell lithium metal battery configurations with desirable long-term stability over 100 cycles.

TABLE 1

Summary of Thermal and Conductive Properties of Solid Cross-linked Networks.

| Network (XPE-nk)[a] | PEGDA $M_n$ (kg/mol)[b] | $T_g$ (° C.)[c] | $T_m$ (° C.)[c] | $T_c$ (° C.)[c] | $\Delta H_{fus}$ (J/g)[c] | σ (S/cm) at 25° C.[d] | σ (S/cm) at 90° C.[d] |
|---|---|---|---|---|---|---|---|
| XPE-1k | 1.0 | −46 | n.d.[e] | n.d.[e] | n.d.[e] | $2.2 \times 10^{-5}$ | $4.3 \times 10^{-4}$ |
| XPE-3k | 3.0 | −48 | 19 | −6 | 43 | $5.4 \times 10^{-5}$ | $7.4 \times 10^{-4}$ |
| XPE-5k | 4.6 | −45 | 31 | 2 | 57 | $3.5 \times 10^{-5}$ | $8.2 \times 10^{-4}$ |

[a]All films have an EO:Li ratio of 18:1 (r = 0.056); where EO denotes ethylene oxide units in the PEG diallyl ether macromonomer. XPE-nk denotes cross-linked polymer electrolyte using PEGDA macromonomer of n kg/mol.

[b]Number average molecular weight ($M_n$) determined by $^1$H NMR.

[c]Glass transition temperature ($T_g$), melting temperature ($T_m$), crystallization temperature ($T_c$), and enthalpy of fusion ($\Delta H_{fus}$) were determined by differential scanning calorimetry (DSC).

[d]Determined by dielectric spectroscopy measurements.

[e]Not detected.

Although the present disclosure has been described with respect to one or more particular embodiment(s) and examples, it will be understood that other embodiments and examples of the present disclosure may be made without departing from the scope of the present disclosure.

The invention claimed is:

1. A solid-polymer electrolyte comprising a cross-linked polymer network, the cross-linked polymer network comprising:

a plurality of groups chosen from cross-linked difunctional polyether groups, cross-linked difunctional ionic groups(s), and combinations thereof, and a plurality of cross-linked multifunctional crosslinker groups, wherein individual cross-linked difunctional polyether groups and/or individual cross-linked difunctional ionic groups and individual cross-linked multifunctional crosslinker groups are covalently bonded by at least one crosslinking group comprising a thioether group, wherein each crosslinking group comprises a carbon-carbon bond to a cross-linked difunctional polyether group and does not comprise a —C(O)O— group.

2. The solid-polymer electrolyte of claim 1, wherein the solid-polymer electrolyte further comprises one or more non-crosslinked group(s), individual non-crosslinked group (s) having at least one terminal group not covalently bound to the cross-linked polymer network and the individual non-crosslinked group(s) covalently bonded to the cross-linked polymer network via a group comprising a thioether group.

3. The solid-polymer electrolyte of claim 1, wherein the solid-polymer electrolyte has a $M_x$ (molecular weight between crosslinks) of 44-10,000 g/mol, including all 0.1 g/mol values and ranges therebetween.

4. The solid-polymer electrolyte of claim 1, wherein the solid-polymer of the solid-polymer electrolyte comprises amorphous and/or crystalline domains.

5. The solid-polymer electrolyte of claim 1, wherein the solid-polymer electrolyte comprises a network of entangled polymer chains.

6. The solid-polymer electrolyte of claim 1, wherein the solid-polymer electrolyte comprises one or more conducting salt(s).

7. The solid-polymer electrolyte of claim 1, wherein the solid-polymer electrolyte further comprises one or more liquid electrolyte(s).

8. A device comprising one or more solid-polymer electrolyte(s) of claim 1.

9. The solid-polymer electrolyte of claim 1, wherein the crosslinking groups are independently chosen from

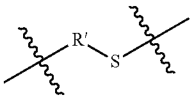

groups, wherein R' is chosen from alkyl groups and alkenyl groups.

10. The solid-polymer electrolyte of claim 1, wherein cross-linked difunctional polyether groups are independently chosen from

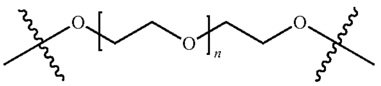
, wherein n is independently at each occurrence 0 to 250.

11. The solid-polymer electrolyte of claim 1, wherein the cross-linked multifunctional crosslinker groups are independently chosen from:

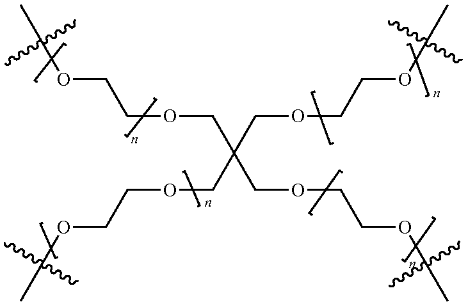
,

-continued

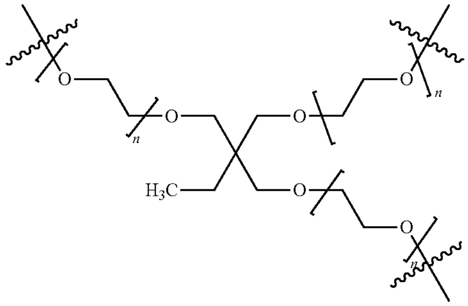
,

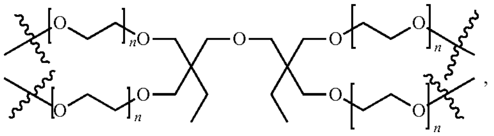
, and

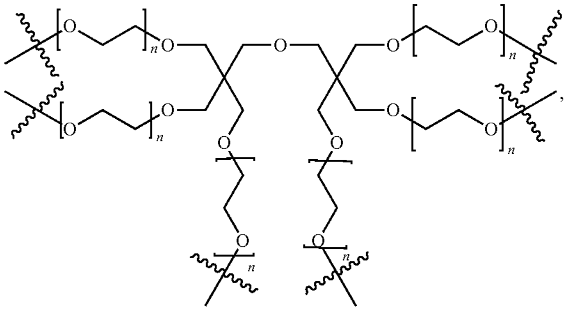
, wherein n is independently at each occurrence 0 to 250.

12. A solid-polymer electrolyte comprising a cross-linked polymer network, the cross-linked polymer network comprising:

a plurality of cross-linked difunctional polyether groups independently chosen from:

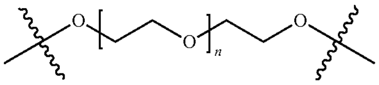
, wherein in n is 0 to 250, a plurality of one or more non-crosslinked group(s), individual non-crosslinked group(s) having at least one terminal group not covalently bound to the cross-linked polymer network and the individual non-crosslinked group(s) covalently bonded to the cross-linked polymer network via a group comprising a thioether group;

a plurality of cross-linked difunctional ionic groups(s) and/or one or more liquid electrolyte(s), and a plurality of cross-linked multifunctional crosslinker groups independently chosen from:

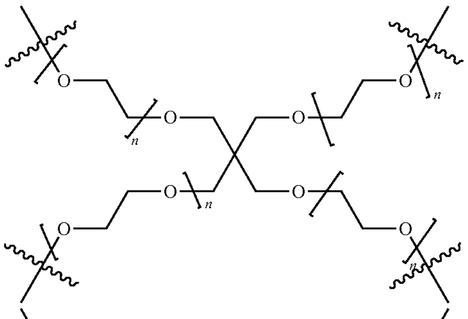

,

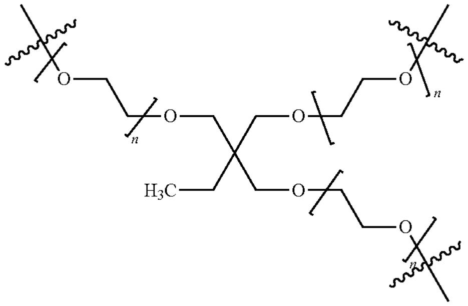

,

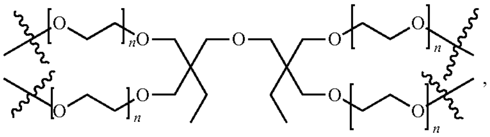

, and

-continued

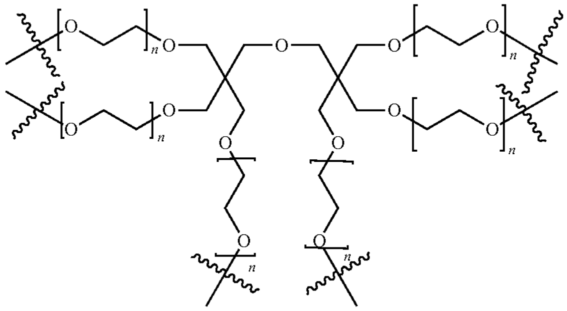

wherein n is independently at each occurrence 0 to 250, wherein individual cross-linked difunctional polyether groups and/or individual cross-linked difunctional ionic groups(s) and individual cross-linked multifunctional cross-linker groups are covalently bonded by at least one cross-linking group comprising a thioether group, wherein each thioether group comprises a carbon-carbon bond to a cross-linked difunctional polyether group.

* * * * *